US009383430B2

(12) United States Patent
Keegan

(10) Patent No.: US 9,383,430 B2
(45) Date of Patent: *Jul. 5, 2016

(54) DETERMINING LOCATION OF A RECEIVER WITH A MULTI-SUBCARRIER SIGNAL

(71) Applicant: Deere & Company, Moline, IL (US)

(72) Inventor: Richard G. Keegan, Palos Verdes Estates, CA (US)

(73) Assignee: DEERE & COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/932,031

(22) Filed: Nov. 4, 2015

(65) Prior Publication Data

US 2016/0054426 A1   Feb. 25, 2016

Related U.S. Application Data

(63) Continuation of application No. 14/482,257, filed on Sep. 10, 2014, now Pat. No. 9,194,936.

(60) Provisional application No. 62/022,265, filed on Jul. 9, 2014.

(51) Int. Cl.
*H04L 1/02* (2006.01)
*H04L 27/28* (2006.01)
(Continued)

(52) U.S. Cl.
CPC ............ *G01S 5/0221* (2013.01); *H04L 27/2601* (2013.01)

(58) Field of Classification Search
CPC ....... G01S 1/24; H04L 26/06; H04L 27/2647; H04L 27/2657; H04L 27/5007

USPC .......... 375/260, 267, 336; 370/252, 336, 456; 342/458, 463

See application file for complete search history.

(56) References Cited

U.S. PATENT DOCUMENTS

| 5,659,520 A | 8/1997 | Watson et al. |
| 7,542,764 B2 | 6/2009 | Jin et al. |
| 7,912,463 B2 * | 3/2011 | Jin .................. H04B 17/21 455/115.1 |

(Continued)

FOREIGN PATENT DOCUMENTS

WO   2014043237 A1   3/2014
WO   2014043250 A1   3/2014

OTHER PUBLICATIONS

Johnson, J. et al. "The Role of Multipath in Antenna Height Tests at Table Mountain." UNAVCO, Jul. 1995 [online] [retrieved Feb. 16, 2015]. Retrieved from the Internet: <URL: http://facility.unavco.org/kb/questions/186/The+Role+of+Multipath+in+Antenna+Height+Tests+at+Table+Mountain+(paper,+1995)>.

(Continued)

*Primary Examiner* — Khai Tran

(57) ABSTRACT

A first estimator determines a coarse estimate of a time of arrival of at least one subcarrier of an OFDM-like multitone signals by adjusting the coarse estimate of the time of arrival in accordance with a code (first) correlation function. A second estimator determines a precise estimate of the time of arrival of at least one subcarrier of the OFDM-like multitone signals by adjusting the precise time of arrival to align the slope of the subcarrier phases of the OFDM-like multitone signals in accordance with a phase (second) correlation function and consistent with the coarse estimate of the time of arrival associated with the code correlation function. A data processor estimates the location of the receiver or estimated range based on the precise estimate.

22 Claims, 38 Drawing Sheets

(51) Int. Cl.
*G01S 5/02* (2010.01)
*H04L 27/26* (2006.01)

(56) References Cited

U.S. PATENT DOCUMENTS

| | | | |
|---|---|---|---|
| 9,194,936 B1 * | 11/2015 | Keegan | G01S 5/0273 |
| 2008/0089458 A1 | 4/2008 | Wallace et al. | |
| 2009/0243932 A1 | 10/2009 | Moshfeghi | |
| 2010/0279707 A1 | 11/2010 | Fischer et al. | |
| 2012/0063491 A1 | 3/2012 | Kong et al. | |
| 2014/0070997 A1 | 3/2014 | Keegan et al. | |
| 2014/0266904 A1 | 9/2014 | Sendonaris et al. | |
| 2014/0329536 A1 | 11/2014 | Tian et al. | |
| 2015/0070209 A1 | 3/2015 | Keegan et al. | |

OTHER PUBLICATIONS

Negi, R. and Cioffi, J. "Pilot Tone Selection for Channel Estimation in a Mobile OFDM System." Consumer Electronics, Institute of Electrical and Electronics Engineers, vol. 44, No. 3, Aug. 1998, pp. 1122-1128 [online] [retrieved on Feb. 16, 2015]. Retrieved from the Internet: <URL: http://ieeexplore.ieee.org/xpls/abs_all.jsp?arnumber=713244&tag=1> <DOI: 10.1109/30.713244>.

Armada, A. "Understanding the Effects of Phase Noise in Orthogonal Frequency Division Multiplexing (OFDM)." Transactions on Broadcasting, Institute of Electrical and Electronics Engineers, vol. 47, No. 2, Jun. 2001, pp. 153-159 [online] [retrieved on Feb. 16, 2015] Retrieved from the Internet: <URL: http://ieeexplore.ieee.org/xpls/abs_all.jsp?arnumber=948268> <DOI: 10.1109/11.948268>.

Yu, Y. et al. "A Joint Scheme of Decision-Directed Channel Estimation and Weighted-Average Phase Error Tracking for OFDM WLAN Systems." The 2004 Institute of Electrical and Electronics Engineers Asia-Pacific Conference on Circuits and Systems, vol. 2, Dec. 6-9, 2004, pp. 985-988 [online] [retrieved on Feb. 16, 2015]. Retrieved from the Internet: <URL: http://ieeexplore.ieee.org/xpls/abs_all.jsp?arnumber=1413046> <DOI: 10.1109/APCCAS.2004.1413046>.

Pan, Z. and Zhou, Y. "A Practical Double Peak Detection Coarse Timing for OFDM in Multipath Channels." The 73rd Institute of Electrical and Electronics Engineers Vehicular Technology Conference, May 2011, pp. 1-5 [online] [retrieved on Feb. 16, 2015]. Retrieved from the Internet: <URL: http://ieeexplore.ieee.org/xpls/abs_all.jsp?arnumber=5956426> <DOI: 10.1109/VETECS.2011.5956426>.

Nasraoui, L.; Najjar Atallah, L.; and Siala, M. "An Efficient Reduced-Complexity Two-Stage Differential Sliding Correlation Approach for OFDM Synchronization in the Multipath Channel." The 2012 Institute of Electrical and Electronics Engineers Wireless Communication and Networking Conference., Apr. 2012, pp. 2059-2063 [online] [retrieved on Feb. 16, 2015]. Retrieved from the Internet: <URL: http://ieeexplore.ieee.org/xpls/abs_all.jsp?arnumber=6214130> <DOI: 10.1109/WCNC.2012.6214130>.

Search Report issued in counterpart application No. GB1511209.7, dated Feb. 1, 2016 (3 pages).

Search Report issued in counterpart application No. GB1511208.9, dated Feb. 1, 2016 (3 pages).

Search Report issued in counterpart application No. GB1511204.8, dated Feb. 1, 2016 (3 pages).

Serant, D., et al. "Use of OFDM-based Digital TV for Ranging: Tests and Validation on Real Signals." The 5th ESA Workshop on GNSS Signals and Signal Processing (NAVITEC), Dec. 8, 2010, pp. 1-8.

* cited by examiner

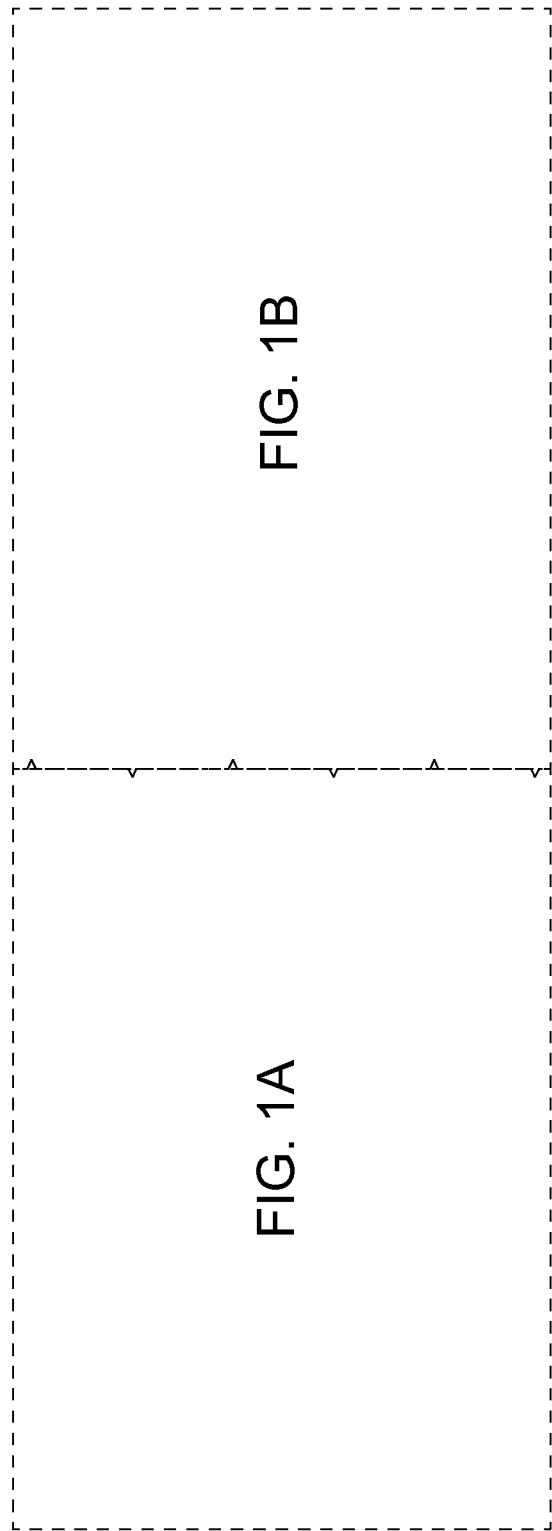

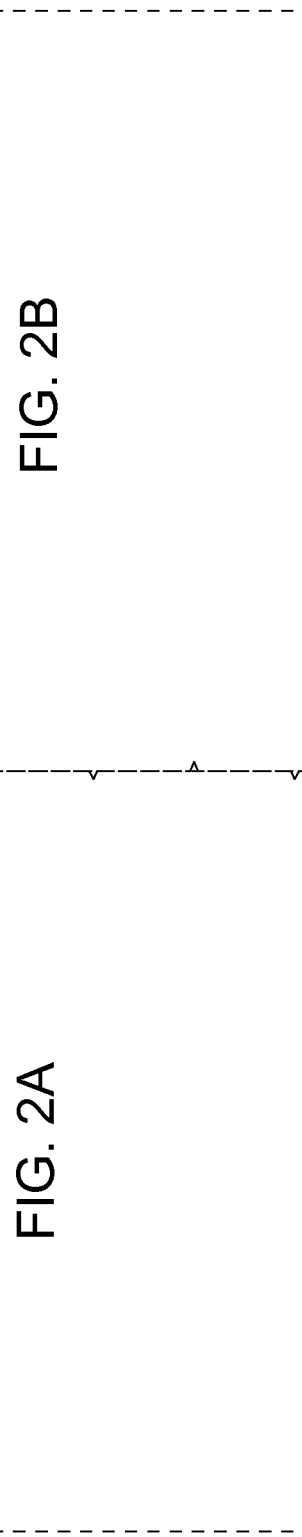

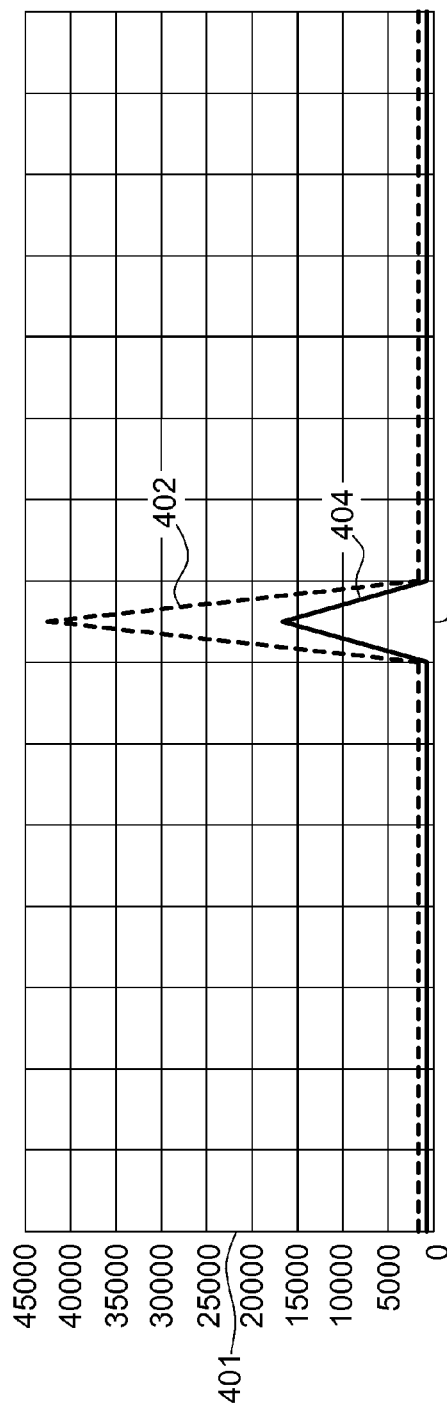
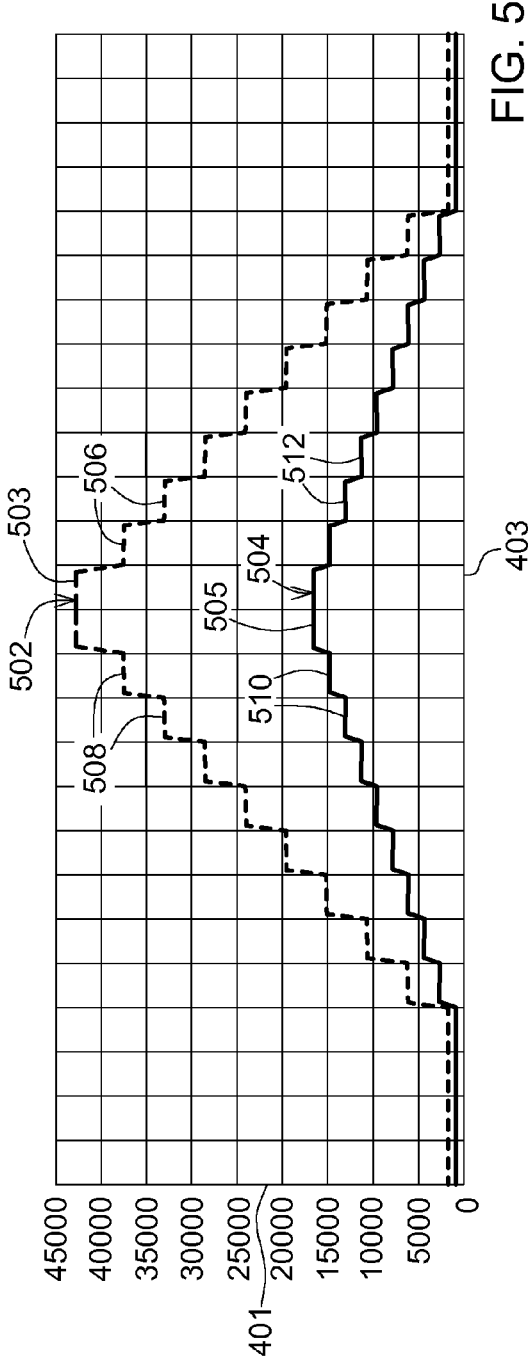

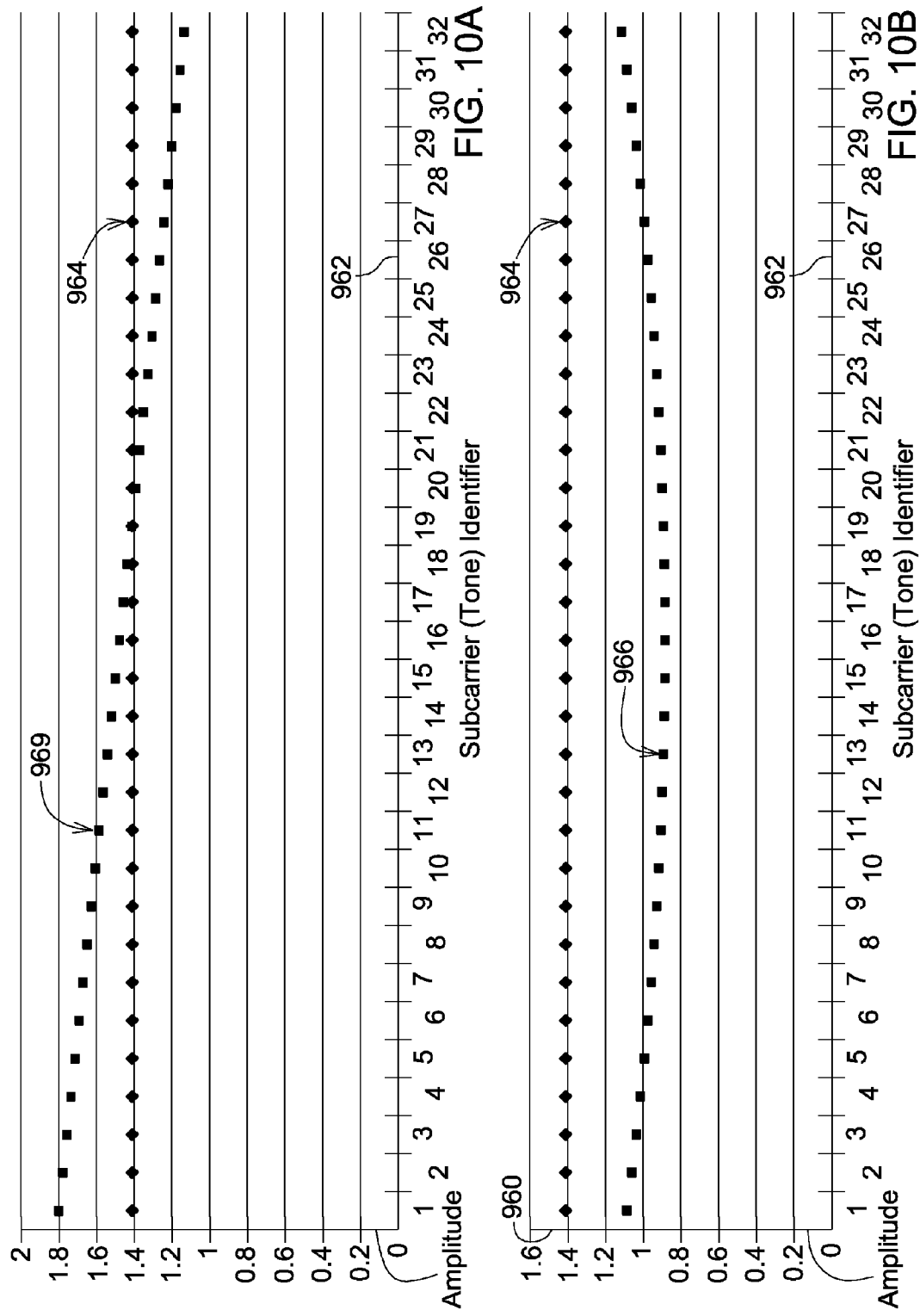

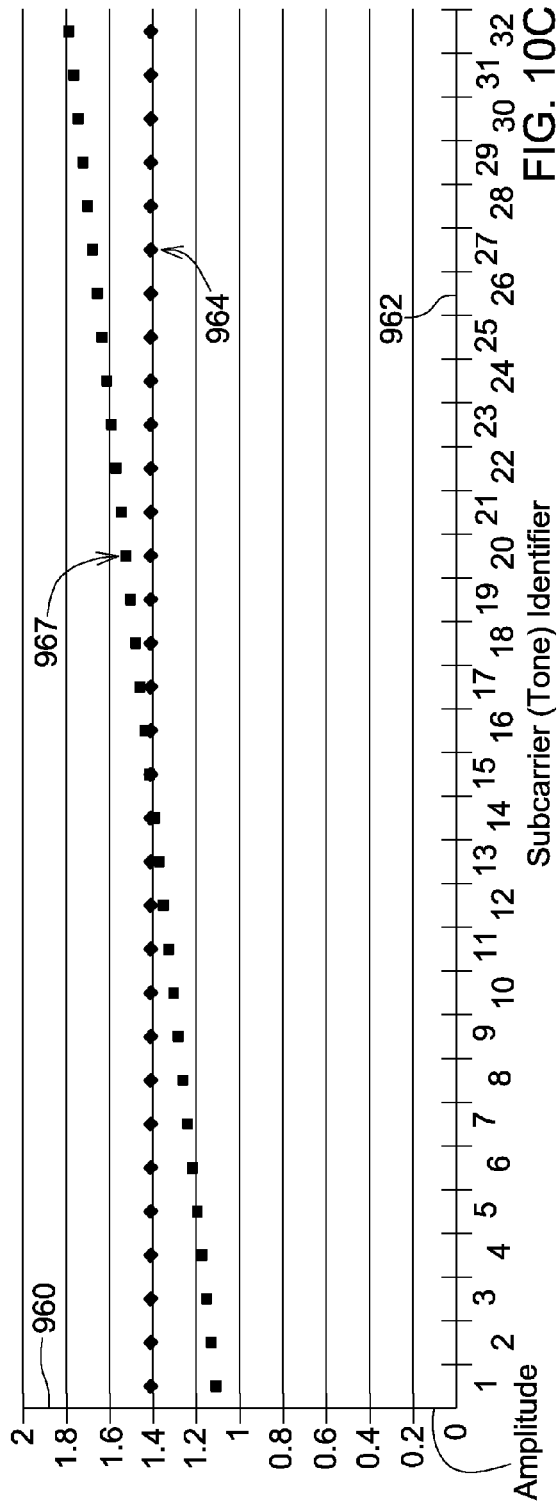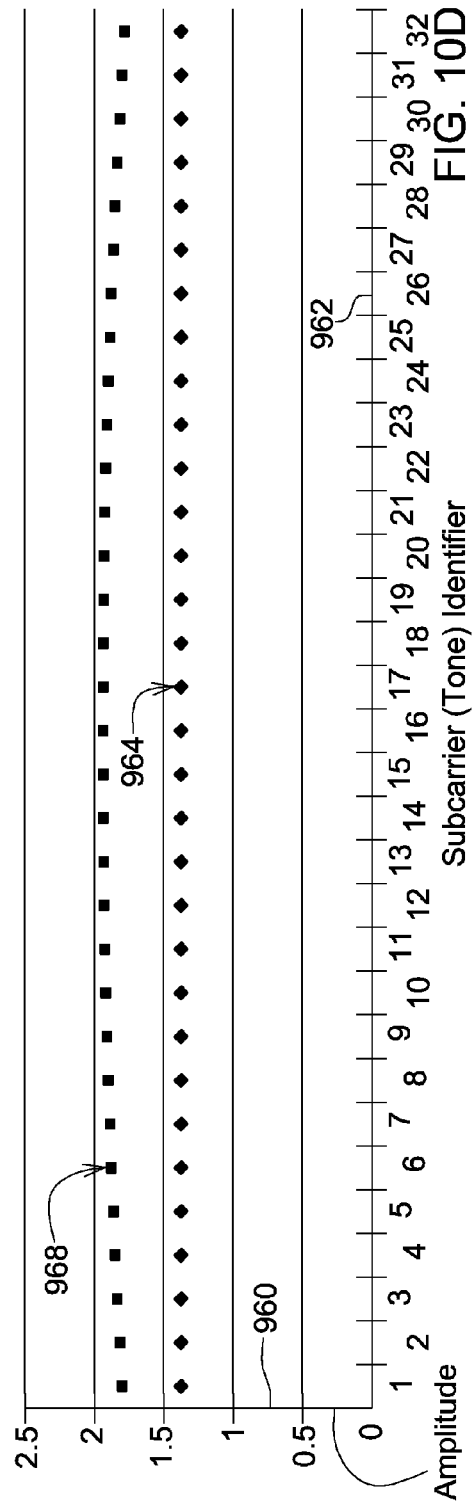

DETERMINING LOCATION OF A RECEIVER WITH A MULTI-SUBCARRIER SIGNAL

RELATED APPLICATIONS

This is a continuation of U.S. application Ser. No. 14/482, 257, filed Sep. 10, 2014, which claims priority and the benefit of the filing date based on U.S. provisional application No. 62/022,265, filed Jul. 9, 2014, under 35 U.S.C. §119 (e), where the provisional application is hereby incorporated by reference herein.

FIELD

This disclosure relates to a method and system for determining location of a receiver with a multi-carrier or multi-subcarrier signal, such as an OFDM-like signal.

BACKGROUND

The accuracy with which time of arrival of a navigation signal can be measured drives the accuracy of a navigation system. Certain prior art uses orthogonal frequency division multiplex signals for local wireless area networks, such as those that are compliant with the Institute of Electrical and Electronic Engineers (IEEE) 802.11 standard. Other prior art uses terrestrial navigation signals that mimic Global Positioning System (GPS) signals, where navigation signals are transmitted from one or more terrestrial beacons or sites with known locations. However, the terrestrial navigation signals are susceptible to multipath distortion (e.g., from ground clutter, buildings or obstructions) that impacts the accuracy of a location-determining receiver that receives the navigation signals. Thus, there is need for a method and system for determining a location of a receiver that provides superior immunity or resistance to multipath distortion and accurate location determination.

SUMMARY

In one embodiment, a method and system for determining a location of a receiver with a multi-carrier signal (e.g., multi-subcarrier signal) comprises a receiver portion for receiving a plurality of OFDM-like (e.g., orthogonal, frequency-division multiplex) multitone signals. Each OFDM-like multitone signal has subcarriers (tones) and is modulated with a pseudo-random noise code and transmitted from a transmitter with a known location. A first estimator determines a coarse estimate of a time of arrival of a set of subcarriers (e.g., one or more subcarriers) of OFDM-like multitone signals by adjusting the coarse estimate of the time of arrival in accordance with a code (first) correlation function. A second estimator determines a precise estimate of the time of arrival of the set of subcarriers of the OFDM-like multitone signals by adjusting the precise time of arrival to align the phase slope of the subcarrier phases of the OFDM-like multitone signals in accordance with a phase (second) correlation function and consistent with the coarse estimate of the time of arrival associated with the code correlation function. A data processor estimates the location of the receiver or estimated range based on the precise estimate (e.g., and phase error compensation to drive the slope of the subcarrier phases toward zero).

BRIEF DESCRIPTION OF THE DRAWINGS

FIG. 1 is a block diagram of a transmitter of a multi-carrier signal, such as an OFDM-like multi-carrier signal.

FIG. 2 is a block diagram of a receiver of a multi-carrier signal, such as an OFDM-like multi-carrier signal.

FIG. 4 is a graph of variants of first correlation function (e.g., auto-correlation function).

FIG. 5 is a graph of variants of the first correlation function shown in greater detail.

FIG. 10A is a first illustrative graph of signal amplitude versus subcarrier identifier of a direct path signal and a multipath signal.

FIG. 10B is a second illustrative graph of signal amplitude versus subcarrier identifier of a direct path signal and a multipath signal.

FIG. 10C is a third illustrative graph of signal amplitude versus subcarrier identifier of a direct path signal and a multipath signal.

FIG. 10D is a fourth illustrative graph of signal amplitude versus subcarrier identifier of a direct path signal and a multipath signal.

FIG. 13 is a flow chart of another embodiment of determining the location or range of a receiver with a multi-carrier signal with multipath compensation.

FIG. 14 is a flow chart of another embodiment of determining the location or range of a receiver with a multi-carrier signal with multipath compensation.

FIG. 15 is a flow chart of another embodiment of determining the location or range of a receiver with a multi-carrier signal with multipath compensation.

FIG. 16 is a flow chart of another embodiment of determining the location or range of a receiver with a multi-carrier signal with multipath compensation.

FIG. 18 is a flow chart of another embodiment of determining the location or range of a receiver with a multi-carrier signal to minimize or reduce the impact of multipath distortion or error.

FIG. 19 is a flow chart of another embodiment of determining the location or range of a receiver with a multi-carrier signal to minimize or reduce the impact of multipath distortion or error.

FIG. 20 is a flow chart of another embodiment of determining the location or range of a receiver with a multi-carrier signal to minimize or reduce the impact of multipath distortion or error.

DETAILED DESCRIPTION OF PREFERRED EMBODIMENT(S)

In one embodiment, a method and system for determining a location of a receiver with a multi-carrier signal comprises a receiver portion for receiving a plurality of OFDM-like multitone signals. Each OFDM-like multitone signal has subcarriers (tones) and is modulated with a pseudo-random noise code and transmitted from a transmitter with a known location. In a first tracking loop, a first estimator determines a coarse estimate of a time of arrival of a set of subcarriers (e.g., one or more subcarriers) of the OFDM-like multitone signals by adjusting the coarse estimate of the time of arrival to maximize the correlation of the received pseudo-random noise code of the at least one subcarrier with the local replica of the pseudo-random noise code in accordance with a code (first) correlation function. In a second tracking loop, a second estimator determines a precise estimate of the time of arrival of the set of subcarriers of the OFDM-like multitone signals by adjusting the precise time of arrival to align the slope of (at least two of) the subcarrier phases of the OFDM-like multitone signals in accordance with a phase (second) correlation function and consistent with the coarse estimate of the time of arrival associated with the code correlation function. A data processor estimates the location of the receiver or estimated range between the receiver and the transmitter based on the precise estimate and phase error compensation in a phase domain, a range domain, or both commensurate with driving the slope of the subcarrier phases toward zero (e.g., to compensate for phase or frequency error in the absence multipath).

Figure 1A:
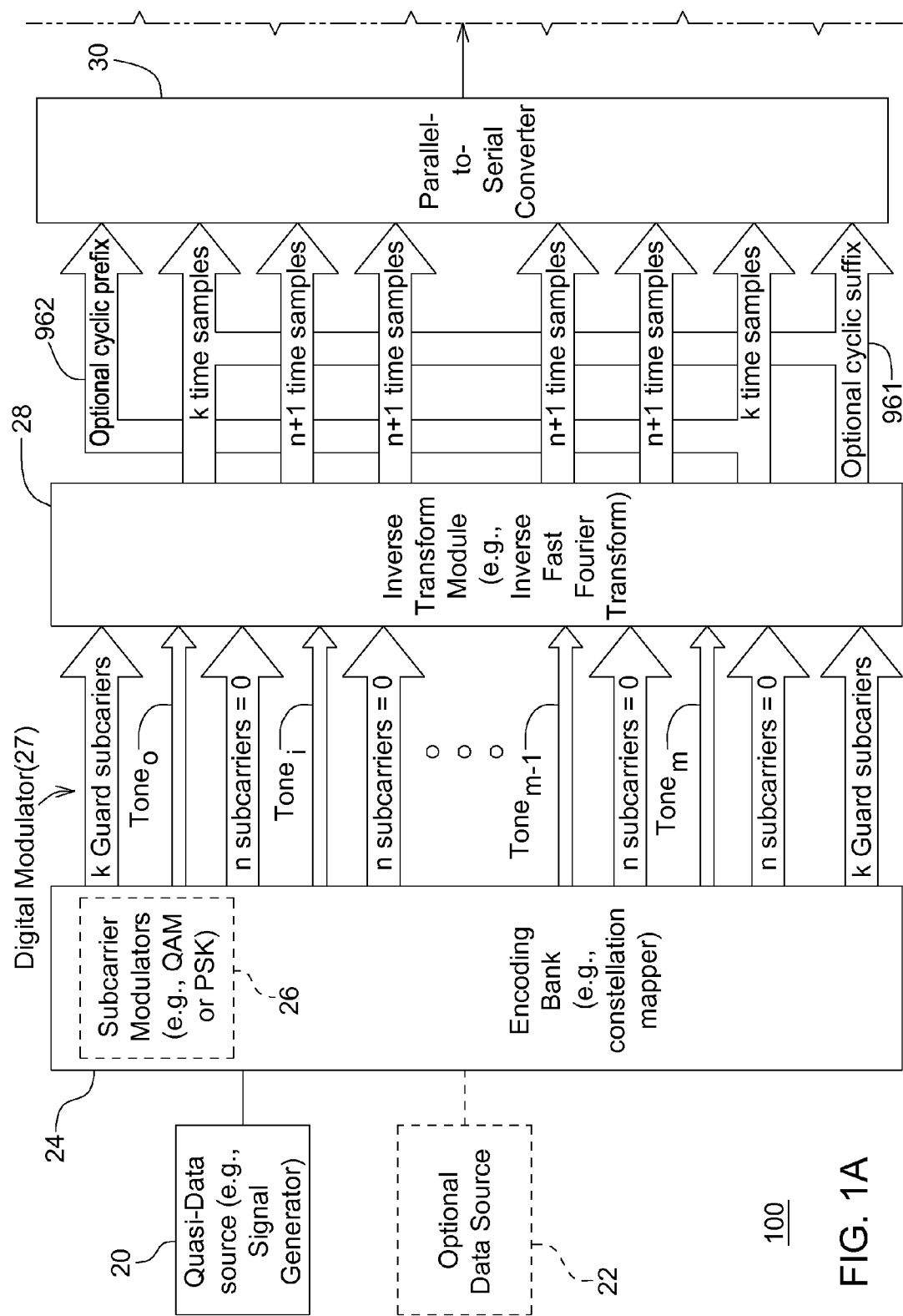
FIG. 1 refers to FIG. 1A and FIG. 1B collectively.
Figure 1B:
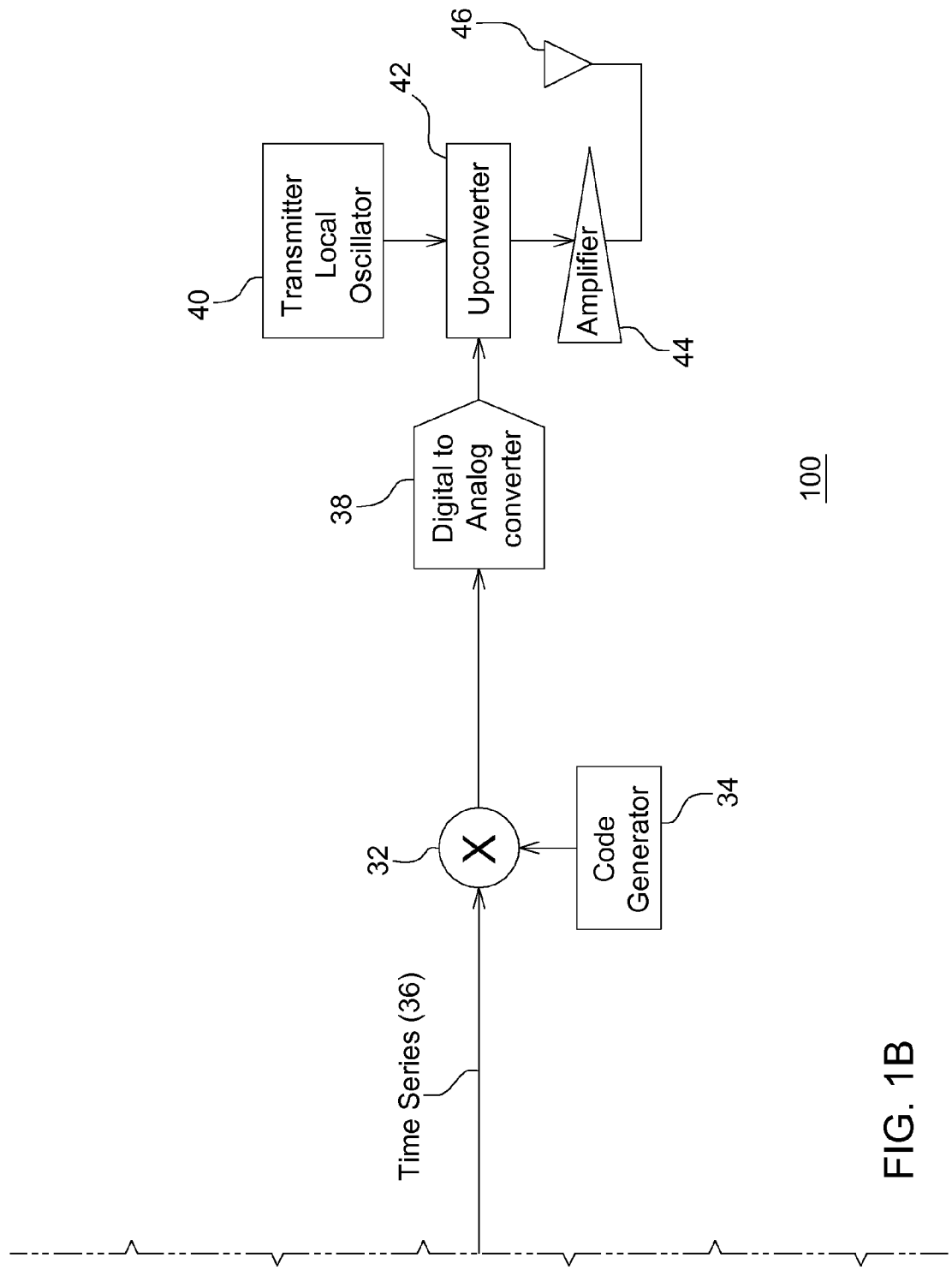

In accordance with one embodiment, FIG. 1 shows a transmitter 100 for transmitting a multi-carrier signal or OFDM-like signal. FIG. 1 includes FIG. 1A and FIG. 1B collectively. The transmitter 100 transmits an OFDM-like, multi-carrier signal that is further modulated by a ranging pseudorandom code.

The transmitter 100 is capable of transmitting an OFDM-like, multi-carrier signal with a known phase state or a known vector phase for each subcarrier (e.g., pilot tone), where the known vector phase of each ranging subcarrier is substantially fixed, individually adjustable, or generally varies in accordance with a known pattern (e.g., pilot sequence, a training sequence or randomized in accordance with a known sequence) over a time period. Here, known means that the phase state or vector phase (e.g., an initial phase state) for a corresponding subcarrier of the transmitter 100 is known at the receiver 200 (e.g., a priori or prior to reception or demodulation of any subcarrier received by the receiver 200 of FIG. 2). A ranging subcarrier means a subcarrier that is modulated by quasi-data or used for range estimation by a receiver 200, whereas a data-carrying subcarrier means a subcarrier that is used for data transmission and not for ranging, at least part of the time. A subcarrier may refer to a ranging subcarrier, a data-carrying subcarrier, or both.

For example, for any ranging subcarrier the known vector phase can be defined in the in-phase and quadrature phase plane (e.g., plane) that is associated with an in-phase vertical axis and a quadrature phase horizontal axis perpendicular to the in-phase vertical axis. Similarly, the known vector phase can be defined by equivalent complex number representations that correspond to the I-Q plane representation. In one illustrative embodiment, if each ranging subcarrier is modulated with quadrature phase shift keying (QPSK), each subcarrier may have four possible phase states for each code chip or symbol. In one embodiment, each ranging subcarrier is encoded with the same phase state, which may change for each code chip or symbol. In another embodiment, each ranging subcarrier can be modulated with a fixed phase state (e.g., distinct or not distinct from other subcarriers) that is not changed over a time period to reduce the complexity of the transmitter 100 by eliminating the inverse transform module 28 or at least some processing by the inverse transform module 28 during the time period; where a time series that the inverse transform module 28 would otherwise create is stored in data storage device (e.g., memory) of an electronic data processing system that implements a digital portion of the transmitter 100.

In certain embodiments, the phase states or known vector phases of the ranging subcarriers can be randomized in accordance with a known pattern (e.g., pseudo-random pattern) to reduce the peak-to-average power ratio of the transmitted multi-carrier signal. Further, each vector phase of each ranging subcarrier may be different from and random with respect to the vector phases of the other ranging subcarriers (e.g., that are not data-carrying subcarriers, but rather pilot subcarriers that carry quasi-data).

As illustrated in FIG. 1, quasi-data may be provided by a quasi-quasi-data source module 20 (e.g., signal generator), which is coupled to the transmitter 100 or integral with the transmitter 100. Quasi-data refers to dummy data, a training sequence, fixed data, or a pilot data pattern that is selected to modulate one or more ranging subcarrier signals with target phase states or known vector phases that are known to the receiver 200. The quasi-data source module 20 may provide or output one or more quasi-data streams or logic level signals. FIG. 1 illustrates m as a possible number of tones or subcarriers that are modulated by the quasi-data, such that up to m data streams are possible inputs to an encoding bank 24. There is no requirement that all of the subcarriers are modulated with the same quasi-data or interleaved quasi-data. In certain configurations, each quasi-data stream may be unique. Multiple quasi-data streams can directly feed the encoding bank 24.

Because the quasi-data or the corresponding phase states or vector states on each ranging subcarrier are known at the receiver, the receiver 200 can use the ranging subcarriers for determining one or more ranges between the receiver 200 and one or more transmitters 100. For example, because the quasi-data is known at the receiver 200, the transmitted pseudo-random noise code can be correlated readily with the local replica of the pseudo-random noise code at the receiver. To the extent the phase state vectors are known at the receiver 200, the received phase state vectors can be compared to ideal phase state vectors (e.g., for QPSK states) in the I/Q plane to correct for phase noise or distortion. A data-carrying subcarrier is not used for any ranging (calculation) or phase quality detection because the receiver 200 does not know (a priori) what the observed phase vector should be. The data transmission of any data-carrying subcarrier is optional and does usually not support the ranging, range or position estimation of the receiver 200 in certain embodiments, unless the data transmission is used to transmit new data patterns or new sequences of the known phase vectors for alignment at the transmitter 100 and the receiver 200.

In an alternate embodiment, an optional data source 22 may comprise ranging data or navigation data that modulates one or more data-carrying subcarriers that are not modulated with the quasi-data on a dedicated basis or for some allocated time period. FIG. 1 illustrates n total subcarriers that are set to zero and possibly available for data-carrying as one or more data-carrying subcarriers. The ranging data or navigation data can be used by a location-determining receiver 200, such as the receiver 200 of FIG. 2. The ranging data or navigation data may modulate a subcarrier with any type of suitable modulation, such as phase shift keying (PSK) or quadrature amplitude modulation (QAM), that is compatible with the OFDM-like multi-carrier signal. In FIG. 1, the optional data source 22 is illustrated in dashed lines because it is optional and may be deleted in certain configurations where data is not transmitted from the transmitter 100 to a receiver 200.

The digital modulator 27 may comprise, collectively, the quasi-data source module 20, the encoding bank 24, the inverse transform module 28, and the parallel-to-serial converter 30. Although the optional cyclic prefix 962 and the optional cyclic suffix 961 are illustrated in FIG. 1, the cyclic prefix 962 and the cyclic suffix 961 may be deleted in certain embodiments if circular convolution issues can be ignored. The data augmentation or appending, with the cyclic prefix 962 and cyclic suffix 961, provide for valid circular convolution results not degraded by adjacent pseudo noise code polarities. In one embodiment, the encoding bank 24 comprises one or more of the following components: (1) one or more signal generators for generating a set of subcarrier signals that are spaced apart by a target or desired frequency spacing (e.g., bin spacing), (2) a set of subcarrier modulators 26 that modulates each subcarrier with a corresponding quasi-data output stream of the quasi-data source module 20 or a combination of the quasi-data output stream pf the quasi-data source module 20 and an optional data source 22, and (3) a constellation mapper.

In one configuration, each subcarrier modulator 28 may comprise a phase shift keying (PSK) modulator, a quadrature phase shift keying (QPSK) modulator, a quadrature amplitude modulator (QAM), or another suitable modulator. For example, for quasi-data, each ranging subcarrier may use a respective QPSK modulator, whereas for any data-carrying subcarrier, any suitable modulator may be used. For each inputted data stream or quasi-data stream, the encoding bank 24 or subcarrier modulators 26 can modulate each subcarrier at a corresponding data rate or quasi-data rate (e.g., generally uniform data rate).

In an alternate embodiment, the inverse transform module 28 performs phase modulation (e.g., QPSK modulation) for the quasi-data such that one or more subcarrier modulators 26 can be omitted.

In one embodiment, the encoding bank 24 acts as a constellation mapper to map in-phase and quadrature data representations of each inputted quasi-data stream (e.g., among the streams that are inputted to the encoding bank 24) to corresponding subcarriers. In an alternate embodiment, the constellation mapper also maps the data from the optional data source 22 to a data-carrying subcarrier or sacrificial subcarrier.

The subcarriers or tones of the encoding bank 24 are inputted to an inverse transform module 28 (e.g., inverse fast Fourier transform (IFFT) module). Each subcarrier signal may be modeled as a complex input that is individually settable, adjustable, dynamically changed, or fixed for input to each bin of the inverse transform module 28. For example, each subcarrier can be modeled as a complex input with a real and imaginary component, consistent with the I-Q vector plane. For example, if the encoding bank 26 uses a subcarrier modulator 26 such as a QPSK modulator, then each subcarrier can have any of the following phase states or known phase vectors in the I-Q vector plane: (1,1), (1−1), (−1,1) and (−1,−1). The inverse transform module 28 converts the subcarrier signals (tones) and quasi-data (collectively called modulated subcarrier signals) from the frequency domain into time domain samples for processing. Further, the inverse transform module 28 may derive cyclic prefixes, cyclic suffixes or both for appending to the time domain samples to construct an appropriate baseband signal that is conveniently decoded at the receiver 200.

The inverse transform module 28 communicates to parallel-to-serial converter 30. The parallel-to serial converter 30 accepts the parallel input of multiple time domain samples (e.g., appended with cyclic prefixes, suffixes or both) and outputs an aggregate time series 36 or aggregate baseband signal.

The parallel-to-serial converter 30 provides the aggregate baseband signal to a first input of a mixer 32. A code generator 34 generates a pseudo-random code or pseudo-random noise code. The content or sequence of pseudo-random code 34 or pseudo-random noise code is generally known at the transmitter 100 and receiver 200. The code generator 34 provides a second input to the mixer 32. An output of the mixer 32 is fed to digital-to-analog converter 38.

From the digital-to-analog converter 38, the analog baseband signal is fed to an upconverter 42. The upconverter 42 converts the baseband signal to a radio frequency, microwave frequency signal, or another electromagnetic signal for transmission to one or more receivers 200. In one embodiment, the upconverter 42 comprises a mixer or multiplier. In an alternate embodiment, the upconverter 42 comprises multiple stages of mixers or multipliers in series. The upconverter 42, or its mixer, has an input for a transmitter local oscillator 40 to upconvert the signal to an electromagnetic signal at the desired frequency for wireless transmission. The electromagnetic signal includes subcarrier frequencies for tones of the transmitted OFDM-like signal.

An amplifier 44 may comprise a radio frequency power amplifier, a microwave amplifier, or another amplifier for amplifying the electromagnetic signal for or prior to wireless transmission. The input of the amplifier 44 is coupled to the upconverter 42 and the output is coupled to an antenna 46 for transmitting the OFDM-like signal to one or more receivers 200, such as a the location-determining receiver 200 of FIG. 2. In practice, one or more filters (e.g., passband filter) may be used in conjunction with the amplifier 44 or upconverter 42, for example.

The transmitter 100 transmits pilot tones or ranging subcarriers that are modulated with quasi-data to produce an OFDM-like multi-carrier signal. In one embodiment, the multi-carrier signal or OFDM-like signal has pilot tones dispersed through its spectrum with known phase and amplitude at the time of transmission. For example, a pilot tone refers to one or more ranging subcarriers of the OFDM-like signal that carries one or more pilot signals (e.g., training sequences, preambles, known sequence of symbols) for measurement of the channel propagation conditions, such as measurement of phase shift (e.g., from multipath) for each ranging sub-carrier or measurement of phase slope between two or more ranging subcarriers. The phase and amplitude of the transmitted signal can be impacted by the propagation path or multipath reception between the transmitter 100 and the receiver 200, among other things.

In one embodiment, a receiver 200 is enabled to receive (e.g., simultaneously) multiple OFDM signals from different transmitters 100 (e.g., three or more transmitters) 100 to establish the position, location, attitude (e.g., roll, tilt, yaw) or geographic coordinates of the receiver 200 in two or more dimensions (e.g., three dimensions). To facilitate the receiver 200 discrimination between different received OFDM-like signals, the encoding bank 24 should not place the pilot tones adjacent to each other, but should separate the pilot tones by some minimum number (n) of frequency bins, where a frequency bin is the fundamental spacing of the IFFT signal generation that is common to all OFDM communication systems. The above frequency spacing facilitates reuse of the same demodulation hardware within the same frequency spectrum in each receiver 200. Accordingly, uniform spacing of the pilot tones across the band, such as by n frequency bins, provides simplified demodulation/measurement process, although other non-uniform spacing may be used for the pilot tones in any alternate embodiments.

In FIG. 1, the frequency domain representation of the signal is transformed into a time domain series using an inverse FFT (e.g., by inverse FFT module 28). The inverse FFT is commonly used for OFDM transmitters 100, for example. At the output of the IFFT module 28, the resulting time series 36 is augmented by the parallel-to-series converter 30. The parallel-to-series converter 30 can support augmentation of the time series 36 by a cyclic prefix 962, as is common in OFDM systems, by affixing a small segment of the ending time series 36 to the beginning of the time series 36. In addition, the parallel-to-series converter 30 can add a cyclic suffix 961 by affixing a small segment of the beginning of the un-augmented time series 36 to the end of the augmented time series 36. At the mixer 32, in one configuration the resulting time series 36 is then modulated by a ranging pseudorandom code that has a basic chip rate that is the same as the augmented symbol rate of the tones or tone modulation (e.g., by quasi-data).

As shown, the parallel-to-serial converter 30 may comprise N input parallel converter, where N is a whole number, where N=(m+j)(n+1) and where j=2k/(n+1), where m is the number of ranging carriers or pilot tones, j is an integer, k is an integer number of time samples, which is proportional to a length of the optional cyclic prefix and cyclic suffix, n is the number of data-carrying subcarriers that can be reserved for data transmission or left empty without any modulated data to support co-frequency transmissions from other transmitters 100, and n+1 is a number of subcarriers of which 1 is a tone or ranging subcarrier and the other n subcarriers are blank to facilitate the addition of other ranging beacons. Although the parallel-to-serial converter 30 comprises an N input parallel-to-serial converter, any other suitable parallel-to-serial converter 30 falls within the scope of this document.

The block diagram of FIG. 1 merely illustrates one possible configuration for implementing a transmitter 100; others can be envisioned. For example, the transmitter 100 of FIG. 1 can carry data using one or more data-carrying subcarriers (e.g., n data-carrying subcarriers) shown as being set to zero. However, in one embodiment the n data-carrying subcarriers that are set to zero have no modulating data (e.g., payload) and may support instead the transmission (e.g., co-frequency transmission) of ranging subcarriers of one or more other transmitters 100 for reception at a single receiver 200. Recall that the n data-carrying subcarriers can be offset by a fixed number of frequency bins from the ranging subcarrier frequency bins for reception at a receiver 200. Accordingly, if co-frequency transmission of other transmitters 100 is supported, the capacity of the data-carrying subcarriers may be limited to some maximum number less than n, even if n subcarriers are set to zero.

In an alternate embodiment, if the system (e.g., transmitters 100 and receiver 200 collectively) will not be required to transmit or carry any changing data or any changing quasi-data (e.g., resulting in a pattern, training sequence, or sequence of target phase states), the time series 36 represented by the output of the parallel-to-serial converter 30 never changes; hence, could be stored in memory (e.g., nonvolatile electronic memory or another data storage device) rather than reconstructed each time using an IFFT module 28. Accordingly, in such an alternate embodiment, the combination of the IFFT module 28 and the parallel-to-serial converter 30 can be replaced with a data storage device (e.g., electronic memory or a series of shift registers) and a data processor that is capable of storing, retrieving, or generating a repetitive code or fixed data set.

Figure 2A:
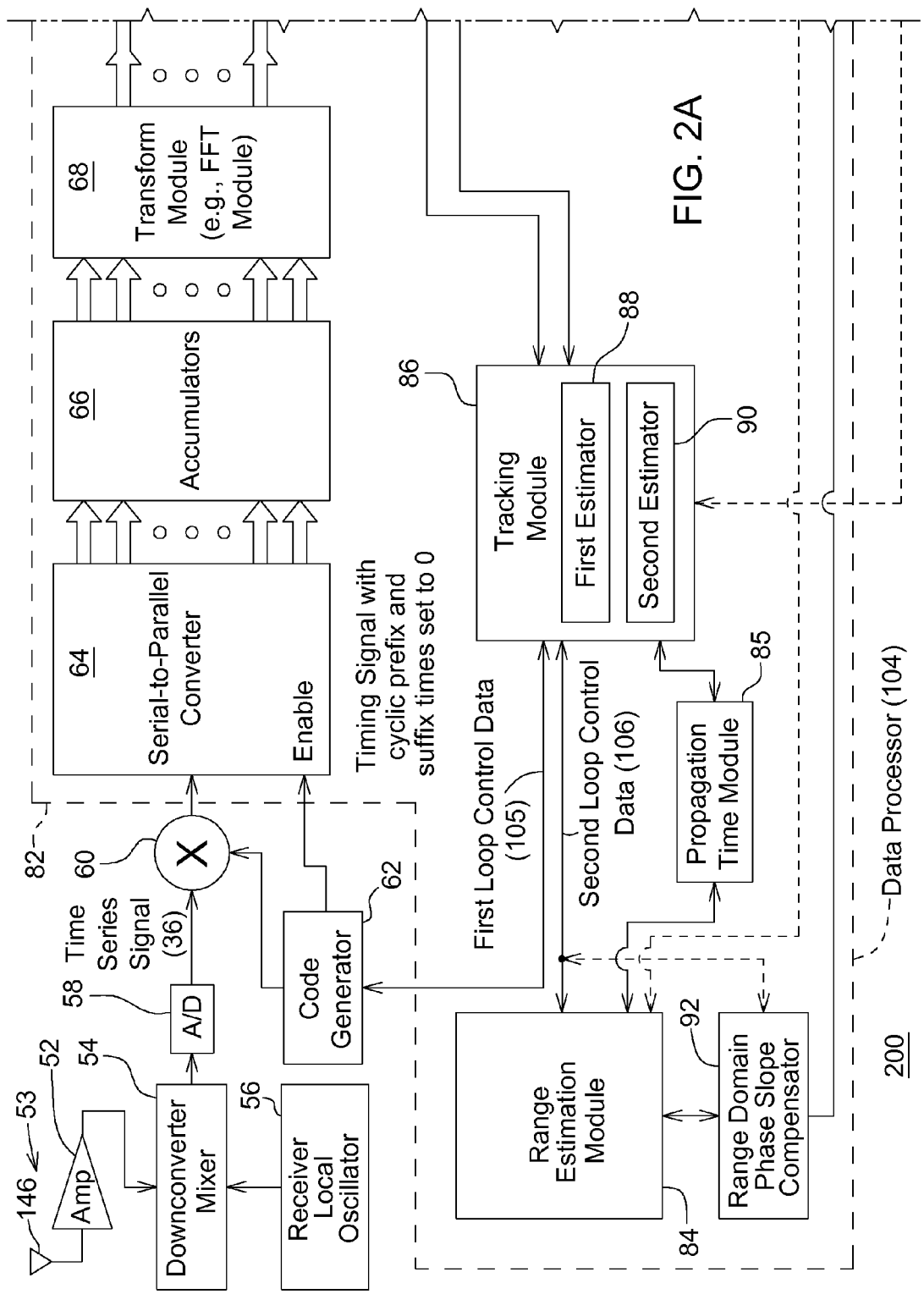
FIG. 2 refers to FIG. 2A and FIG. 2B collectively.
Figure 2B:
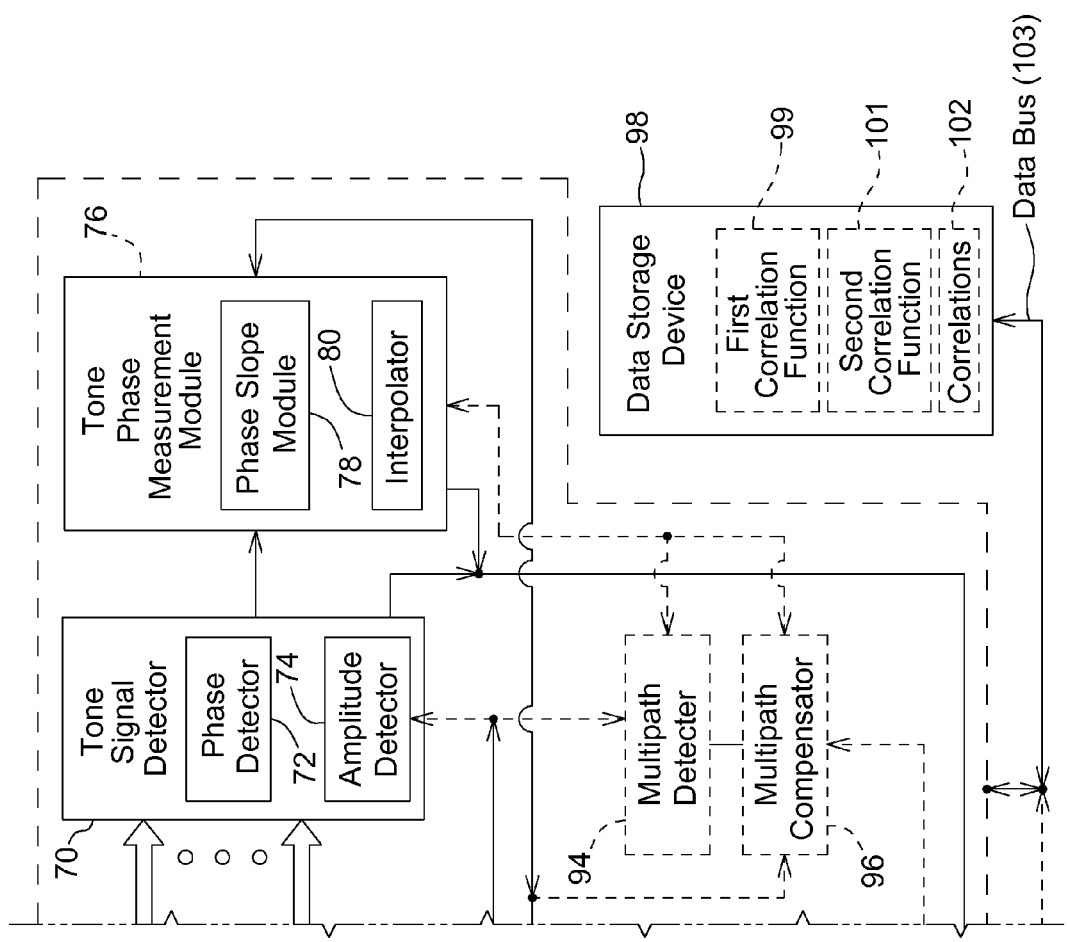

FIG. 2 discloses a receiver 200 for receiving a multi-carrier signal for navigation or location determination. FIG. 2 includes FIG. 2A and FIG. 2B, collectively. The receiver 200 comprises a receiver front end 53 coupled to a data processor 104. In turn, the data processor 104 can communicate with a data storage device 98 (e.g., memory) via one or more data buses 103. In one embodiment, a digital baseband portion 82 comprises the data processor 104, one or more data buses 103, and the data storage device 98. The data processor 104 may comprise an electronic data processor, a programmable logic array (PLA), a microprocessor, a microcontroller, an application specific integrated circuit (ASIC), a digital signal processor (DSP), an arithmetic logic unit, a Boolean logic circuit, or any other data processing device. The data storage device 98 may comprise nonvolatile electronic memory, electronic memory, a magnetic storage device, an optical storage device, or any other suitable data storage device. As used throughout this document, in certain embodiments the data processor 104 may comprise one or more of the blocks or modules within the dashed lines of FIG. 2, such as the tone signal detector 70, a tone phase measurement module 76, a multipath detector 94, a multipath compensator 96, a tracking module 86, a propagation time module 85, a range-domain, phase-slope compensator 92 and a range estimation module 84.

As illustrated in FIG. 1, and FIG. 2, the data paths that interconnect the blocks, modules and components may comprise physical data paths or virtual data paths, or both, where physical data paths means conductors, transmissions lines, cables or electromagnetic communication paths, and where virtual data paths means communication between software components, modules, libraries, data sets, or other electronic data. The modules, blocks and components may comprise hardware, software instructions or both. For example, dedicated hardware (e.g., an ASIC or DSP) can be substituted for or realized as software instructions (e.g., in the data storage device 98) executed by a general purpose computer or data processor (104).

Figure 3:
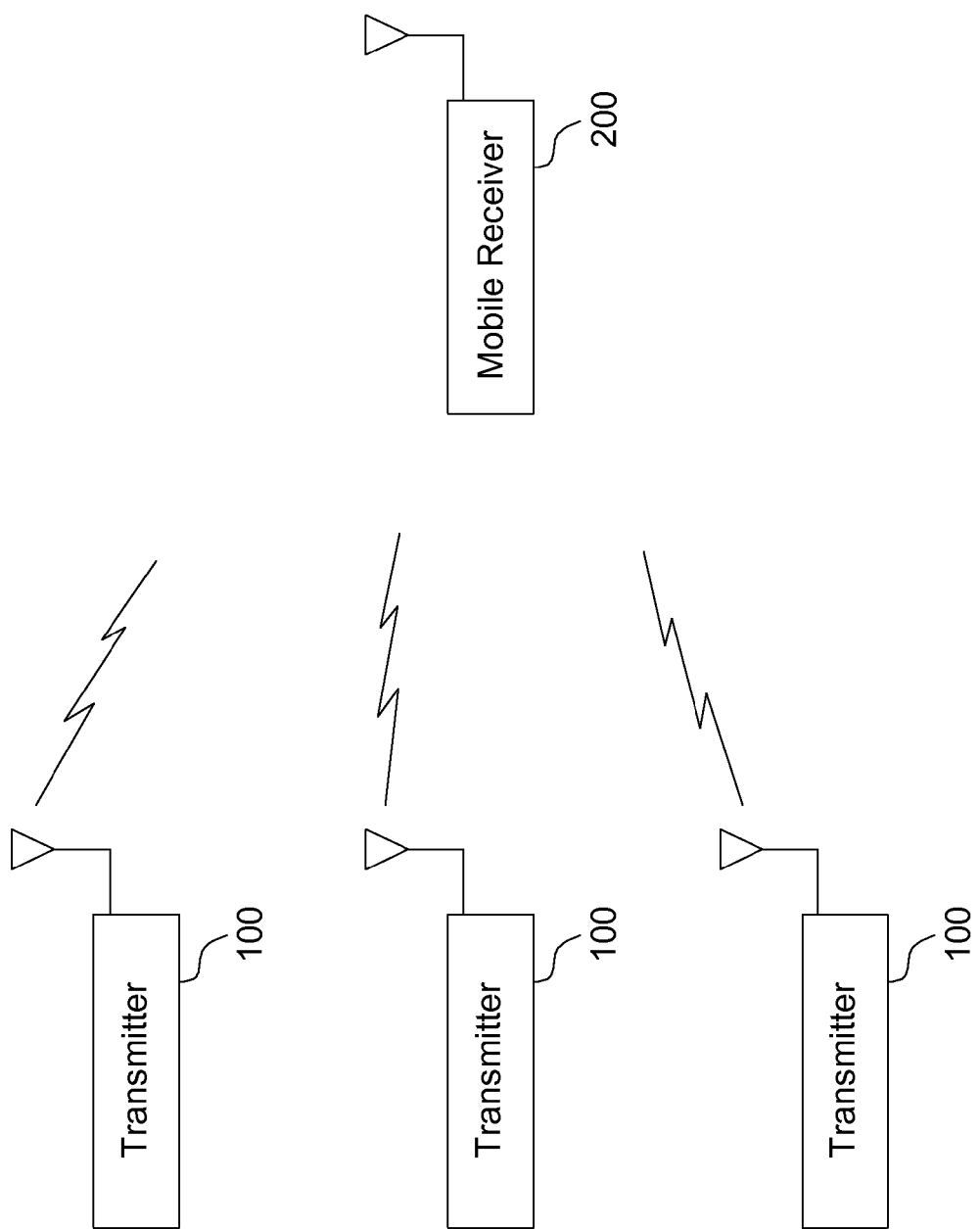
FIG. 3 is a block diagram of a group of transmitters and a receiver of a multi-carrier signal consistent with FIG. 1 and FIG. 2.

To determine its location, the receiver 200 needs to receive transmitted OFDM-like multitone signals from three or more transmitters 100, such as transmitters 100 similar to the transmitter 100 of FIG. 1. FIG. 3 provides an illustrative example of a receiver 200 receiving signals from multiple transmitters 100. Each OFDM-like multitone signal has ranging subcarriers (tones) and is modulated with a pseudo-random noise code and transmitted from a transmitter 100 with a known location or reference location.

In FIG. 2, the receiver 200 comprises a receiver front end 53. In FIG. 2, the receiver front end 53 or another receiver portion receives a plurality of OFDM-like multitone signals. The receiver front end 53 comprises an antenna 146 coupled to an amplifier 52. An amplifier 52 is coupled to a downconverter mixer 54. The downconverter mixer 54 receives an input signal from a receiver local oscillator 56 and outputs an analog intermediate frequency signal or an analog baseband signal. The analog-to-digital converter 58 converts the analog intermediate frequency (IF) signal or the analog baseband signal to a digital IF or a digital baseband, where the baseband or IF signal can be described as a time series signal 36 or time series.

The baseband or IF signal and a pseudo-random noise (PN) code signal are inputted into a mixer 60. At the mixer 60, the received PN code on the baseband or IF signal is correlated with and temporally aligned with the locally generated replica of the PN code from code generator 62 to remove or strip the PN code from the baseband or IF signal. The modulated IF or baseband signal has the PN code removed or stripped from the baseband or IF signal, such that any encoded information remains on the modulated IF or baseband signal.

The mixer 60 outputs a modulated IF or modulated baseband signal to a serial-to-parallel converter 64. As shown, the serial-to-parallel converter 64 may comprise N stage serial-to-parallel converter, where N is a whole number, where $N=(m+j)(n+1)$ and where $j=2k/(n+1)$, where m is the number of ranging subcarriers or pilot tones, n is the number of data-carrying subcarriers or empty subcarriers, and k is an integer number of guard subcarriers or time samples outputted by transform module 68 of transmitter 100 or inputted to the parallel-to-serial converter 64 of transmitter 100, although any other suitable serial-to-parallel converter 64 falls within the scope of this document.

The serial-to-parallel converter 64 communicates with a set of accumulators 66 or other data storage device for storing the parallel data outputted by the serial-to-parallel converter 64. In one embodiment, the number (N) of accumulators 66 is approximately (m+j) accumulators. The accumulators 66 are capable of communication with a transform module 68 (e.g., Fast Fourier transform (FFT) module) that transforms the data from a time domain representation to a frequency domain representation for further processing. In one embodiment, the transform module 68 (e.g., FFT transform module) comprises multipoint or N point FFT module, where $N=(m+j)(n+1)$. The output of the transform module 68 (e.g., FFT transform module) is coupled to an input of a tone signal detector 70.

The tone signal detector 70 may comprise a phase detector 72 and an amplitude detector 74 that detects the phase of each received subcarrier (e.g., ranging carrier, tone or pilot tone) and the amplitude of each received subcarrier or tone (e.g., pilot tone), respectively, for a given sampling interval. The tone signal detector 70 is adapted to communicate with one or more of the following modules or components: the tone phase measurement module 76, the tracking module 86, and the range-domain phase compensator 92.

A tone phase measurement module 76 is capable of communicating with one or more of the following components: the tone signal detector 70, the tracking module 86, and the range-domain phase compensator 92. In an alternate embodiment, the tone phase measurement module 76 is capable of communicating with one or more of the following components: the tone signal detector 70, the tracking module 86, the range-domain phase compensator 92, the multipath detector 94, and the multipath compensator 96. The multipath detector 94 and the multipath compensator 96 are indicated in dashed lines because they are optional and may be omitted in certain embodiments.

The tone phase measurement module 76 comprises a phase slope module 78 and an interpolator 80. The phase slope module 78 measures a first phase of a first pilot tone (or first ranging subcarrier) and a second phase of a second pilot tone (or second ranging subcarrier) separated in frequency from the first pilot tone (or first ranging subcarrier) by a known frequency separation. For example, the first pilot tone and a second pilot tone may comprise outer or outermost frequency pilot tones (outermost ranging subcarriers) of the OFDM-like signal, or any other two tones or subcarriers (e.g., ranging subcarriers) within the OFDM-like signal that are separated by a known frequency separation. The phase slope module 78 determines a phase slope or the slope of the phases between the first pilot tone phase and the second pilot tone phase, or between any at least two ranging subcarriers. The phase slope module 78 does not use or filters out any data carrying subcarriers in the estimation of the phase slope because the phase of the data carrying subcarriers depends upon the data modulation and not any phase distortion from propagation or multipath.

In various embodiments of the method and receiver 200 set forth in this document, the prerequisite for the range measurement technique and the multipath mitigation techniques is that the vector phase of the transmitted tones (ranging subcarriers) are a priori known by the receiver 200, such as by storage in the data storage device 98. The fine range measurement is achieved by measuring an observed phase slope of the received tones (derived from phase of two or more ranging subcarriers) with respect to a reference phase slope derived from the a priori known phase of transmission of the OFDM-like signal.

In one embodiment, the interpolator 80 or interpolation module can estimate the observed slope of the phase of the other pilot tones (e.g., inner tones between the outer pilot tones in frequency) based on interpolation. In an alternate embodiment, separately or cumulatively with the interpolation, linear regression or least squares analysis may be used to estimate the phase slope of the received OFDM-like signal. To measure the observed slope at least two data points (e.g., a set of at least two observed phases of ranging subcarriers) are needed, the more data points available improves the measurement sign-to-noise ratio (SNR). In the phase error function, the phase slope ambiguity is a function of the tone frequency spacing between the observed phases of ranging subcarriers. If the tone frequency spacing is too large, the number of potential zero points increases (e.g., which leads to possible ambiguities in observed phase slope). Accordingly, there is a lower reasonable limit (probably much greater than two) for the number of tones (ranging subcarriers) used to measure the observed phase slope.

The phase slope may be caused by one or more of the following, among other factors: (1) a frequency or phase difference between the receiver local oscillator 56 (e.g., of FIG. 2) and any transmitter local oscillator 40 (e.g., of FIG. 1), (2) uncompensated Doppler frequency shift in the frequency of the received OFDM-like signal because of relative movement of the location-determining receiver 200 with respect to the transmitter 100 or transmitting beacon, (3) multipath signals associated with received OFDM-like signal or received by the receiver 200, or (4) other sources of phase or frequency error in the receiver 200 hardware (e.g., analog-to-digital conversion).

In an alternate embodiment of the transmitter 100, the phase difference between received tones can be reduced or minimized if the transmitter 100 is configured to or adapted to omit the cyclic prefix and the cyclic suffix of the OFDM-like signal and if the transform module 68 (e.g., FFT transform module) of the receiver is synchronized with the coherence interval, as explained later.

In an alternate embodiment of the receiver 200, the optional multipath detector 94 and the optional (complex-plane) multipath compensator 96 (and their respective communication paths, such as virtual or physical communication paths) are shown in dashed lines to indicate that the optional multipath detector 94 and the optional multipath compensator 96 are optional and can be deleted in alternate embodiments. In one embodiment, the optional multipath detector 94 detects the presence or absence of multipath signal in the received OFDM-like signal based on analysis of one or more ranging subcarriers, or the phase slope of two or more ranging subcarriers, in a phase domain. As used in this document, the phase domain shall mean vector space or the complex plane (e.g., IQ (in-phase and quadrature-phase plane signal representation) of one or more ranging subcarriers or pilot tones, which contains information both on the amplitude and phase of each ranging subcarrier. The optional multipath detector 94 can detect the presence or absence of multipath distortion in the received OFDM-like signal based on one or more of the following: the phase slope from the phase slope module 78, interpolated phase slope from the interpolator 80, the phase detector output data from the phase detector 72, or amplitude detector output data from the amplitude detector 74. If multipath distortion is detected, the optional multipath detector 94 may trigger or control the multipath compensator 96 to compensate for the multipath distortion or may send a multipath-related data message to another module of the data processor 104 (e.g., second estimator 90).

In an alternate embodiment of the receiver 200, in the phase domain (e.g., complex plane or IQ plane) the multipath compensator 96 may optionally apply a phase compensation or adjustment to each subcarrier or pilot tone to approach a reference slope of the phases or a target slope of the phases (e.g., flat slope or approximately zero slope, consistent with the absence of a multipath signal); the reference slope or the target slope may be stored and retrieved from data storage, such as the data storage device 98 based on the a priori known phases of the ranging subcarriers that is transmitted from each transmitter 100. In one such alternate embodiment, the multipath compensator 96 may apply the phase compensation to each pilot tone or subcarrier at a rate equal to or greater than the symbol rate (e.g., of the quasi-data) in an attempt to drive the phase slope to the target slope (e.g., zero slope). However, if the multipath detector 94, the multipath compensator 96, or both are not used in a configuration, then the second estimator 90 in conjunction with the range estimation module 84 or the range domain phase slope compensator 92 can compensate for multipath or phase slope deviation from a reference phase slope or a target phase slope (e.g., approximately zero phase slope). Further, in certain configurations, the range domain phase slope compensator 92 may be the first, preemptive, dominant or only process that is applied to compensate for multipath or phase slope deviation from the target phase slope.

The tone signal detector 70, the tone phase measurement module 76, or the multipath compensator 96, or any combination of the above components, provide data to the tracking module 86. In one embodiment, the tracking module 86 comprises a first estimator 88 and a second estimator 90. In a first tracking loop, a first estimator 88 determines a coarse estimate of a time of arrival of a set of subcarriers (e.g., at least one subcarrier) of the OFDM-like multitone signals by adjusting the coarse estimate of the time of arrival of a set of to maximize the correlation of the received pseudo-random noise code of the set (e.g., of at least one subcarrier) with the locally generated replica of the pseudo-random noise (PN) code by the code generator 62 in accordance with a code (first) correlation function. For example, the first estimator 88 and first loop control data 105 may adjust the timing of an early, prompt or late replica generated by the code generator 62. The first loop control data 105 can shift the time or phase of the replica generated by the code generator 62, such as via shift registers, a clock signal or another mechanism to adjust the time or phase of replica of the PN code with respect to the received signal or time series signal 36.

The first estimator 88 may communicate with the data storage device 98 or accumulators 66 to store, retrieve or process accumulations or correlations 102 stored within the data storage device 98 or the accumulators 66. When the receiver 200 is properly receiving the received OFDM-like signal (e.g., in a phase synchronized manner), certain accumulations or correlations 102 will conform to the first correlation function 99, which will be described later in greater detail in conjunction with FIG. 4. In one configuration, the data storage device 98 may be used to implement the accumulators 66, such that correlations 102 or accumulations are stored in the data storage device and are accessible to the transform module 68 (e.g., FFT transform module).

In a second tracking loop, a second estimator 90 determines a precise estimate of the time of arrival of at least one subcarrier of the OFDM-like multitone signals by adjusting the precise time of arrival to align the slope of at least two of the ranging subcarrier phases (e.g., or the second of subcarriers) of the OFDM-like multitone signals in accordance with a phase (second) correlation function and consistent with the coarse estimate of the time of arrival associated with the code correlation function. The phase (second) correlation function is described in more detail in conjunction with FIG. 8. In one configuration, second estimator 90 may communicate with the data storage device 98 (e.g., memory) to access, retrieve or process accumulations or correlations that conform to a second correlation function 101 that is stored within the data storage device 98.

In one embodiment, the tracking module 86 is capable of communicating with one or more of the following modules: a range estimation module 84, the code generator 62, the range-domain phase compensator 92, and the (phase-domain) multipath compensator 96. For example, in accordance with the second tracking loop the second estimator 90 sends second loop control data 106 to the range estimation module 84, the range domain phase compensator 92, or both to compensate for multipath distortion or phase slope deviation from a reference phase slope or target phase slope (e.g., approximately zero phase slope) by adjusting the range estimates.

The tracking module 86 also provides output data to the propagation time module 85. For example, the tracking module 86 outputs data that is consistent with the first loop control data 105, the second loop control data 106, or both to the propagation time module 85. In one configuration, the propagation time module 85 estimates one or more propagation times between the receiver 200 and one or more transmitters 100 based on reception of the ranging information in the received multi-carrier signal.

The range estimation module 84 converts the detected time of arrival of received signal into ranges (e.g., distances) between receiver 200 and the transmitter 100. For example, the range estimation module 84 or a data processor 104 estimates the location of the receiver 200 or estimated range between the receiver 200 and the transmitter 100 (or between the receiver 200 and multiple transmitters 100) based on the precise estimate and phase error compensation in a range domain commensurate with driving the slope of the subcarrier phases toward a target slope (e.g., zero slope in the absence of multipath). To estimate a precise position or location of the receiver 200, the receiver 200 determines ranges between the receiver 200 and at least three transmitters 100.

The receiver 200 can estimate the precise position or location where the ranges (e.g., curves or spherical surfaces) intersect or overlap.

The range domain phase compensator 92 communicates with the range estimation module 84 and the tone signal detector 70. The range-domain phase compensator 92 may use phase vector data, amplitude vector data associated with the received OFDM-like signal from the phase detector 72, the amplitude detector 74, or both. Further, the range-domain phase compensator 92 may communicate with the tone phase measurement module 76 to receive estimated phase slope, interpolated phase slope, or other phase slope measurements during a sampling period. In one embodiment, the range-domain phase compensator 92 can adjust the ranges in the range domain to provide adjusted ranges that are consistent with driving the slope of the subcarrier phases toward a reference slop or target slope (e.g., approximately zero phase slope) between two or more subcarrier phases, or otherwise providing a range adjustment to one or more range estimates of the range estimation module 84 to compensate for multipath reception.

If present, for example, the optional multipath detector 94 can determine whether multipath is present in a received signal during an evaluation interval by analyzing the received amplitude of pilot tone signals or subcarriers and the received phase of the pilot tone signals or subcarriers. In an alternate embodiment, the optional multipath detector 94 or the optional multipath compensator 96 can cooperate with the range-domain phase compensator 92 to provide adjusted ranges or range adjustment data for corresponding range estimates that are consistent with driving the slope of the subcarrier phases toward a reference slope or target slope (e.g., approximately zero phase slope).

The receiver 200 can use various techniques to demodulate the multi-carrier received signal. Under the first technique, the unused subcarriers (or unused data-carrying subcarriers) are set to zero and employed by other transmitters 100 or beacons in the network. Within the transform module 68 (e.g., FFT transform module) of the receiver 200, the FFT can be regarded as partial length because the unused subcarriers are set to zero. Here, in the illustrative example of the first technique, the time series 36 has been down-converted to a digital IF where resulting tone frequencies are multiples of the FFT execution rate and where the tone frequencies represented by the time series 36 fall directly at the output bins of the FFT. At the receiver 200, the received signal from each transmitter 100 would need a different down conversion (e.g., filter), or equivalently, separate digital frequency adjustment before demodulation. In this implementation the size of the FFT of the transform module 68 only has to be as large as the number of tones (ranging subcarriers) broadcast by a particular transmitter 100 (plus any k guard tones). The reduction in size of the FFT of the transform module 68 is a major advantage of having the broadcast tones spaced evenly through the spectrum. The accumulators 66 can do the orthogonalization (e.g., averaging) that would have been accomplished by the transform module 68 (e.g., FFT transform module) if the FFT were full length, as opposed to partial length.

Under a second technique for demodulating the multicarrier received signal, the serial-to-parallel converter 64 can be full length (e.g., N length, where N is defined above in this document) and use a full length FFT (e.g., N length) in the transform module 68. The tones are then selected off the appropriate taps of the FFT output of the transform module 68 (e.g., FFT transform module). The advantage to this full length approach is that data that had been modulated onto the unused or data-carrying subcarriers could be retrieved. It should be noted that the cyclic prefix and cyclic suffix, i.e. the expected time of each at the receiver 200, are eliminated from the FFT processing to provide enhanced multipath performance or immunity.

At a receiver 200, the received OFDM-like signal is subject to phase error or phase rotation with respect to the transmitted OFDM-like signal because of carrier frequency offset and clock offset between the transmitter 100 and the receiver 200, among other things. In the received OFDM-like signal, the phase error tends to increase with increasing symbol index (e.g., of the quasi-data) in the time domain. The aggregate phase error may be associated with two components: (1) first phase error component associated with carrier frequency offset between the OFDM transmitter 100 and receiver 200, where the first phase error component is generally modeled a constant error within an OFDM symbol (e.g., quasi-data symbol), or one or more constant errors that increase with a respective increase in symbol index (e.g., of quasi-data), and (2) a second phase error associated with clock offset between the transmitter 100 and receiver 200, where the second phase error is a linear phase rotation with respect to the subcarrier index (e.g., of the ranging subcarrier). The aggregate phase error or the second phase error is associated with a generally linear phase slope between any two tones (e.g., pilot tones) in the received OFDM signal (e.g., from the same OFDM transmitter 100 and transmitter 100 site). Linear interpolation may be used to estimate the aggregate phase error of each subcarrier (e.g., pilot tone) from an observed, measured phase slope associated with two or more tones (e.g., outer pilots) for corresponding OFDM symbols. In addition to the above aggregate phase error, multipath distortion of the OFDM-like signal may mimic the second phase error.

In one embodiment, the range-domain phase compensator 92 may comprise a range-domain phase-slope compensator that compensates for any material deviation of the phase slope from a target phase slope (e.g., approximately zero phase slope). Under a first technique, the target phase slope may be approximately zero without an accounting, adjusting offset or compensation for any clock offset between the transmitter 100 and the receiver 200. Under a second technique, the target phase slope may be approximately zero with an accounting, adjusting offset or compensation for any clock offset between the transmitter 100 and the receiver 200.

In an alternate embodiment, the optional multipath compensator 96 may determine a correction (e.g., phase compensation data or phase correction data) for each subcarrier (e.g., pilot tone) based on the aggregate estimated phase error for each subcarrier (e.g., pilot tone) to yield a revised phase and a revised amplitude for each subcarrier (e.g., pilot tone). The multipath compensator 96 may apply the correction in the phase domain or may support application in the range domain (e.g., after conversion from the phase domain). For example, the multipath compensator 96 may determine a correction to produce the revised phase and the revised amplitude for two or pilots with a target slope (e.g., an approximately zero phase slope or a phase slope that approaches zero).

If there is multipath between the OFDM transmitter 100 and the receiver 200, the aggregate estimated phase error or the second phase error may depart from a generally linear phase slope, or a target phase slope. However, the multipath correction module applies its multipath corrections after demodulation of the received symbols. In one embodiment, the multipath compensator 96 can adjust one or more estimated ranges between the OFDM receiver 200 and transmitter 100 to compensate for non-linearity in the phase slope or to compensate for deviation from the target phase slope.

The tracking module 86 facilitates estimation of the coarse time of arrival of one or more ranging subcarriers at the receiver 200. The tracking module 86 reads or accesses correlations, accumulations 102 that are consistent with the first correlation function 99. The correlations or accumulations 102 of the first correlation function 99 can be stored in the accumulators 66 or in the data storage device 98. In the receiver 200, the propagation time module 86 or data processor 104 measures the time of arrival of the pseudorandom code edge. A first correlation function 99 may represent a code correlation function 404 of FIG. 5, for example, and an associated code error term are used to precisely estimate the code timing error. The time of arrival of the received signal may be measured based on the difference between a transmission time of a code edge and a reception time of the code edge, where the code edges are constructed or demodulated from the received signal (e.g., time series signal 36) by alignment of the received pseudo random noise code with a replica pseudo random noise code signal (from the code generator 62) for a code epoch or sequence.

Figure 7:
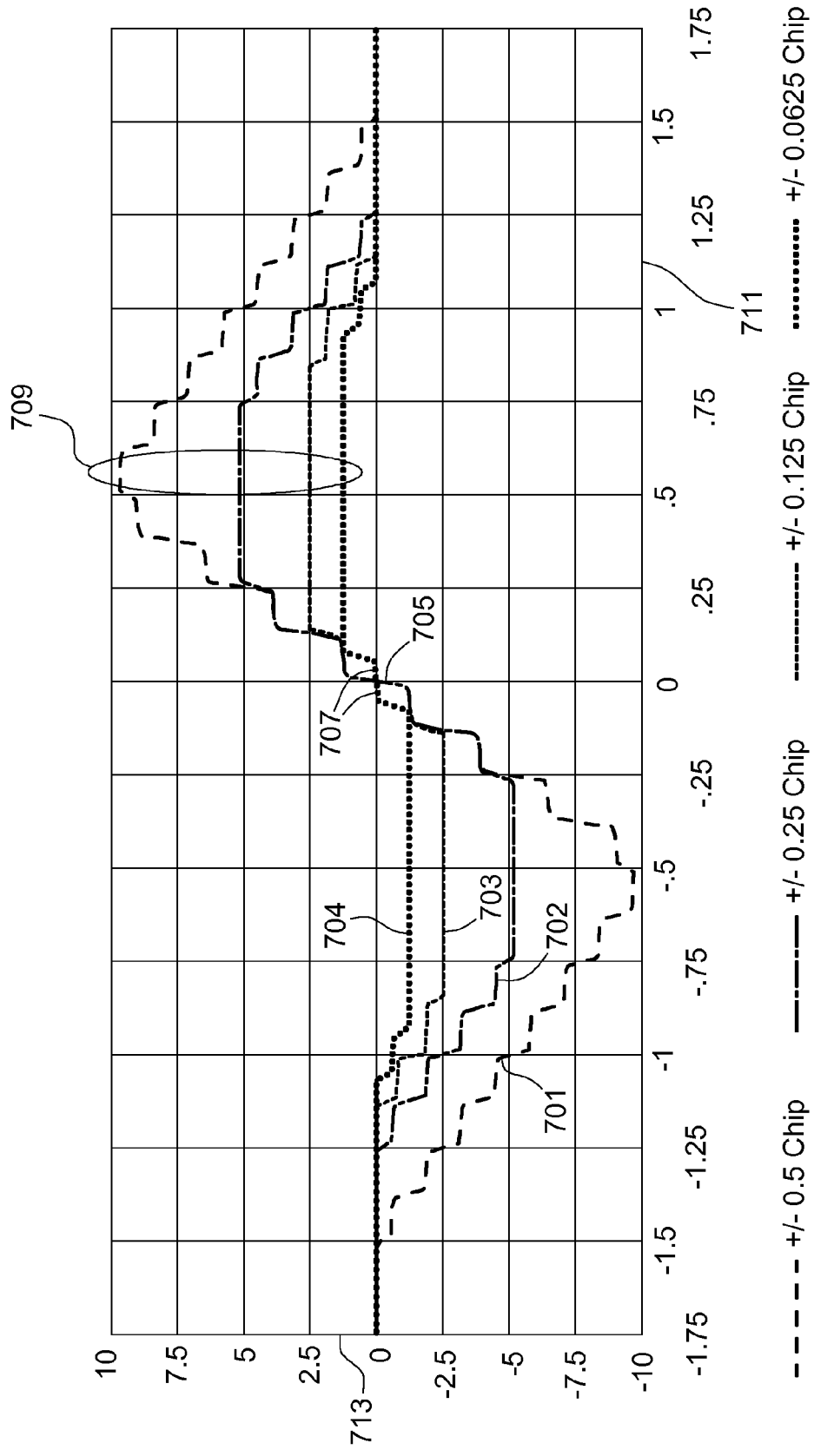
FIG. 7 shows a first early minus late error function associated with different chip spacings.

In a first tracking loop, the first estimator 88 or the tracking module 86 facilitates the propagation time module's (85) estimation of the coarse time of arrival of at least one subcarrier by minimizing an error associated with an early-minus-late error function (e.g., a first EML function 701, second EML function 702 or a third EML function 703 as illustrated in FIG. 7). The early-minus-late error function (e.g., 701, 702, 703) facilitates proper alignment of the locally generated replica and received code to realize the first correlation function 94 or code correlation function. As shown in FIG. 2, the code correlation function can be performed prior to the transform module 68 (e.g., FFT transform module) and occurs in the time domain, where all tones are equally affected. For example, the accumulators 68 or data storage device 98 store accumulations 102 or correlations that result from correlators, integration and dump modules, or other signal processing within the data processor 104. In the frequency domain, the amplitude detector 74 detects a tone amplitude or subcarrier amplitude for providing data to the first estimator 88 or tracking module 86 for adjustment of a relative phase (e.g., in the phase domain or range domain) of the locally generated replica of the pseudo-random noise code. The first estimator 88 or the tracking module 86 supports an early-minus-late error function by providing a control signal or adjustment signal to adjust phase or relative timing of the local generated replica generated by the code generator 62 in the time domain.

Figure 8:
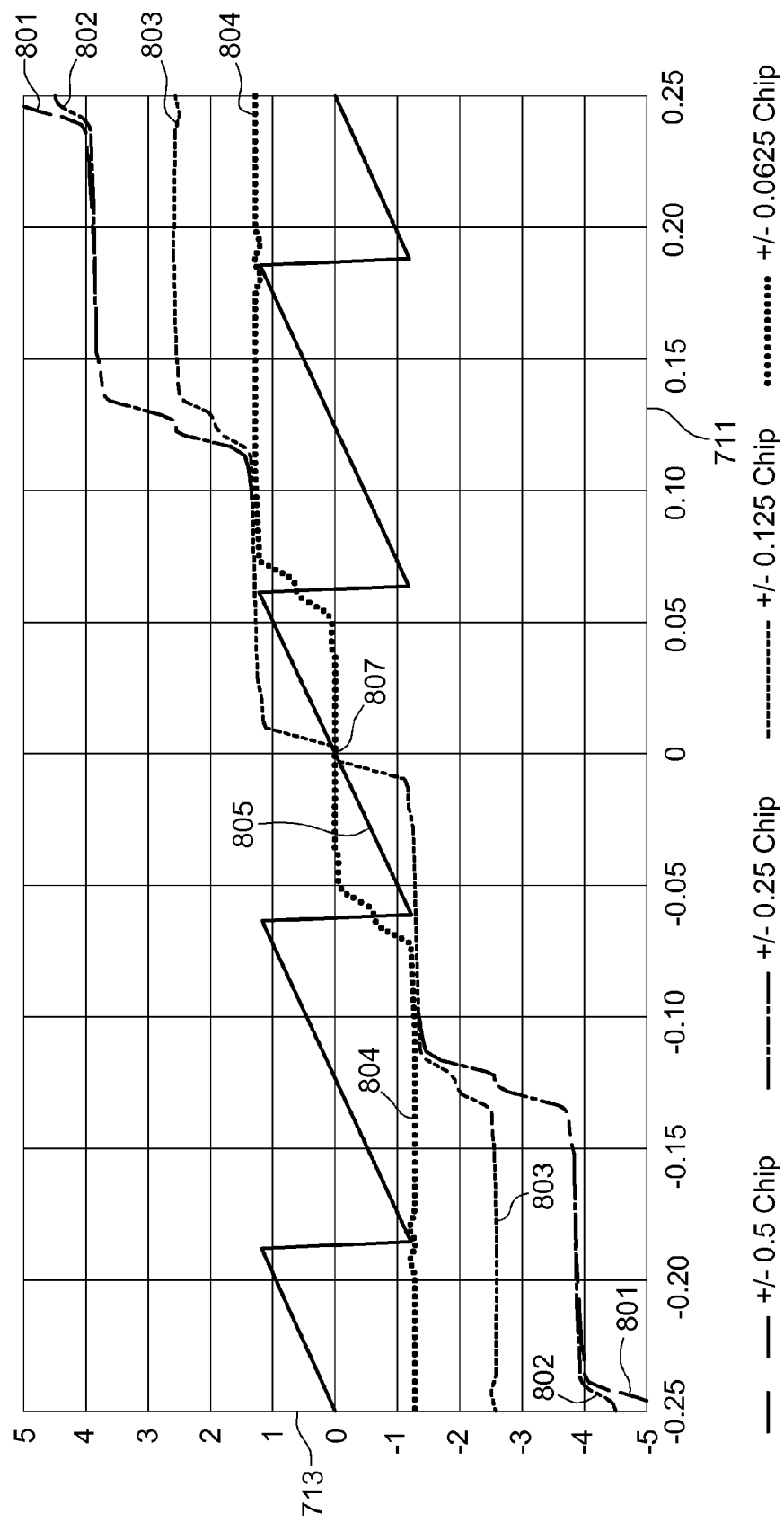
FIG. 8 shows a phase slope with a second early minus late function (e.g., central early minus late error function).

In the second tracking loop, the tracking module 86 or the second estimator 90 can perform or track the error function (e.g., second error function or precise error function 805 of FIG. 8) based on one or more tones derived by the transform module 68 (e.g., FFT transform module), where the tones are in the frequency domain. The second error function or precise error function of FIG. 8 facilitates proper alignment of the phase slope of the subcarrier phases of the received OFDM-like signal with respect to the code error function, consistent with the second correlation function 101 (phase correlation function). The second error function or precise error function facilitates range estimation based on phase information and code information of the received ranging subcarrier for greater accuracy of location or range than would otherwise be provided by the code information alone. Because the tracking module 86 can operate on frequency domain representations, the tracking module 86 or second estimator 90 can readily select one or more tones (e.g., two outer tones) or subcarriers for processing, while ignoring other tones to expedite processing and efficiently use processing resources.

As illustrated in FIG. 3, a navigation system requires several transmitters 100 or beacons for a location-determining receiver or mobile receiver 200 to determine an accurate location or position based on the signals transmitted by the several transmitters 100. Each transmitter 100 may have its tones shifted with respect to other transmitters 100 (in a mutual reception or coverage area) by a number of frequency bins thus making the signals on each beacon orthogonal, or receivable without interference. However, the tones (e.g., co-frequency tones) could not be used for data transmission (e.g., of ranging codes or other information) unless each transmitter 100 or beacon is assigned a different orthogonal pseudorandom noise (PN) code and unless each receiver 200 is programmed or configured to generate a replica of the PN code. In such a multi-transmitter system, where each transmitter 100 is assigned a unique set of tones, communications of data, voice signals, or both could still be supported by dedicating some of those assigned tones to be data carrying or payload carrying, rather than only modulated with ranging code or used for range measurements.

FIG. 4 shows a first correlation function (402, 404) (e.g., autocorrelation function) between the received code and the local generated replica of the received code. In FIG. 4 and FIG. 5, the horizontal axis 403 represents time, whereas the vertical axis 401 represents amplitude or magnitude of the cross-correlation or auto-correlation. The first correlation function (402, 404) is an illustrative example that is analogous to the first correlation function 99 of FIG. 2, where correlations can be stored in the data storage device 98.

To receive the OFDM-like signal, the receiver 200 needs to generate a restoring force consistent with an error function for a pseudorandom code or auto-correlation function (402, 404 or both), as illustrated in FIG. 4. For the OFDM-like signal transmitted by any transmitter 100, m is the total number of tones for the OFDM-like signal, n is the total number of subcarriers, and k is the number of guard subcarriers or K is an integer that represents the length of the cyclic prefix and suffix. Consistent with FIG. 1 and FIG. 2, a simulation was constructed with m=7 and n=7, with the cyclic prefix and suffix equal to 2k time samples (with k=4) which resulted in a 64 point inverse Fast Fourier transform (IFFT) in the transmitter 100 to create the un-augmented time series 36. The simulation used a pseudorandom code of only length 31 to reduce time of simulation, but the results are indicative of what would be expected with any maximal length code appropriately scaled. A composite autocorrelation function was calculated as the receive signal strength (RSS) of the tone magnitudes that resulted from the FFT and is reflected in FIG. 4.

The full composite auto-correlation function 402 and a representative individual tone auto-correlation function 404 are shown in FIG. 4 with a zoom-in or enlarged central region shown in FIG. 5. In one embodiment, the receiver 200 or data processor 104 performs the auto-correlation between the received signal and the locally generated replica of the received signal without the samples (e.g., time series 36) containing the corresponding the cyclic prefix and cyclic suffix. In one embodiment, the transmitter 100 omits the cyclic prefix and the cyclic suffix such that the phase of each tone produced by the transform module 68 (e.g., FFT transform module) in the receiver 200 is coherent from symbol to adjacent symbol. At the transmitter 100, omitting the cyclic prefix and the cyclic suffice permits a phase-locked loop in the receiver 200 to estimate readily any frequency error from transmitter 100 to receiver 200. The frequency error estimation is further described in this document in conjunction with fine range estimation by the second estimator 90 in FIG. 8.

As illustrated in FIG. 5, the shape of the auto-correlation (502, 504, or both), while being similar, is not identical to the shape that the underlying maximal length pseudorandom code would produce. In FIG. 5, the enlarged, full composite auto-correlation function 502 corresponds to the full composite autocorrelation function 402 of FIG. 4. Similarly, enlarged, the representative individual tone auto-correlation function 504 corresponds to the composite autocorrelation function 404 of FIG. 4. While the envelope of each auto-correlation function (502, 504) is the classic triangular shape that is expected, each auto-correlation function (502, 504) has plateaus (506, 508, 510, 512) or steps that cascade downward from each side of the peak amplitude (503, 505, respectively) of each auto-correlation function (502, 504, respectively). As illustrated, each plateau (506, 508) of the full composite auto-correlation function (502) has approximately the same duration; each plateau (510, 512) of the full composite auto-correlation function (504) has approximately the same duration. The number of plateaus (506, 508, 510, 512) on each side of each corresponding auto-correlation function is equal to (n+1), the spectral spacing of the tones in IFFT bins of the Inverse transform module 68), where n is the number of subcarriers. In the simulation (n+1)=8. To understand the reason for these plateaus in the graph of FIG. 5, it is important to examine the time domain signal that results from the simulation described earlier. Each symbol, or code chip period, includes eight (8) cycles of tone coherence where all tones simultaneously return to zero phase.

Figure 6:
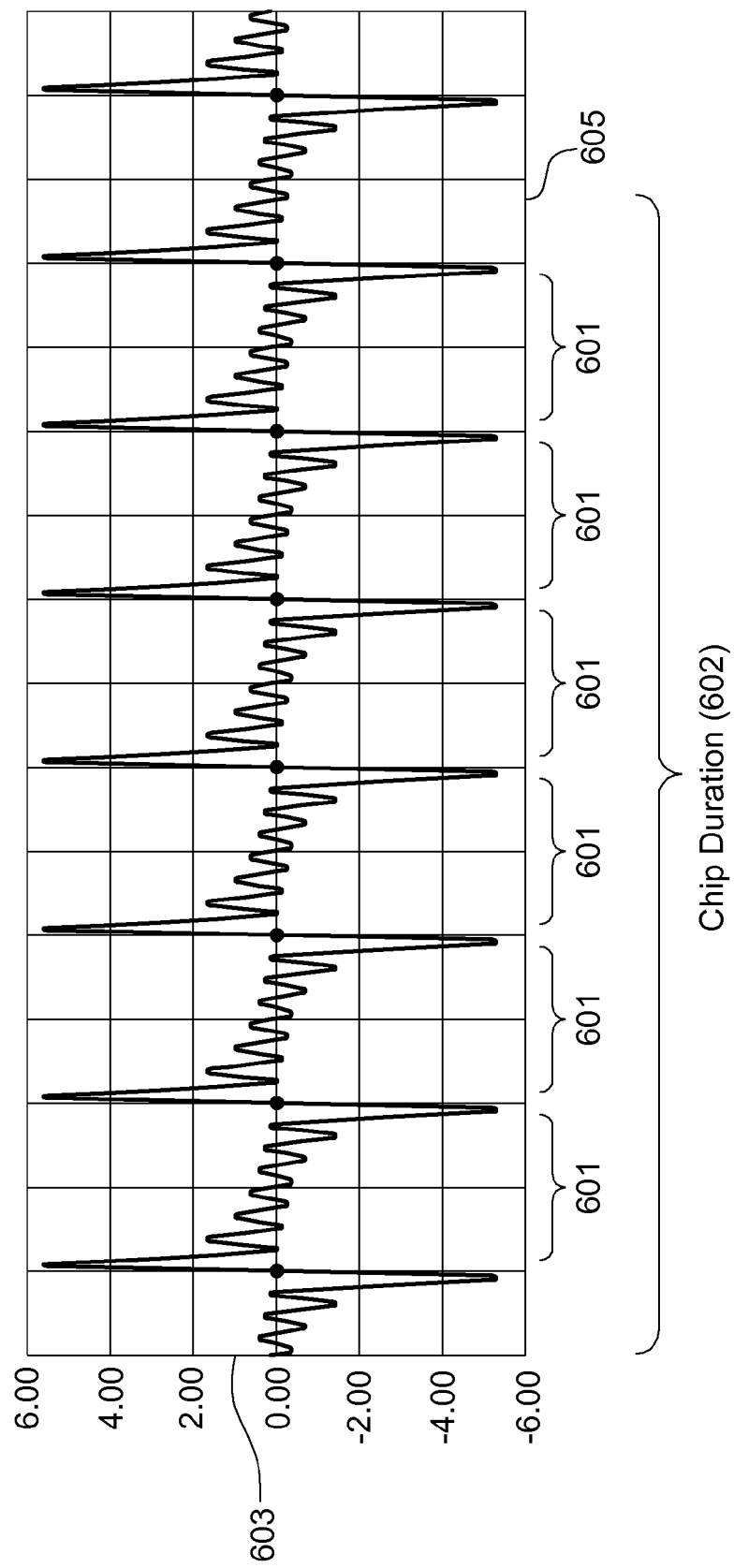
FIG. 6 shows tone coherence intervals in a composite time series.

FIG. 6 is a time domain signal graph that illustrates the tone coherence intervals (for a group of individual tones or subcarriers). The tone coherence interval means a duration or time (601) during which all tones successively or simultaneously return to zero phase. For example, FIG. 6. is a graph that illustrates tone coherence intervals (as a composite time series 36) for at least one code chip duration (602) or symbol period. Each subcarrier is offset from other subcarriers by a frequency offset as previously indicated. The vertical axis 603 of FIG. 6 represents the amplitude of a series of tones, whereas the horizontal axis 605 represents the time, which includes a number of coherence intervals 601. In FIG. 6, the subcarriers or tones are aligned at zero phase for a certain number of tone coherence intervals during each symbol or code chip period, where at least one complete code ship period is shown. The cyclic prefix and suffix are shown to last for 0.5 chips of a coherence interval. The duration of each plateau coincides with a corresponding one of these coherence intervals. During one of these coherence intervals, the autocorrelation (502, 504) in FIG. 5 remains constant with its amplitude (e.g., tread of each step or plateau 506, 508, 510, 512) set to the amplitude of the interval mid-point of the code auto-correlation. The size of the peak plateau (503, 505) at the top of the auto-correlation function (502, 504) is a function of the cyclic prefix and cyclic suffix. The remaining plateaus (506, 508, 510, 512) begin as each coherence interval within the symbol is removed from the correlation. The correlation remains relatively constant while a portion of that coherence interval is included in the correlation since the tone in the adjacent symbol has exactly the same phase fifty (50%) of the time since the correlation is performed over the expected duration of the tones without the cyclic prefix and suffix. This results in coherent phase across chip boundaries other than the phase reversal of the code polarity fifty (50%) of the time.

In the receiver 200 of FIG. 2, the code generator 62 may produce early, late and prompt outputs of the locally generated replica for input to the mixer 60. In one embodiment, the receiver 200 creates a code error function by correlating an early code and a late code, separated by some fraction of a code chip and subtracting the two results. This code error function is commonly referred to as an early-minus-late (EML) error function. One or more early-minus-late (EML) functions can be realized in the receiver 200 to decode the OFDM-like signal. The receiver 200 can calculate the code error function for various fractional code chip separation by using the composite autocorrelation function (e.g., 402 shown in FIG. 4), and subtracting an early version from a late version of the autocorrelation function (e.g., 402 of FIG. 4). In one configuration, the EML is realized by the operation of the code generator 62, mixer 60, the data processor 200 (e.g., integration and dump module), and accumulators 66, where the data processor 200 may include an integration and dump module between the mixer 60 and the accumulator 66 or between the mixer 60 and the serial to parallel converter 64.

FIG. 7 illustrates an EML function of the receiver 200 for various fractional code chip separations. In FIG. 7 and FIG. 8, the vertical axis 713 represents an amplitude of the EML function, whereas the horizontal axis 711 represents time (e.g., in chips). The first EML function 701, indicated by the long dashed lines, has a chip spacing of 0.5 chips; the second EML function 702, indicated by dot-dash lines, has a chip spacing of 0.25 chips; the third EML function 703, indicated by short dashed lines, has a chip spacing of 0.125 and a fourth EML function 704, indicated by dotted lines, has a chip spacing of 0.0625 chips.

The slope of this normalized EML error function (701, 702, 703) is constant near the zero crossing 705 for all separation greater than 0.125 chips. The dead zone 707 shown for fourth EML function 704 with the ±0.0625 chip separation is the result of the duration of the plateaus, which are 0.125 chips long. The plateau duration is a function of the number of coherence periods of the tones within a symbol, as discussed earlier.

FIG. 7 illustrates the EML functions over a range of approximately 3.5 chips and shows the peak amplitude 709 of the EML functions. FIG. 8 illustrates an EML function of the receiver 200 for various fractional code chip separations in less detail than FIG. 7. In FIG. 8, the first EML function 801, indicated by the long dashed lines, has a chip spacing of 0.5 chip and corresponds to the first EML function 701 of FIG. 7; the second EML function 802, indicated by dot-dash lines, has a chip spacing of 0.25 chips and corresponds to the second EML function 702 of FIG. 7; the third EML function 803, indicated by short dashed lines, has a chip spacing of 0.125 chips, and corresponds to the third EML function 703 of FIG. 7; a fourth EML function 804, indicated by dotted lines, has a chip spacing of 0.0625 chips and corresponds to the fourth EML function 704.

FIG. 7 and FIG. 8 provide illustrative graphs of early-minus-late functions that can be used by the data processor 104, the first estimator 88, the tracking module 86, or the propagation time module 85 in the coarse error estimate. The coarse error estimate can be expressed in milliseconds error in the propagation time module 85, as opposed to a chip error. For example, in the first control loop the first estimator 88 of the tracking module 86 may use the first EML function (701, 801), the second EML function (702, 802), or the third EML function (703, 803) as the code error function, coarse error function or first error function for determining first loop control data 105 to control the code generator 62. As illustrated in FIG. 7, the average slope near the zero crossing of the error function of FIG. 7 is the ideal early-minus-late slope of approximately one chip error per chip, or, as shown for the simulation, approximately 20 millisecond of error per chip. Because the symbol period (code chip) is expected to be relatively long, the tracking quality afforded by this type of code error function may not provide the degree of precision for position estimates, location estimates, or attitude estimates that are required for certain applications. However, the first control loop and the applicable EML function (e.g., code error function) can be used to achieve an initial estimate or coarse estimate of the correct time of arrival. Further, in one embodiment, the propagation time module 85 provides an initial estimate or coarse estimate that can be used as the seed for the precise error function that will be described in greater detail in conjunction with FIG. 8. In one embodiment, the propagation time module 85 that relies upon the appropriate EML error function is capable of providing an initial accuracy of ±0.125 chips, or the equivalent time error.

In FIG. 8, the tracking module 86 or the second estimator 90 applies precise error function 805 to make use of the phase slope (of the phases) of the received tones (e.g., ranging subcarriers) of the OFDM-like signal. If the FFT processing time, over which the FFT is performed in the transform module 68 (e.g., FFT transform module), is synchronized to the coherence intervals, the phase slope of the phase of the tones will be zero or reduced from any propensity toward a greater than non-zero aggregate phase slope. Any error in the timing will result in the phase slope (of two or more ranging subcarriers) representing that time error. The simple equation is:

$$\frac{d\varphi}{d\omega} = \frac{\text{radians}}{\frac{\text{radians}}{\text{seconds}}} = \text{seconds}$$

In one embodiment, the precise error function 805, phase error function, or second error function is defined as the normalized slope of the phase of the subcarriers (or tones) with respect to correlation timing error and is shown in FIG. 8. The precise error function 805 with its normalized slope of the phase is shown superimposed on the central area of the early-minus-late error functions (801, 802, 803, 804), previously described. As illustrated, the precise error function 805 is a general linearization of the perfectly normalized error function without having to estimate a normalizing coefficient.

The precise error function 805 of FIG. 8 is defined or characterized by a phase slope that intercepts a central EML error function about the zero crossing point. As illustrated, the phase slope can provide unambiguous indication of the chip error in a region between approximately +/−0.05 chips about the zero crossing point of the EML functions.

The measurement noise from a conventional Delay-Locked Loop (DLL) typically used to track pseudorandom codes can be compared to the phase slope techniques describes above. The performance of a conventional DLL has been analyzed thoroughly and the 1σ thermal noise tracking jitter for an Early-Minus-Late error function is given by:

$$\sigma = \sqrt{\frac{2d^2}{SNR_L}\left[2(1-d) + \frac{4d}{SNR_D}\right]}$$

where: d is the correlator spacing between early, prompt and late
$SNR_L$ is the tracking loop SNR
$SNR_D$ is the predetection SNR For the simulation a code rate of 50 Hz as used: d is 0.125 minimum; a 1 Hz loop bandwidth and Signal-to-Noise ratio ($SNR_L$) is chosen to be +40 dB. Because the signals used for this illustrative analysis have high SNR's, the squaring loss represented by $SNR_D$ can be ignored. The resulting calculated tracking jitter using the above equation is 0.00234 chips or 14021 meters. Using the same parameters for Signal-to-Noise ratio SNR in the simulation, the standard deviation of the phase slope is calculated to be 1.42μ seconds or 426 meters. The improvement in measurement noise, when using the phase slope method (e.g., second tracking loop of second estimator 90) as compared to the traditional code tracking loop (e.g., first tracking loop of first estimator 88) with an appropriate EML function with the same SNR, is approximately 30 dB for this set of parameters.

If the code rate is increased by a factor of 1000 but the 1 Hz loop bandwidth is retained, the $SNR_L$ remains at +40 dB, the tracking error would be reduced by the same factor to approximately 14 meters. For example, in the second tracking loop of the second estimator 90 of the tracking module 86, the phase slope method with the tone frequencies can increase accuracy in a position estimate by the same factor of 1000 results in a measurement standard deviation of 0.426 meters or the same factor of 1000 decrease over the original value, with the same 30 dB advantage over the Early-Minus-Late approach of the first tracking loop alone.

Figures 9A, 9B:
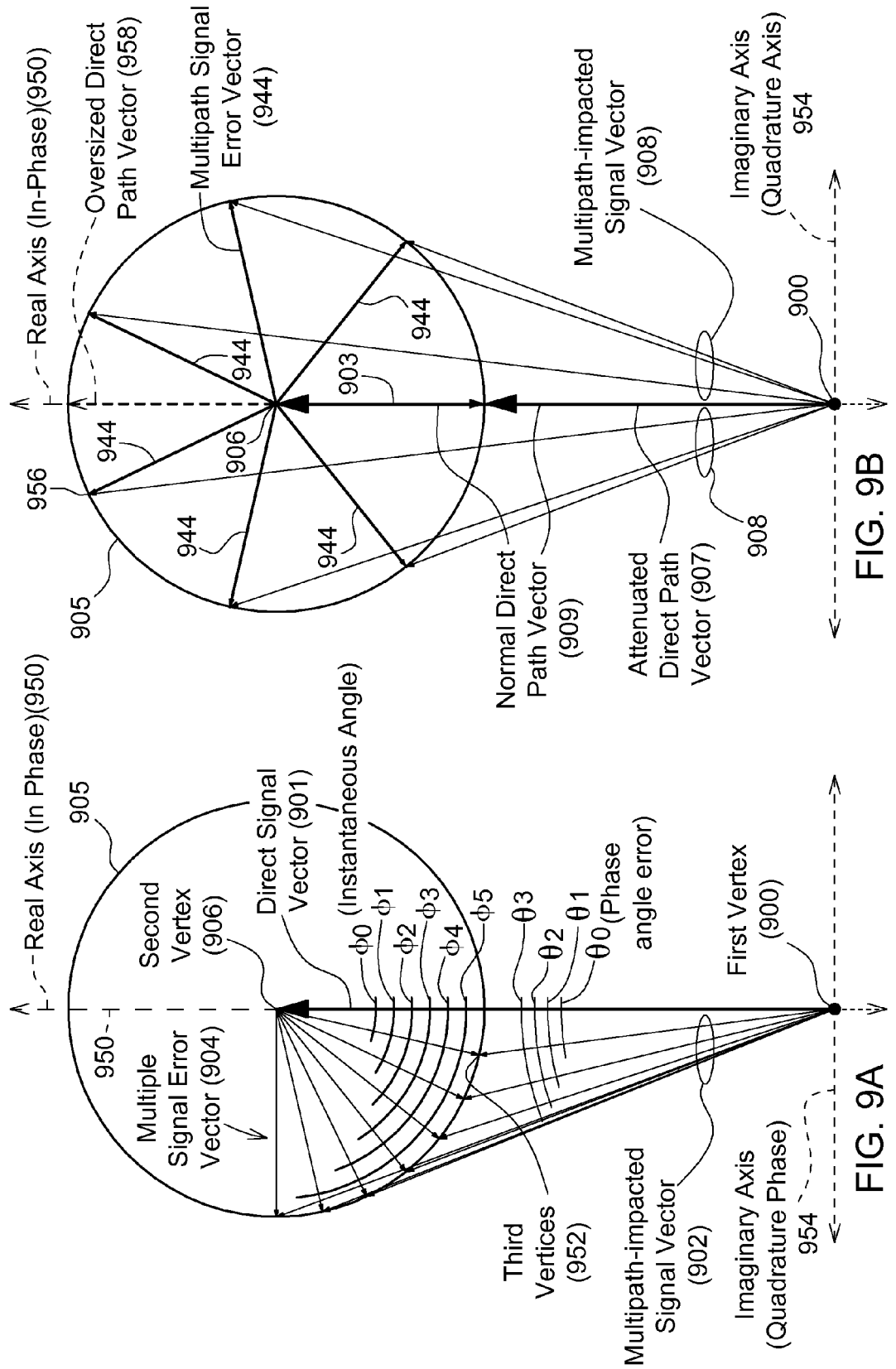
FIG. 9A illustrates an exemplary vector length and phase angle difference for a multipath-impacted signal vector and direct path signal vector.
FIG. 9B illustrates an exemplary vector length and phase angle difference for a multipath-impacted signal vector and direct path signal vector over a greater time period than FIG. 9A.

FIG. 9A illustrates the impact of multipath distortion between the transmitter 100 and the receiver 200 over a shorter period than that illustrated in FIG. 9B. As illustrated in FIG. 9A, a direct path signal vector 901 may be aligned or coincident with a real axis 950 (e.g., in-phase axis), whereas the an imaginary axis 954 (e.g., quadrature axis) may be oriented substantially perpendicularly to the real axis, although other alignments of the axes (950, 954) with respect to the signal vectors (901, 902, 904) in the complex plane or vector space are possible. The axes are indicated in dashed lines in FIG. 9A and FIG. 9B.

In FIG. 9A, each multipath signal error vector 904 is a vector difference (in phase and magnitude) between the direct path signal vector 901 and each respective observed signal vector 902. From time to time, the observed signal vector 902 may also be referred to as the multipath-impacted signal vector. Each observed signal vector 902 is the measured signal vector by the tone signal detector 70 of the receiver 200, for example. The observed signal vector 902 may contain multipath, phase distortion, or phase slope between two or more ranging subcarriers. The direct path signal vector 901 and each observed signal vectors 902 intersect at the first vertex 900 at a phase error angle (φ). Depending upon the degree of multipath component in the observed signal vector 902, the observed signal vector 902 forms a corresponding phase error angle (e.g., $\phi_0$, $\phi_1$, $\phi_2$, $\phi_3$, $\phi_4$, $\phi_5$, and $\phi_6$, as illustrated in FIG. 9A).

The direct signal vector 901 and each multipath signal vector 904 intersect at the second vertex 906 at instantaneous angle (θ). Depending upon the degree of multipath component in the observed signal vector 902, the direct signal vector 904 and each multipath signal error vector 904 forms a corresponding instantaneous angle (e.g., $\theta_0$, $\theta_1$, $\theta_2$, $\theta_3$, $\theta_4$, $\theta_5$, $\theta_6$, as illustrated in FIG. 9A).

The observed signal vectors 902 and respective multipath signal error vectors 904 intersect a series of corresponding third vertices 952. As illustrated to simply FIG. 9A and FIG. 9B, the magnitude or amplitude of each multipath signal vector 904 is fixed or constant, although in practice the amplitude of each multipath signal vector would vary. For illustrative purposes in FIG. 9A and FIG. 9B, circumference 905 is spaced by a radius about the second vertex 906 to reflect that the observed signal (902, 908) is assumed to have a uniform signal strength below the direct path signal strength (e.g., 6 dB lower) of direct path signals 901, although the method and system disclosed in this disclosure is in no way limited by this illustrative assumption.

In FIG. 9A, the phase of each tone observed signal vector 902 can be associated with a reflection of a corresponding indirect path signal transmitted from the transmitter location. Each tone observed signal vector 902 can vary in phase and amplitude with respect to the direct path signal vector 901. For example, the phase of the tone observed signal vector 902 or resultant multipath-influenced phase slope of the tones depends upon a first propagation distance of the direct path signal, a second propagation distance between the transmitter and reflecting object, a third propagation distance between the reflecting object and the receiver, and the phase shift (e.g., phase reversal) associated with the reflection from the surface of the reflecting object.

FIG. 9A may represent an observed signal vector 902 of a ranging subcarrier or pilot tone over multiple sampling intervals within a time period, or observed signal vectors 902 of corresponding ranging subcarriers or pilot tones during a single sampling interval. If the latter is illustrated in FIG. 9A, each tone observed signal vector 902 has a phase shift with respect to the other tones or subcarriers of an OFDM-like signal, where in the aggregate the tones may be characterized by a multipath phase slope. In practice, with respect to an OFDM-like signal that is impacted by multipath, each received subcarrier or tone of the observed signal vector 902 tends to have a slightly different phase, even if the direct path signal 901 comprises tones that are generally aligned in phase (e.g., or have a lesser phase slope). Accordingly, in FIG. 9A each ray or arrow of the tone observed signal vectors 902 can represent a corresponding subcarrier phase that is offset from the direct path signal vector 901 by a corresponding multipath signal error vector 904; each of the multipath signal error vectors 904 can refer to a different subcarrier or tone of the transmitted OFDM-like signal that are transmitted synchronously or simultaneously (e.g., from different transmitters 100). Accordingly, the multipath-impacted signal or observed signal vector 902 can reduce the precision of the position estimate of the receiver 200, unless the range-domain phase compensator 92 or a phase slope compensator (e.g., multipath compensator 96) applies appropriate compensation.

In FIG. 9B, the observed signal vector 908 of FIG. 9B is analogous to the observed signal vector 902 (or the multipath-impacted signal vector) of FIG. 9A; and the resultant multipath signal vector 944 of FIG. 9B is analogous to the resultant multipath signal vector 904. Like reference numbers indicate like elements in FIG. 9A and FIG. 9B.

FIG. 9B illustrates the impact of canceled or reduced multipath distortion between the transmit location of the transmitter 100 and the mobile receiver location of the receiver 200 over a minimum threshold time period or long-term time period (e.g., greater than the time period represented in FIG. 9A). In FIG. 9B, the receiver location is mobile. In FIG. 9B, as the tone observed signal vector 908 changes by motion of the mobile receiver 200 over a greater time period (e.g., and possibly a greater spatial area) than illustrated in FIG. 9A, as depicted, the resultant observed signal vectors 908 change and the distribution of resultant observed signal vectors 908 change.

FIG. 9B illustrates the contribution of each observed signal vector 908 of a pilot tone to a phase of the average (e.g., mean) observed signal vector 907 of the observed signal vector of the pilot tone of the OFDM-like signal over a long time period or after the expiration of a minimum threshold time period. Similarly, FIG. 9B illustrates the contribution of each multipath signal error vector 944 of a pilot tone to a phase of the average (e.g., mean) multipath signal error vector 903. For example, the tone signal detector 70 and the multipath detector 94 may use the average phase (e.g., mean phase) of the multipath signal error vector 944 of a single pilot tone or the average (e.g., mean) phase slope of the multipath error vectors 944 of multiple pilot tones (relative to vertex 906) to provide one or more performance indicators (e.g., figures of merit) for judging the multipath compensation performance of the receiver 200 or the degree of multipath received in the uncompensated OFDM-like signal.

If one compares FIG. 9A and FIG. 9B, it becomes obvious that eventually, as the mobile receiver 200 moves, each third vertex 956, its corresponding observed signal vector 908 (e.g., multipath impacted signal vector) and its corresponding multipath signal error vector 944 will traverse the entire circumference 905; hence, each multipath signal error vector 944 for each pilot tone experiences corresponding phases that are associated with the circumference 905. In one embodiment, if the data processor 104 (e.g., range estimation module 84 of the range-domain phase compensator 92) averages the observed signal vectors 908 to obtain an average resultant observed signal vector 907 or an average multipath-impacted signal for each tone or for a group of tones of the OFDM-like signal, such that the average (e.g., mean) resultant observed signal vector (909) represents nearly or approximately the direct path phase or aligned phase (e.g., with reduced or eliminated multipath phase component). Similarly, the average (e.g., mean) resultant multipath error signal vector 903 is consistent with nearly or approximately the direct path phase or aligned phase of the direct path signal 909. Depending upon the multipath-impacted signal vector 908, the direct path signal may comprise generally a normal direct path vector 909, an attenuating direct path vector 907, or an oversized direct path signal vector 958.

In an alternate embodiment, the data processor 104 (e.g., range estimation module 84, or the range domain phase compensator 92, or multipath compensator 96) may determine an average (e.g., mean) observed signal vector during minimum threshold time period to yield the average resultant observed signal vector 909. Accordingly, in the receiver 200 any disagreement of or nonconformity of the average or mean of the individual instantaneously observed resultant signal vector with respect to the average resultant signal vector 909 would be a multipath metric on the quality of the observed measurement or the degree of multipath distortion the observed measurement for each ranging subcarrier. In one embodiment, the average resultant signal vector 909 of one or more subcarriers is used to define a reference phase slope or target phase slope for the OFDM-like signal in the absence of material multipath components.

FIG. 10A through FIG. 10D, inclusive, show the amplitude versus subcarrier identifier (e.g., tone identifier) for a number of different subcarriers (e.g., approximately 32 different carriers). Although 32 subcarriers are illustrated, this disclosure applies to virtually any number of subcarriers greater than two. As illustrated, the vertical axis 960 shows amplitude of each subcarrier, whereas the horizontal axis 962 shows the subcarrier identifier of each subcarrier. In FIG. 10A through FIG. 10D, the multipath impacts the amplitude of each subcarrier (tone) differently because the frequencies of each subcarrier and; hence, wavelength of each subcarrier are slightly different. Accordingly, the amplitude curve (969, 966, 967, and 968, as depicted by the rectangular symbols) varies with the corresponding subcarrier identifier. The generally linear plot or curve 964 depicts an average amplitude of each subcarrier, where the generally linear plot or curve 964 is indicated by the diamond symbols. In one configuration, the generally linear plot or curve 964 is consistent with the average length of vector (909 or 907) in FIG. 9B, for example.

In FIG. 10A, the amplitude curve 969 decreases (e.g., somewhat linearly) with increasing frequency of the subcarrier or subcarrier identifier of the OFDM-like signal. In FIG. 10B, the amplitude curve 966 has amplitude peaks at the lowest subcarrier frequency and the highest subcarrier frequency, with a somewhat concave curve between the lowest subcarrier frequency and the highest subcarrier frequency. In FIG. 10C, the amplitude curve 967 increases (e.g., somewhat linearly) with increasing frequency of the subcarrier or the subcarrier identifier. In FIG. 10D, the amplitude curve 968 has amplitude minimums at the lowest subcarrier frequency and the highest subcarrier frequency, with a somewhat convex curve between the lowest subcarrier frequency and highest subcarrier frequency. In FIG. 10A through 10D, inclusive, the above amplitudes of the subcarriers (tones) change as the multipath changes due to path length changes such as vehicle movement to produce a series of plots.

In one configuration, the generally linear plot or curve 964 is consistent with the average length or amplitude of vector signal 909 in FIG. 9B. The average length of the direct path vector may be based on the average of a lowest amplitude of the direct path vector signal 909 (as indicated by reference numeral 907) and a greatest amplitude of the direct path vector signal 909 (as indicated by reference number 909 plus reference number 958, illustrated as a dotted line). In FIG. 9B, when the observed signal vector 908 (or multipath-impacted signal vector) and the multipath signal error vector 944 align in opposite phase, the amplitude of the shortest vector is at 6 o'clock of circle 905. This shortest vector or lowest amplitude has the amplitude of subcarrier identifier 16 in curve 966. Likewise, when the observed signal vector 908 (or multipath-impacted signal vector) and direct path signal vectors 909 have the same phase, they add together for a maximum which is shown in FIG. 9B as the oversized direct path vector 958 (that includes direct path signal vector 909) at 12 o'clock (of circle 905), which is the equivalent of subcarrier identifier 16 in curve 968 of FIG. 10D. The average of the amplitudes of subcarrier identifier 16 from FIG. 10B and FIG. 10D, in curves (966, 968,) can be used to determine the average amplitude ($\bar{A}$) of the direct path signal, or $$\bar{A} = \frac{A_{min} + A_{max}}{2},$$

where $A_{min}$ is the minimum amplitude of a given subcarrier and where $A_{max}$ is the maximum amplitude the given subcarrier. Similarly, the multipath amplitude ($A_{multipath}$) of the given subcarrier is approximately one-half of the difference between the amplitudes of subcarrier identifier 16 from FIG. 10B and FIG. 10D, in curves (966, 968), which is $$A_{multipath} = \frac{A_{max} - A_{min}}{2}.$$

With the average amplitude of the direct path signal 909, the corresponding multipath amplitude of the multipath signal error vector 944, and the multipath-impacted signal vector 908 (observed from the received signal), the receiver or data processor can determine the phase error angle or correction data to remove its influence on the calculated phase. Alternately, the receiver or data processor can determine the instantaneous angle ($\phi$) and the length and the corresponding length of the multipath signal error vector (904, 944) to remove its influence on the multipath-impacted signal vector (902, 908). The receiver can apply the above correction data to any given subcarrier from FIG. 10A through FIG. 10D, inclusive.

In an alternate embodiment, another multipath compensation technique makes use of the fact that the average of the length of the tones impacted by multipath (indicated by squares in curves 969, 966, 967, 968) is equal to the length of the direct path tone (indicated by diamonds in curves 964). In FIG. 10A through FIG. 10D, as the amplitudes of subcarriers (tones) are averaged, the length and phase of the direct path results. Accordingly, averaging the amplitudes of the subcarriers (e.g., associated with subcarrier identifiers 1 through 32, inclusive) until all of amplitudes of the subcarriers (tones) have the same average vector length, provides a set of tones free from multipath; where the corresponding phase is the phase of the direct path signal.

Figure 11:
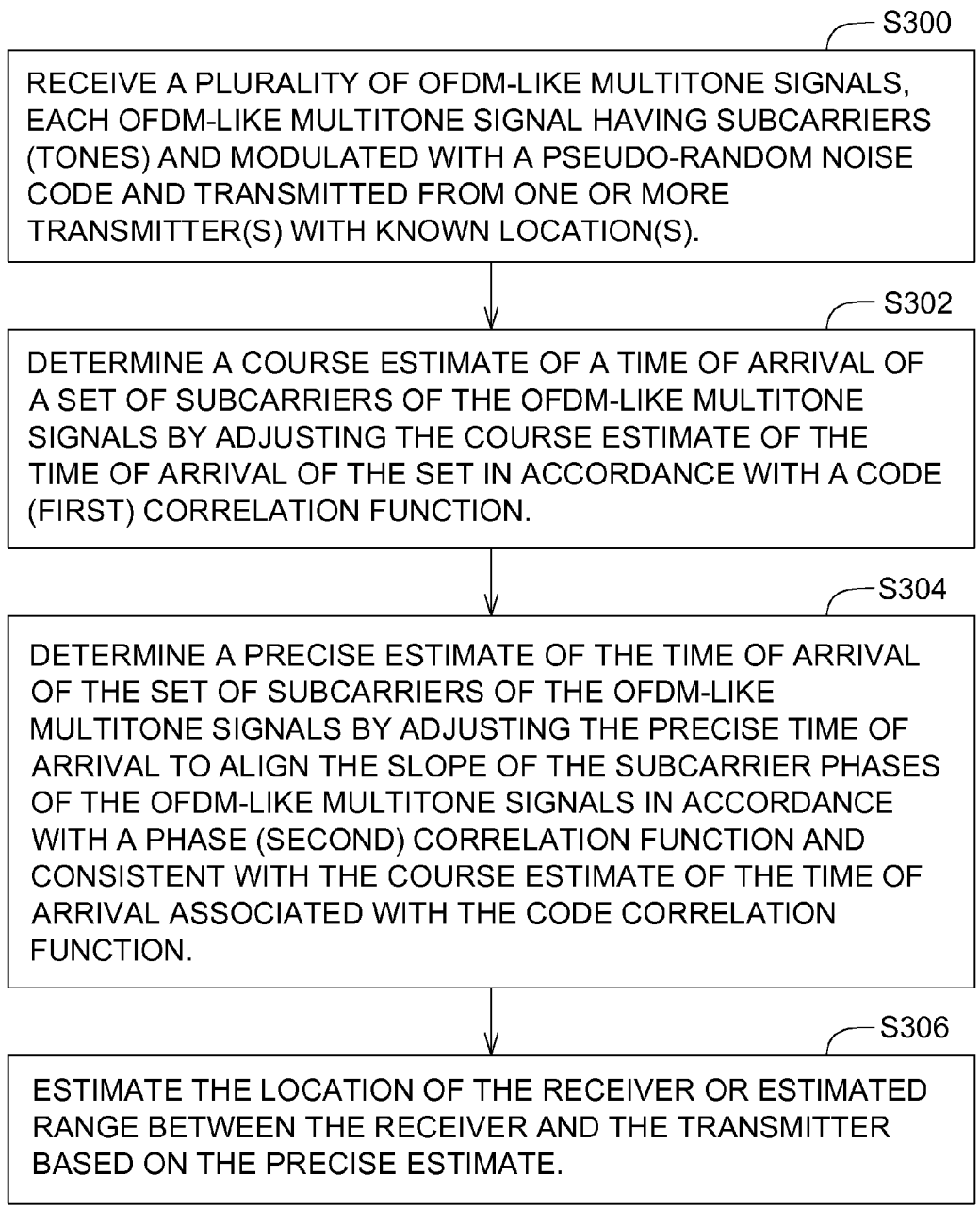
FIG. 11 is flow chart of one embodiment of determining the location or range of a receiver with a multi-carrier signal.

FIG. 11 is flow chart of one embodiment of determining the location or range of a receiver 200 with a multi-carrier signal. The method of FIG. 11 begins in step S300.

In step S300, a receiver 200 portion receives or is adapted to receive a plurality of OFDM-like multitone signals. Each OFDM-like multitone signal has subcarriers (tones) and is modulated with a pseudo-random noise code and transmitted from one or more transmitters 100 with corresponding known locations.

In step S302, in a first tracking loop, a first estimator 88 determines a coarse estimate of a time of arrival of a set (e.g., at least one subcarrier) of the OFDM-like multitone signals by adjusting the coarse estimate of each time of arrival of the set in accordance with a code (first) correlation function. For example, in a first tracking loop, a first estimator 88 determines coarse estimates of respective times of arrival of each ranging subcarrier within the set of the OFDM-like multitone signals by adjusting the coarse estimates of each time of arrival of the set in accordance with a code (first) correlation function. Each set of, one or more, ranging subcarriers from a transmitter 100 is generally associated with a different or unique time of arrival for each coarse estimate, unless all of the transmitters happen to be located equidistantly from the receiver 200. The first estimator 88 or data processor 104 is adapted to maximize the correlation of the received pseudo-random noise code of the at least one subcarrier with the local replica of the pseudo-random noise code in accordance with a code (first) correlation function.

In step S302, the determining of the coarse estimate may be executed in accordance with various techniques, which may be applied separately or cumulatively. Under a first technique, in the first tracking loop, the determining of the coarse estimate further comprises minimizing an error associated with an early-minus-late error function to determine the coarse estimate of the time of arrival. Under a second technique, the early minus late spacing is selected based on a ratio of the pseudo random noise code period and frequency spacing between subcarriers. Under a third technique, the early-minus-late error function has an early minus late spacing between approximately 0.0625 and 0.5 chips. Under a fourth technique, the code correlation of the first tracking loop occurs in the time domain. Under a fifth technique, in a frequency domain the tone signal detector 70 or amplitude detector 74 detects a tone amplitude associated with the at least one subcarrier for providing an adjustment signal to adjust a relative phase of the locally generated replica of the pseudo-random code to the received code. Under a sixth technique, the code correlation function comprises an auto-correlation function for the received signal and a locally generated pseudo random noise code signal that is expressed in magnitude versus time, wherein the autocorrelation function has a central peak associated with a maximum magnitude of a correlator output signal and a series of step-like transitions on each side of the central peak.

In step S304, in a second tracking loop, a second estimator 90 determines a precise estimate of the time of arrival of the set (e.g., the at least one subcarrier; typically at least two ranging subcarriers per transmitter 100) of subcarriers of the OFDM-like multitone signals by adjusting the precise time of arrival to align the slope of (at least two of the) subcarrier phases of the OFDM-like multitone signals in accordance with a phase (second) correlation function and consistent with the coarse estimate of the time of arrival associated with the code correlation function. For example, in step S304 in a second tracking loop, a second estimator 90 determines precise estimates of the respective times of arrival of the set of subcarriers of the OFDM-like multitone signals by adjusting the precise times of arrival to align the slope of (at least two of the) subcarrier phases of the OFDM-like multitone signals in accordance with a phase (second) correlation function and consistent with the coarse estimates of the time of arrivals associated with the code correlation function. Each set of, two or more, ranging subcarriers, from a transmitter 100 is generally associated with a different or unique time of arrival for each precise estimate, unless all of the transmitters happen to be located equidistantly from the receiver 200. Two or more ranging subcarriers can establish a phase slope for single reference transmitter 100, for example.

In step S304, the determining of the precise estimate is carried out in accordance with one or more procedures, which may be carried out alternatively or cumulatively. Under a first procedure, in the second tracking loop, the data processor 104 or the receiver 200 the determines the precise estimate further comprises an error function with a target or goal of driving an average observed tone phase slope to a zero phase slope, or another target phase slope (e.g., associated with the absence of multipath signals). Under a second procedure, the data processor 104 or the receiver 200 adjusts the precise time of arrival to align the slope of the subcarrier phases of the OFDM-like multitone signals in accordance with a phase (second) correlation function comprises adjusting a central region of the phase slope, between adjacent ambiguity regions (e.g., with generally vertical slope) in the phase slope, to be aligned with a zero crossing point of the first early minus late function.

Under a third procedure, the receiver 200 or data processor 104 processes the received OFDM-like signal encoded without any cyclic prefix or cyclic suffix such that the phase of each tone produced by a transform module 68 (e.g., FFT transform module) in the receiver 200 is coherent from symbol to adjacent symbol. Accordingly, under the third procedure, the target phase slope may approach approximately a zero phase slope.

Under a fourth procedure, the receiver 200 or data processor 104 synchronizes the processing time, over which a time domain-to-frequency domain transform (e.g., FFT transform) is performed by a transform module 68 (e.g., FFT module) to a coherence interval (e.g., described in conjunction with FIG. 6) such that phase slope of the subcarriers will approach zero, or be reduced from any propensity toward a greater non-zero aggregate phase slope, for the target phase slope.

In step S306, a data processor 104 or range estimation module 84 estimates the location of the receiver 200 or estimated range between the receiver 200 and the transmitter 100 based on the precise estimate and phase error compensation in a phase domain, a range domain, or both commensurate with driving the slope of the subcarrier phases toward zero (e.g., to compensate for phase or frequency error in the absence multipath). For example, the data processor 104 or the range estimation module 84 estimates the location of the receiver 200 or estimated range between the receiver 200 and the transmitter 100 based on the precise estimate after any compensation for multipath and phase error compensation in a phase domain, a range domain, or both commensurate with driving the slope of the subcarrier phases toward zero.

The range-domain phase compensator 92, the multipath detector 94 or data processor 104 can compensate for certain multipath induced distortion by applying one or more procedures as described in any of the embodiments are examples set forth in FIG. 12 through FIG. 16, inclusive. For example, the embodiments of FIG. 12 through FIG. 16, inclusive, may measure vector lengths of a multipath-impacted signal and a direct path signal, among other things, to derive a phase error correction (e.g., phase error angle between the direct path signal and the multipath-impacted signal). Accordingly, if the frequency or wavelength of a reference ranging subcarrier or reference tone is known, then the data processor 104 or range domain phase compensator 92 can determine a phase correction, or its equivalent range correction, for each subcarrier vector based on the length of the multipath-impacted vector, the length of the direct path vector, and the frequency or wavelength of the subcarrier.

Figure 12:
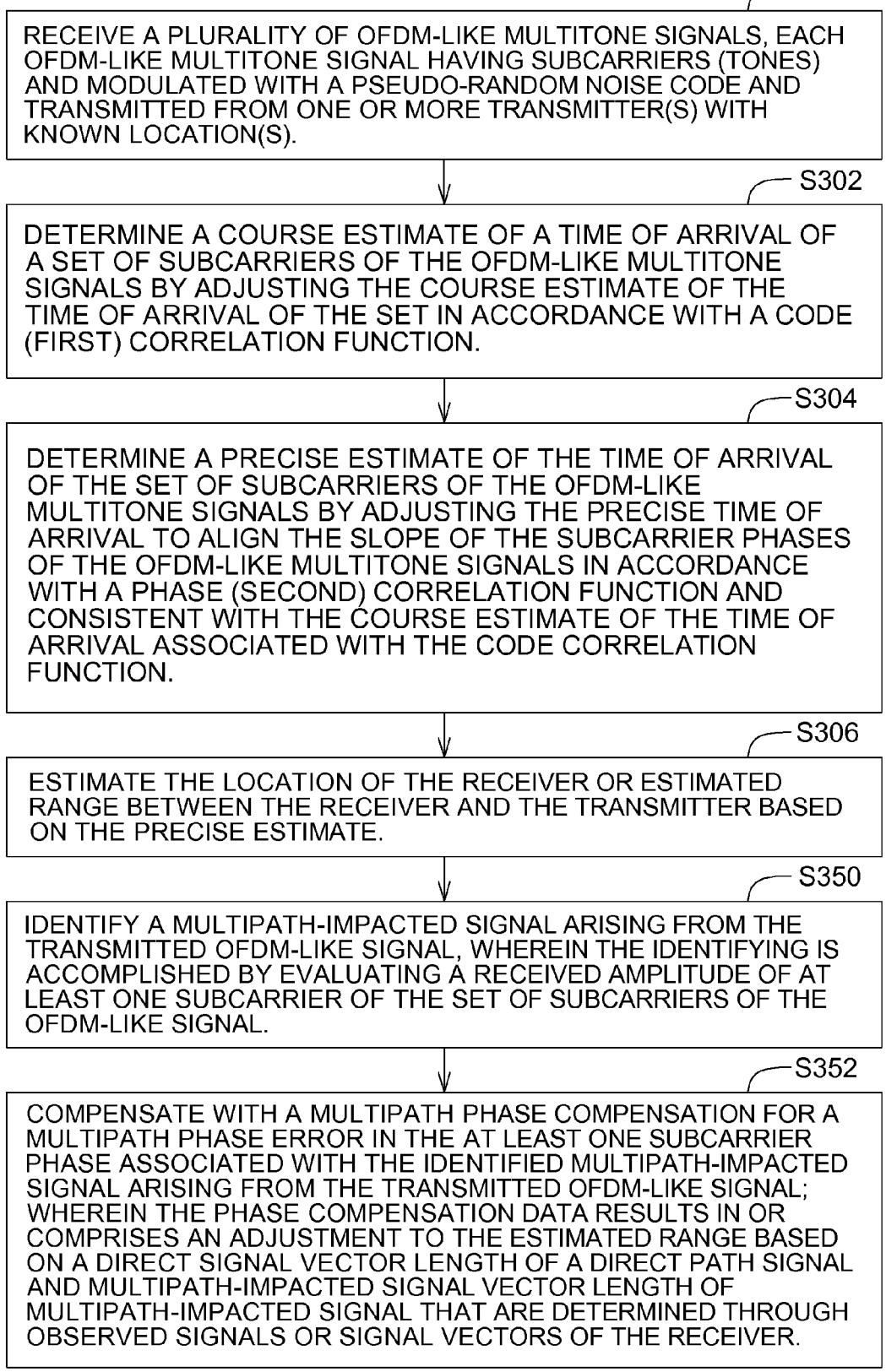
FIG. 12 is a flow chart of one embodiment of determining the location or range of a receiver with a multi-carrier signal with multipath compensation.

FIG. 12 is flow chart of one embodiment of determining the location of a receiver 200 with a multi-carrier signal. The method of FIG. 12 is similar to the method of FIG. 11, except the method of FIG. 12 further comprises steps S350 and S352. Like reference numbers in FIG. 11 and FIG. 12 indicate like elements.

In step S350, a data processor 104 or multipath detector 94 identifies a multipath-impacted signal (e.g., multipath signal component) arising from the transmitted OFDM-like signal, wherein the identifying is accomplished by evaluating a received amplitude of the set (e.g., the at least one subcarrier) of subcarriers of the OFDM-like signal. The identifying of the multipath-impacted signal may be accomplished by the application of various techniques, which may be applied individually or cumulatively. Under a first technique, during a group of adjacent sampling intervals, the data processor 104 or multipath detector 94 determines one or more vector lengths of the direct path signal during peak amplitudes and the data processor 104 or multipath detector 94 determines one or more vector lengths of the multipath-impacted signal during an intervening lower amplitude lower than the peak amplitudes. Under a second technique, during a group of sampling intervals, the data processor 104 or multipath detector 94 determines whether the amplitude of the tones (e.g., pilot tones) during different sampling periods have a dispersion level exceeding a minimum threshold indicative of the existence of a multipath-impacted signal. The second technique triggers multipath compensation by range adjustment the estimated range based on the dispersion level exceeding the minimum threshold.

Under a third technique, the data processor 104 or multipath detector 94 averages a plurality of observed vector lengths for each ranging subcarrier to determine corresponding averaged subcarrier vector lengths, and the multipath detector 94 identifies the direct signal vector length when the corresponding averaged subcarrier vector lengths converge to substantially the same value that is designated as the direct signal vector length.

Under a fourth technique, the data processor 104 or tone signal detector 70 detects a greatest amplitude of one of the subcarriers of the OFDM-like signal and a lowest amplitude of one the subcarriers of the OFDM-like signal (e.g., by recording through a generally continuous evaluation period that contains the greatest amplitude and the lowest amplitude), the data processor 104, the tone signal detector 70, or the multipath detector 94 determines the direct path amplitude based on the greatest amplitude and the multipath signal based on a lowest amplitude; and estimates a multipath phase error for a particular ranging subcarrier based on the corresponding direct path amplitude and multipath amplitude for any subcarrier with an observed amplitude that is not equal to or substantially less than the direct path amplitude of the direct path signal.

In step S352, a data processor 104 or multipath compensator 96 compensates with a multipath phase compensation for a multipath phase error in the at least one subcarrier phase associated with the identified multipath-impacted signal arising from the transmitted OFDM-like signal; wherein the phase compensation data results in or comprises an adjustment to the estimated range (between a receiver and a corresponding transmitter position) based a direct signal vector length of a direct path signal and a multipath-impacted signal vector length of multipath-impacted signal that are determined through observations (e.g., observe signals or signal vectors) of the receiver 200. As previously indicated, the multipath-impacted signal is also referred to as an observed signal vector. The data processor 104, multipath compensator 96 or the range-domain, phase-slope compensator 92 can use compensation data for a first, representative or reference ranging subcarrier to estimate additional compensation data for the other ranging subcarriers based on one or more of the following: different frequency or wavelengths of the ranging subcarriers, an observed phase slope of the ranging subcarriers, and a target phase slope of the ranging subcarriers.

Step S352 may be executed in accordance with various techniques that may be applied separately or cumulative. Under a first technique for step S352, a data processor 104 or multipath compensator 96 compensate produces phase compensation data that results in or comprises an adjustment to the estimated range based on the direct signal vector length, the multipath-impacted signal vector length (e.g., observed signal vector length), and a multipath error rector signal. Under a second technique for step S352, the data processor 104 or multipath compensator 96 comprised a phase error angle between the direct signal vector and the multipath-impacted signal vector determined based on the direct signal vector length, the multipath-impacted signal vector length (or an observed signal vector), and an multipath error vector length. Under a third technique for step S352, the data processor 104 or multipath compensator 96 estimates the multipath error vector length as a substantially fixed amplitude below the amplitude of the direct path signal. Under a fourth technique for step S352, the data processor 104 or multipath compensator 96 estimates a multipath error vector length derived from an instantaneous angle between the direct path signal and the multipath error vector and a ratio of the direct signal vector length to the multipath signal vector length (or the reciprocal of the ratio). Under a fifth technique for step S352, the data processor 104 or multipath compensator 96 estimates a phase error comprising an angle between the direct signal vector and the multipath signal vector (or observed signal vector), where the data processor 104 or the range domain phase slope compensator 92 separately converts the phase error for each ranging subcarrier of the received OFDM-like signal to the phase compensation data, and where the propagation time module 85, the range estimation module 84, or both convert the phase error to a corresponding time error to a distance error, and where the distance error is based on the propagation at the speed of light.

Figure 13:
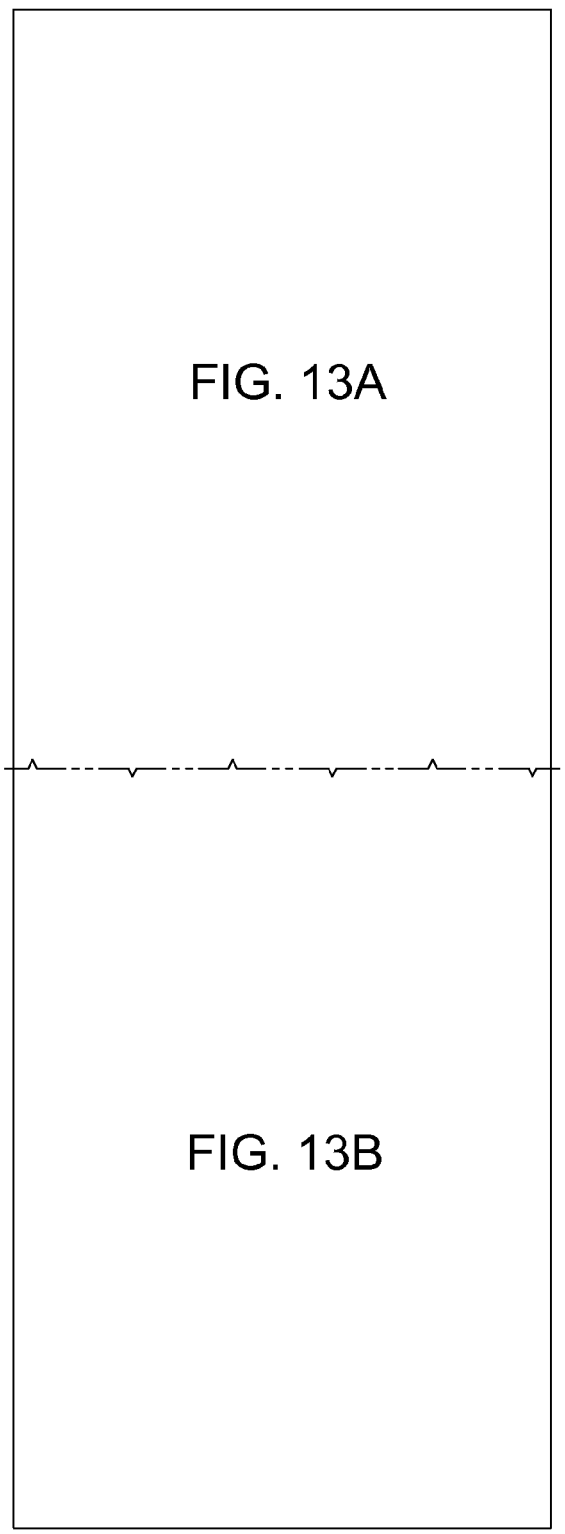
FIG. 13 refers to FIG. 13A and FIG. 13B collectively.
Figure 13A:
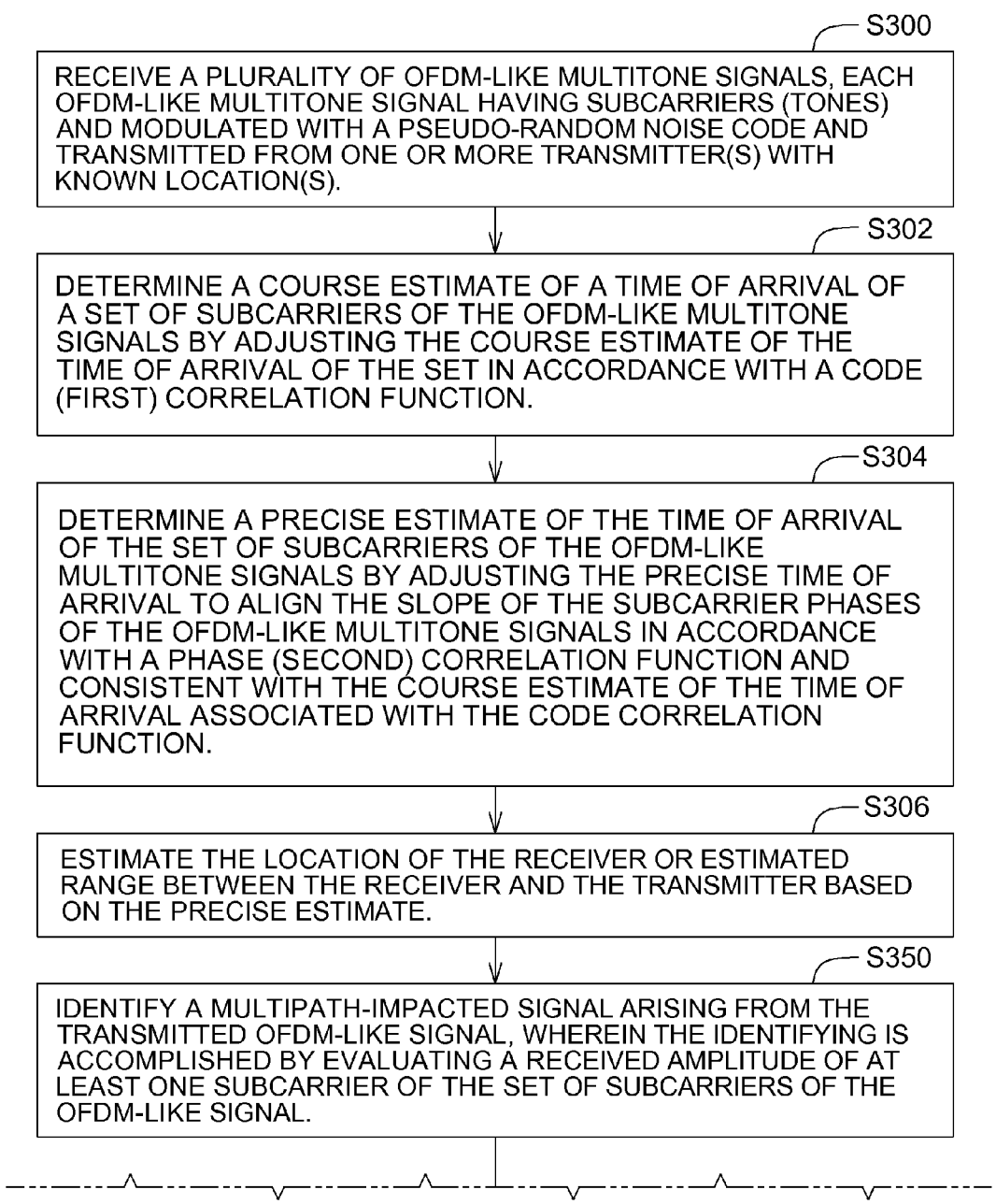
Figure 13B:
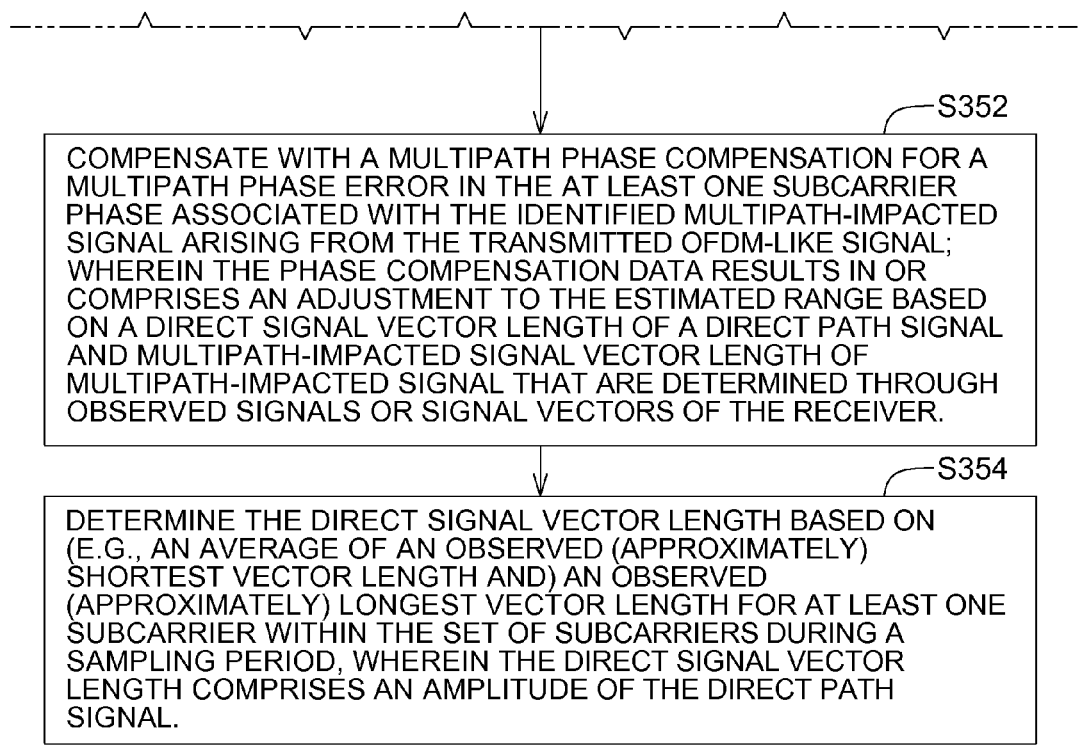

FIG. 13 refers to FIG. 13A and FIG. 13B collectively. FIG. 13 is a flow chart of another embodiment of determining the location or range of a receiver 200 with a multi-carrier signal with multipath compensation. The method of FIG. 13 is similar to the method of FIG. 12, except the method of FIG. 13 further comprises step S354; like reference numbers in FIG. 12 and FIG. 13 indicate like elements, steps or procedures.

In step S354, a data processor 104 or multipath compensator 96 determines the direct signal vector length based on (e.g., an average of an observed (approximately) shortest vector length and) an observed (approximately) longest vector length for at least one subcarrier within the set of subcarriers during a sampling period, wherein the direct signal vector length comprises an amplitude of the direct path signal. For example, during a group of adjacent sampling intervals, a data processor 104 or multipath compensator 96 determines one or more direct signal vector lengths of the direct path signal during peak amplitudes and determining one or more multipath-impacted signal vector lengths of the multipath-impacted signal during an intervening lower amplitude lower than the peak amplitudes, wherein the amplitude measurements comprise the one or more direct signal vector lengths and the one or more multipath-impacted signal vector lengths. Further, the data processor 104 estimates the multipath error vector length as a substantially fixed amplitude below the amplitude of the direct path signal. Alternately, the data processor 104 multipath error derives the vector length from an instantaneous angle between the direct path signal and the multipath error vector and a ratio of the direct signal vector length to the multipath signal vector length.

Figures 14, 14A, 14B:
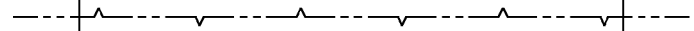
FIG. 14 refers to FIG. 14A and FIG. 14B collectively.
Figure 14A:
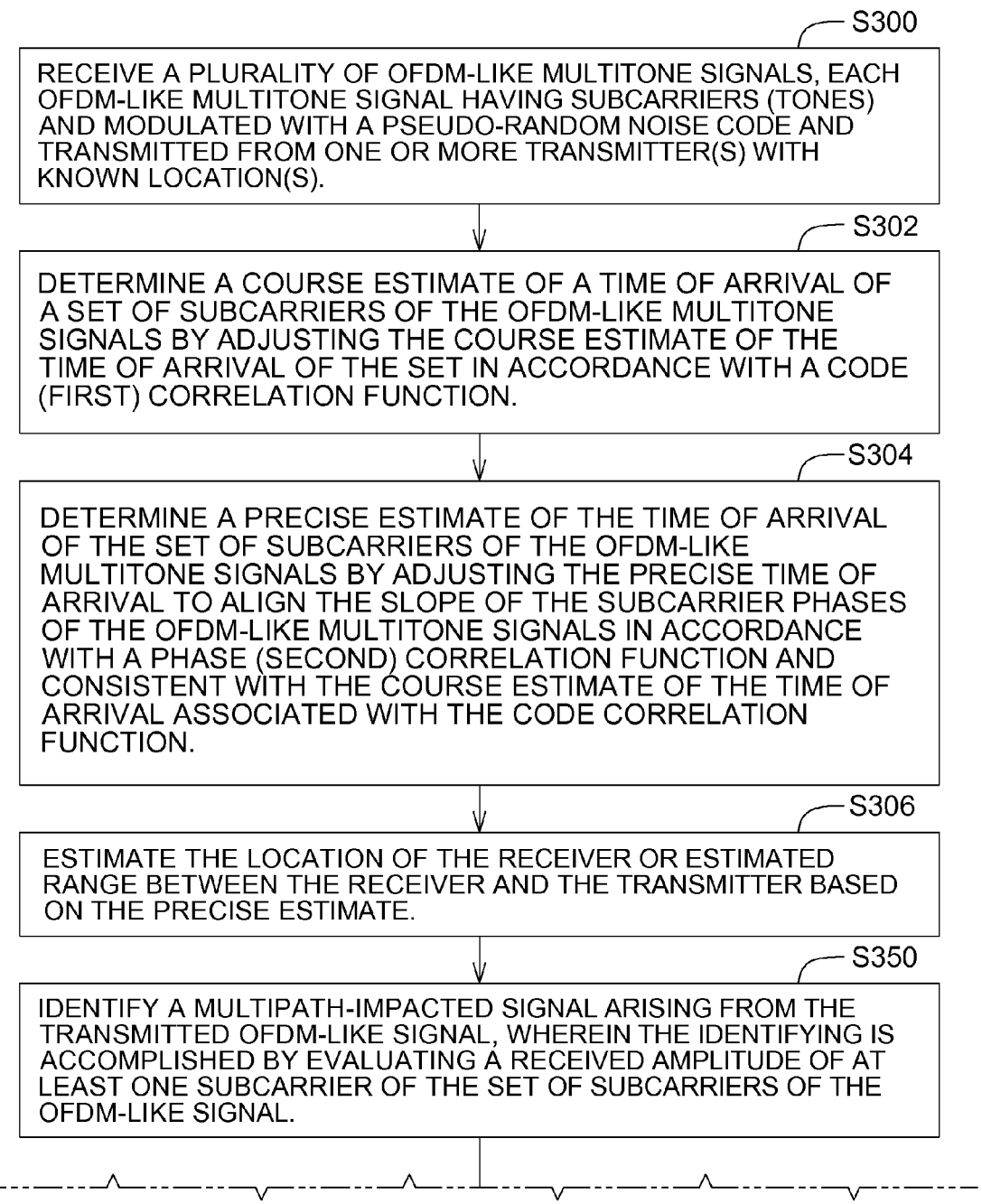
Figure 14B:
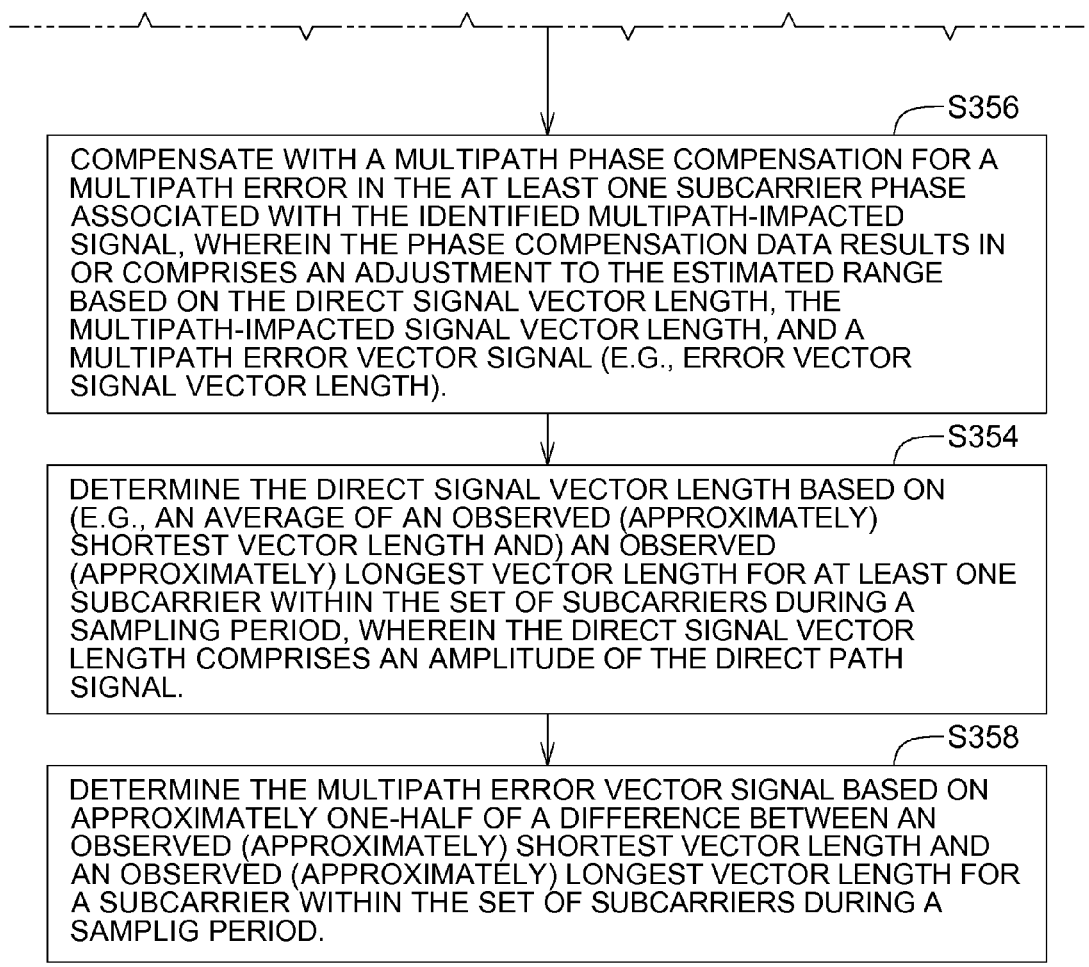

FIG. 14 refers to FIG. 14A and FIG. 14B collectively. FIG. 14 is a flow chart of another embodiment of determining the location or range of a receiver with a multi-carrier signal with multipath compensation. The method of FIG. 14 is similar to the method of FIG. 12, except step S356 replaces step S352 and steps S354 and S358 are is added. Like reference numbers in FIG. 12, FIG. 13 and FIG. 14 indicate like elements, steps or procedures.

In step S356, a data processor 104 or multipath compensator 96 compensates with a multipath phase compensation for a multipath phase error in the at least one subcarrier phase associated with the identified multipath-impacted signal, wherein the phase compensation data results in or comprises an adjustment to the estimated range based on the direct signal vector length, the multipath-impacted signal vector length, and a multipath error vector signal.

In step S354, a data processor 104 or multipath compensator 96 determines the direct signal vector length based on (e.g., an average of an observed (approximately) shortest vector length and) an observed (approximately) longest vector length for at least one subcarrier within the set of subcarriers during a sampling period, wherein the direct signal vector length comprises an amplitude of the direct path signal. Variations of step S354 discussed in conjunction with FIG. 13 apply equally to FIG. 14.

In step S358, a data processor 104 or multipath compensator 96 determines the multipath error vector signal based on approximately one-half of a difference between an observed (approximately) shortest vector length and an observed (approximately) longest vector length for a subcarrier within the set of subcarriers during a sampling period.

Figure 15A:
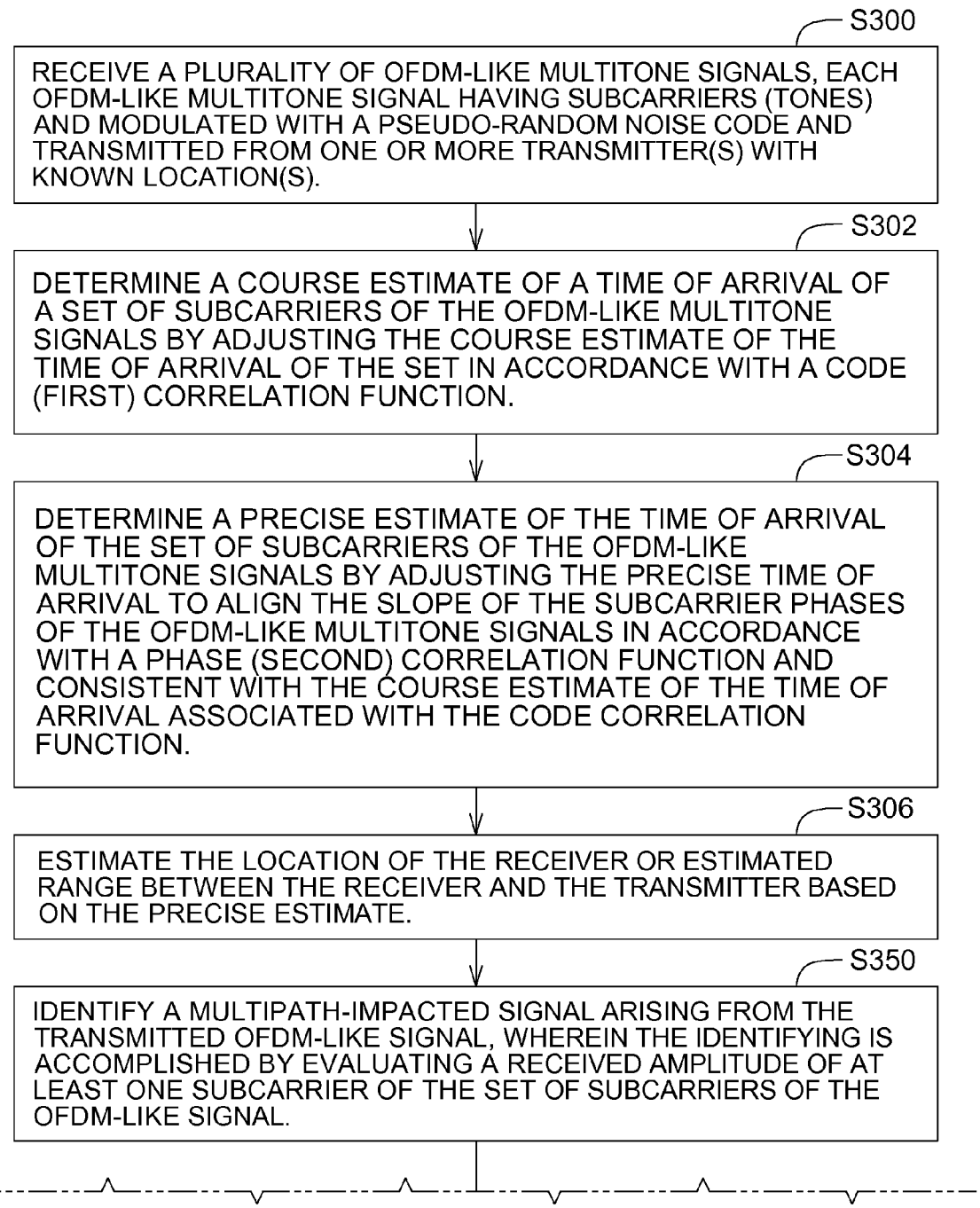
FIG. 15 refers to FIG. 15A and FIG. 15B collectively.
Figure 15B:
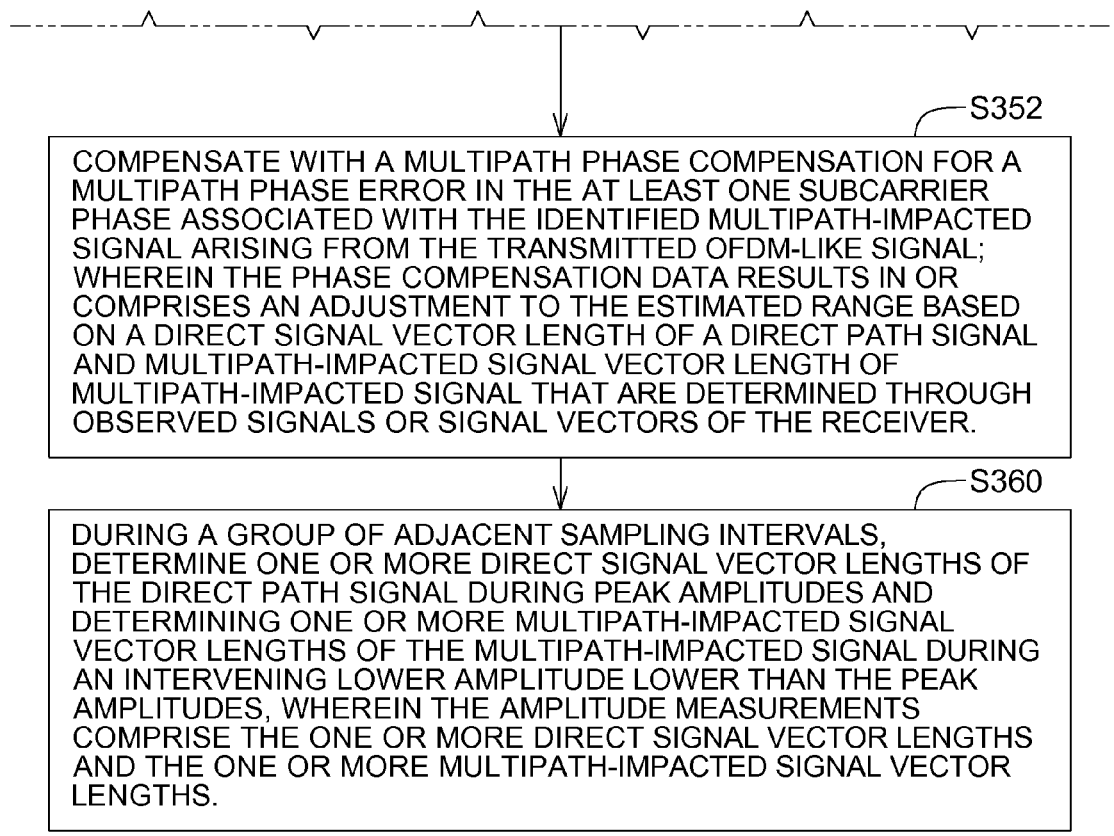

FIG. 15 refers to FIG. 15A and FIG. 15B collectively and is a flow chart of another embodiment of determining the location or range of a receiver with a multi-carrier signal with multipath compensation. The method of FIG. 15 is similar to the method of FIG. 12, except step S360 is added. Like reference numbers in FIG. 12 and FIG. 14 indicate like elements, steps or procedures.

In step S360, during a group of adjacent sampling intervals, a data processor 104 or multipath compensator 96 determines one or more direct signal vector lengths of the direct path signal during peak amplitudes and determining one or more multipath-impacted signal vector lengths of the multipath-impacted signal during an intervening lower amplitude lower than the peak amplitudes, wherein the amplitude measurements comprise the one or more direct signal vector lengths and the one or more multipath-impacted signal vector lengths.

Figures 16, 16A, 16B:
FIG. 16 refers to FIG. 16A and FIG. 16B collectively.
Figure 16A:
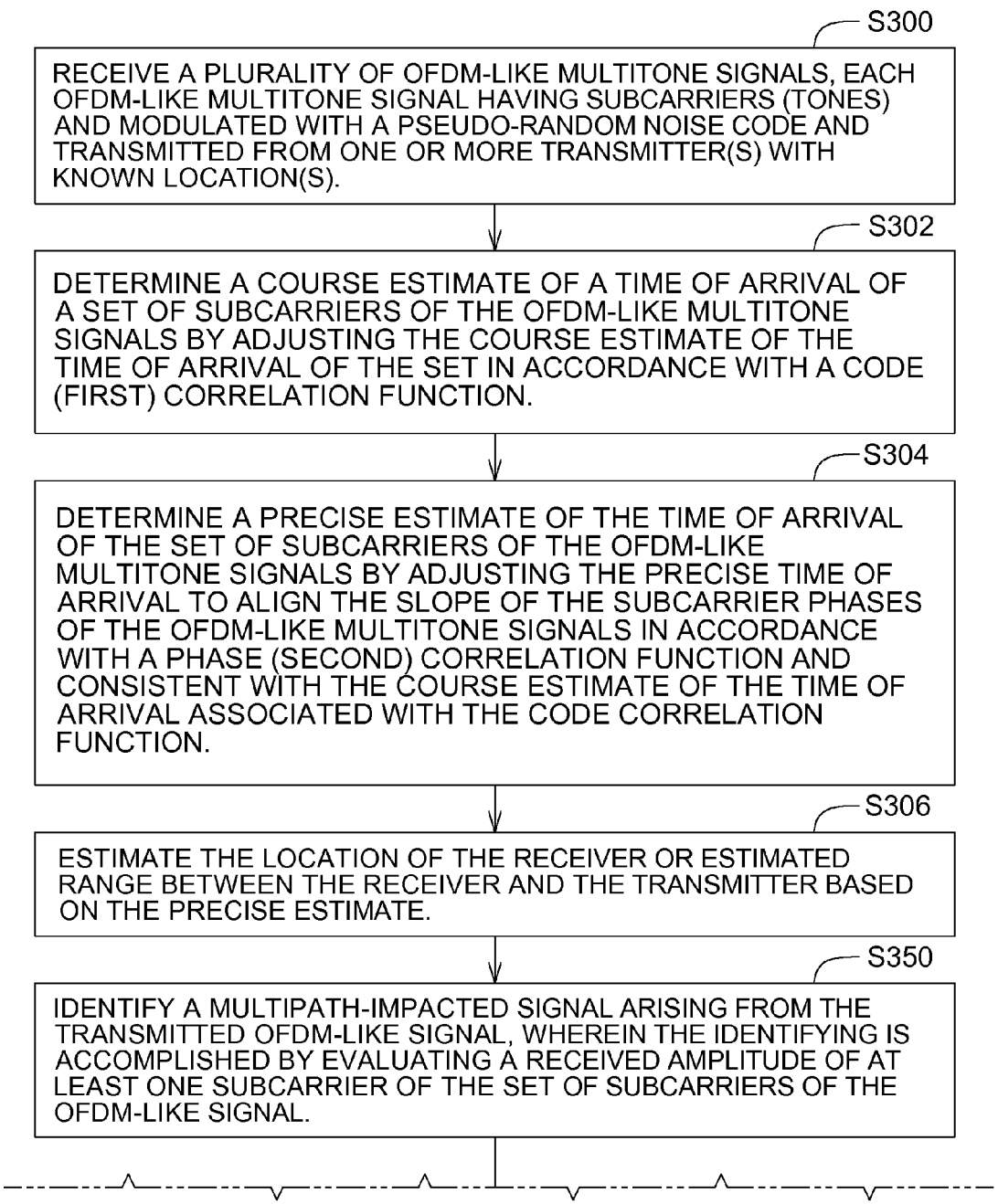
Figure 16B:
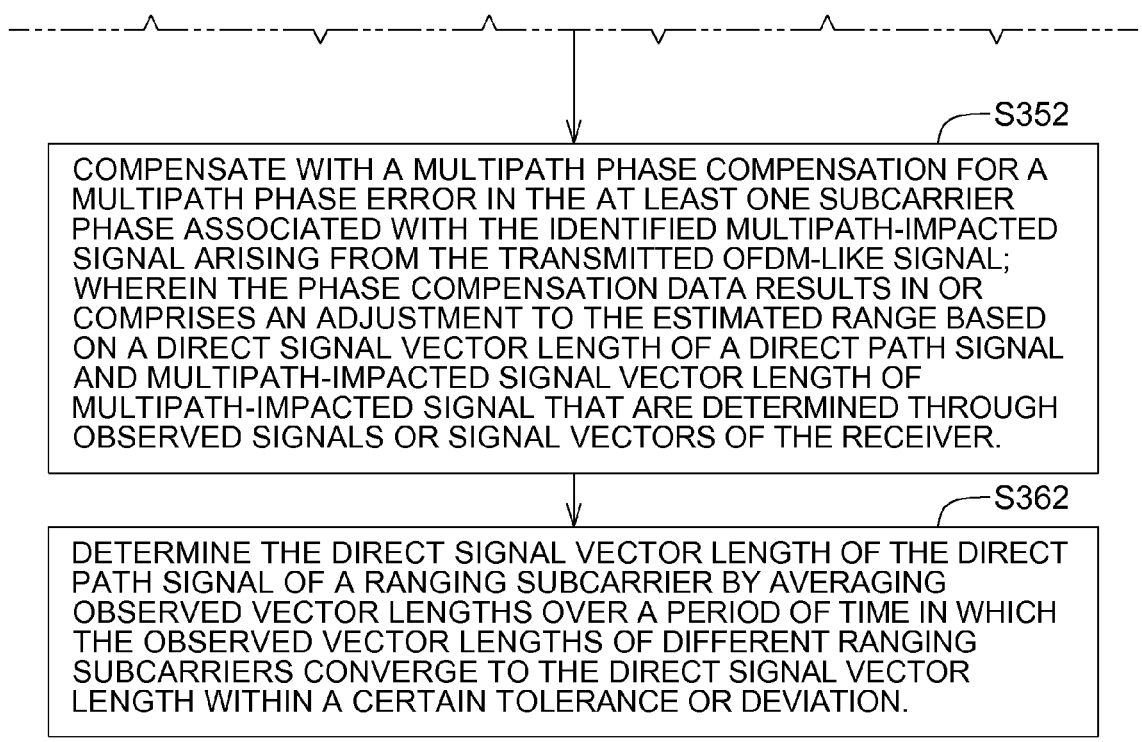

FIG. 16 refers to FIG. 16A and FIG. 16B collectively and is a flow chart of another embodiment of determining the location or range of a receiver with a multi-carrier signal with multipath compensation. The method of FIG. 15 is similar to the method of FIG. 12, except step S360 is added. Like reference numbers in FIG. 12 and FIG. 16 indicate like elements, steps or procedures.

In step S362, a data processor 104 or multipath compensator 96 determines the direct signal vector length of the direct path signal of a ranging subcarrier by averaging observed vector lengths over a period of time in which the observed vector lengths of different ranging subcarriers converge to the direct signal vector length within a certain tolerance or deviation.

In certain embodiments of the methods set forth in FIG. 17 through FIG. 20, inclusive, the procedure for multipath phase mitigation can depend less upon accurate measurement of the received vector lengths and can require much less computation than the methods set forth in FIG. 12 through FIG. 16, inclusive. In the methods set forth in FIG. 17 through FIG. 20, inclusive, the procedure for mitigating the effects of multipath described above may require the multipath vectors be averaged for an extended period of time (e.g., because of low vehicle dynamics). When the observed vector length of the tone is consistent with a long term average vector length representative of the direct path vector length, the multipath distortion is minimal and; hence, the associated reference phase slope of the subcarriers can be observed in the absence of multipath. The resultant reference phase slope measurement would serve as the target phase slope, which could differ from a zero target phase slope, for the second estimator 90 in the second tracking loop.

Figure 17:
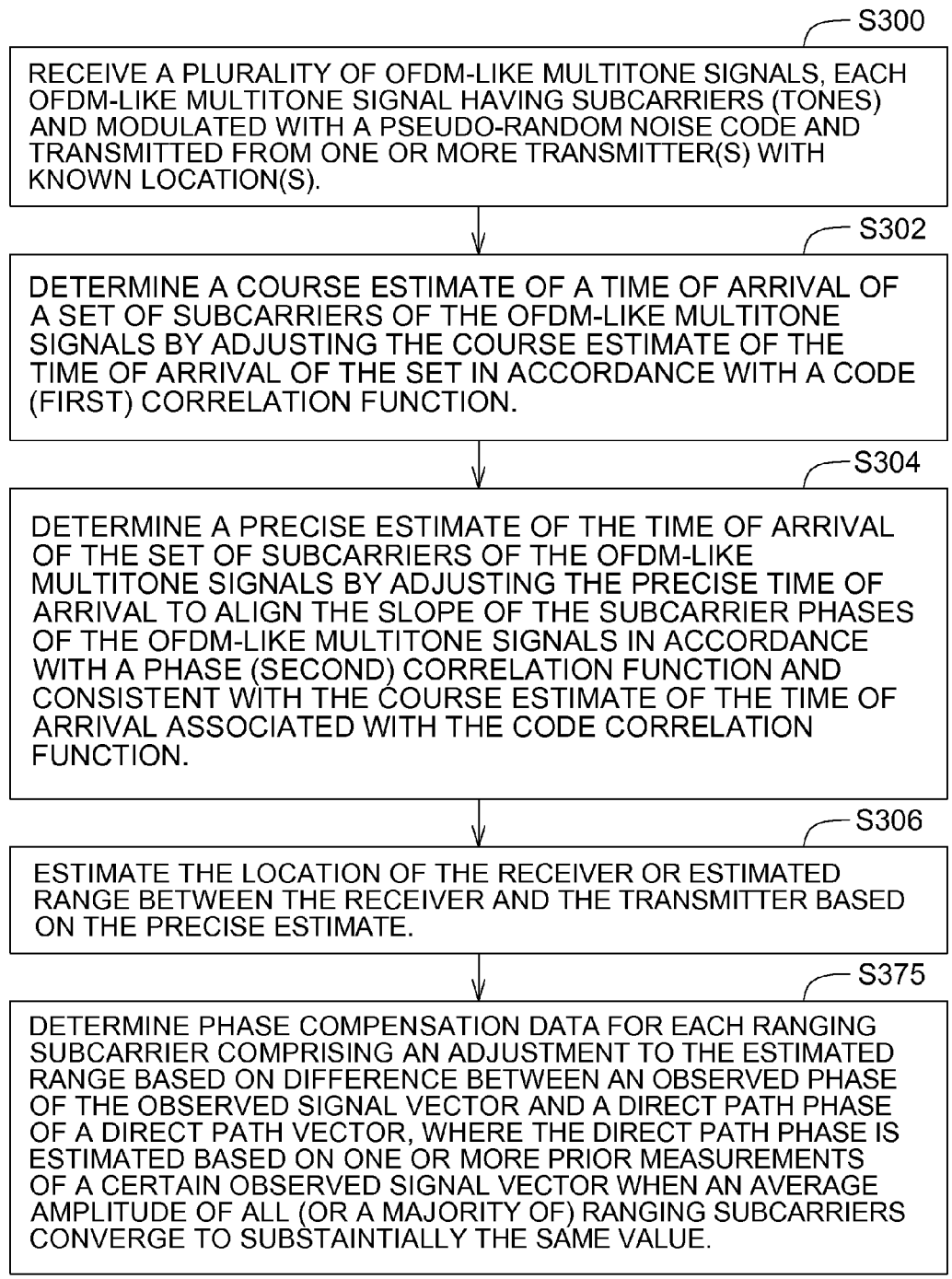
FIG. 17 is a flow chart of another embodiment of determining the location or range of a receiver with a multi-carrier signal to minimize or reduce the impact of multipath distortion or error.

FIG. 17 is a flow chart of another embodiment of determining the location or range of a receiver with a multi-carrier signal to minimize or reduce the impact of multipath distortion or error.

In step S300, a receiver 200 portion receives or is adapted to receive a plurality of OFDM-like multitone signals. Each OFDM-like multitone signal has subcarriers (tones) and is modulated with a pseudo-random noise code and transmitted from one or more transmitters 100 with corresponding known locations.

In step S302, in a first tracking loop, a first estimator 88 determines a coarse estimate of a time of arrival of a set (e.g., at least one subcarrier) of the OFDM-like multitone signals by adjusting the coarse estimate of the time of arrival of the set in accordance with a code (first) correlation function. For example, the phase error angle, and with angle and length remove its influence on the calculated phase to maximize the correlation of the received pseudo-random noise code of the at least one subcarrier with the local replica of the pseudo-random noise code in accordance with a code (first) correlation function.

In step S302, the determining of the coarse estimate may be executed in accordance with various techniques, which may be applied separately or cumulatively. Under a first technique, in the first tracking loop, the determining of the coarse estimate further comprises minimizing an error associated with an early-minus-late error function to determine the coarse estimate of the time of arrival. Under a second technique, the early minus late spacing is selected based on a ratio of the pseudo random noise code period and frequency spacing between subcarriers. Under a third technique, the early-minus-late error function has an early minus late spacing between approximately 0.0625 and 0.5 chips. Under a fourth technique, the code correlation of the first tracking loop occurs in the time domain. Under a fifth technique, in a frequency domain the tone signal detector 70 or amplitude detector 74 detects a tone amplitude associated with the at least one subcarrier for providing an adjustment signal to adjust a relative phase of the locally generated replica of the pseudo-random code to the received code. Under a sixth technique, the code correlation function comprises an autocorrelation function for the received signal and a locally generated pseudo random noise code signal that is expressed in magnitude versus time, wherein the autocorrelation function has a central peak associated with a maximum magnitude of a correlator output signal and a series of step-like transitions on each side of the central peak.

In step S304, in a second tracking loop, a second estimator 90 determines a precise estimate of the time of arrival of the set (e.g., the at least one subcarrier) of subcarriers of the OFDM-like multitone signals by adjusting the precise time of arrival to align the slope of the subcarrier phases of the OFDM-like multitone signals in accordance with a phase (second) correlation function and consistent with the coarse estimate of the time of arrival associated with the code correlation function.

In step S304, the determining of the precise estimate is carried out in accordance with one or more procedures, which may be carried out alternatively or cumulatively. Under a first procedure, in the second tracking loop, the data processor 104 or the receiver 200 the determines the precise estimate further comprises an error function with a target or goal of driving an average observed tone phase slope to a zero phase slope, or another target phase slope (e.g., associated with the absence of multipath signals). Under a second procedure, the data processor 104 or the receiver 200 adjusts the precise time of arrival to align the slope of the subcarrier phases of the OFDM-like multitone signals in accordance with a phase (second) correlation function comprises adjusting a central region of the phase slope, between adjacent ambiguity regions (e.g., with generally vertical slope) in the phase slope, to be aligned with a zero crossing point of the first early minus late function.

Under a third procedure, the receiver 200 or data processor 104 processes the received OFDM-like signal encoded without any cyclic prefix or cyclic suffix such that the phase of each tone produced by a transform module 68 (e.g., FFT transform module) in the receiver 200 is coherent from symbol to adjacent symbol. Accordingly, under the third procedure, the target phase slope may approach approximately a zero phase slope.

Under a fourth procedure, the receiver 200 or data processor 104 synchronizes the processing time, over which a time domain-to-frequency domain transform (e.g., FFT transform) is performed by a transform module 68 (e.g., FFT module) to a coherence interval (e.g., described in conjunction with FIG. 6) such that phase slope of the subcarriers will approach zero, or be reduced from any propensity toward a greater non-zero aggregate phase slope, for the target phase slope.

In step S306, a data processor 104 or range estimation module 84 estimates the location of the receiver 200 or estimated range between the receiver 200 and the transmitter 100 based on the precise estimate and phase error compensation in a phase domain, a range domain, or both commensurate with driving the slope of the subcarrier phases toward zero (e.g., to compensate for phase or frequency error in the absence multipath). For example, the data processor 104 or the range estimation module 84 estimates the location of the receiver 200 or estimated range between the receiver 200 and the transmitter 100 based on the precise estimate after any compensation for multipath and phase error compensation in a phase domain, a range domain, or both commensurate with driving the slope of the subcarrier phases toward zero.

In step S375, a data processor 104 or multipath compensator 96 determines phase compensation data for each ranging subcarrier comprising an adjustment to the estimated range based on difference between an observed phase of the observed signal vector and a direct path phase of a direct path vector, where the direct path phase is estimated based on one or more prior measurements of a certain observed signal vector when an average amplitude of all (or a majority of) ranging subcarriers converge to substantially the same value. The data processor 104, multipath compensator 96 or the range-domain, phase-slope compensator 92 can use compensation data for a first, representative or reference ranging subcarrier to estimate additional compensation data for the other ranging subcarriers based on one or more of the following: different frequency or wavelengths of the ranging subcarriers, an observed phase slope of the ranging subcarriers, and a target phase slope of the ranging subcarriers. Step S375 may be carried out in accordance with various techniques that may be used separately or cumulatively. In accordance with a first technique, the data processor 104, multipath detector 94, or tone signal detector 70 determines that the certain observed signal vector comprises a direct path signal vector for which no phase compensation is required for a respective time period when an average amplitude of all ranging subcarriers converge to a same value. In accordance with a second technique, the data processor 104, multipath compensator 96, or tone signal detector 70 determines phase compensation data during a multipath compensation mode, where the direct phase is estimated during an uncompensated mode and where the multipath compensation mode and the uncompensated mode or nonsynchronous or temporally mutually exclusive. In accordance with a third technique, the data processor 104, multipath compensator 96, or tone signal detector 70 derive phase measurements from the certain observed signal vector where the derived phase measurements are generally free of multipath contamination and require no multipath phase compensation for the phase measurements.

In accordance with a fourth technique, if the respective received subcarrier phases of multiple subcarriers of the OFDM-like signal have short-term amplitude that differs from a long-term amplitude during an evaluation time period by equal to or greater than a deviation threshold, the data processor 104 or multipath detector 94 determines that the identified multipath-impacted signal is present and that the compensating for multipath phase error is or becomes in an active mode (multipath phase compensation mode) for at least the evaluation time period. In accordance with a fifth technique, if the respective received subcarrier phases of multiple subcarriers of the OFDM-like signal have a short-term amplitude that is within less than a deviation threshold of the long-term amplitude during an evaluation time period, the data processor 104 or the multipath detector 94 determines that the identified multipath-impacted signal is not present and that the compensating for phase error is or becomes in an inactive mode for the evaluation time period.

In accordance with a sixth technique, the data processor 104 processes the received OFDM-like signal encoded without any cyclic prefix or cyclic suffix such that the phase of each tone produced by a transform module in the receiver is coherent from symbol to adjacent symbol.

In accordance with a seventh technique, the data processor 104 synchronizes the processing time, over which a transform performed by a transform module, to a coherence interval, such that the phase slope of the subcarriers will approach zero or be reduced from any propensity toward a greater non-zero aggregate phase slope.

Figures 18, 18A, 18B:
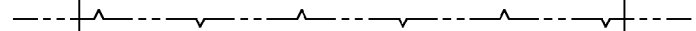
FIG. 18 refers to FIG. 18A and FIG. 18B collectively.
Figure 18A:
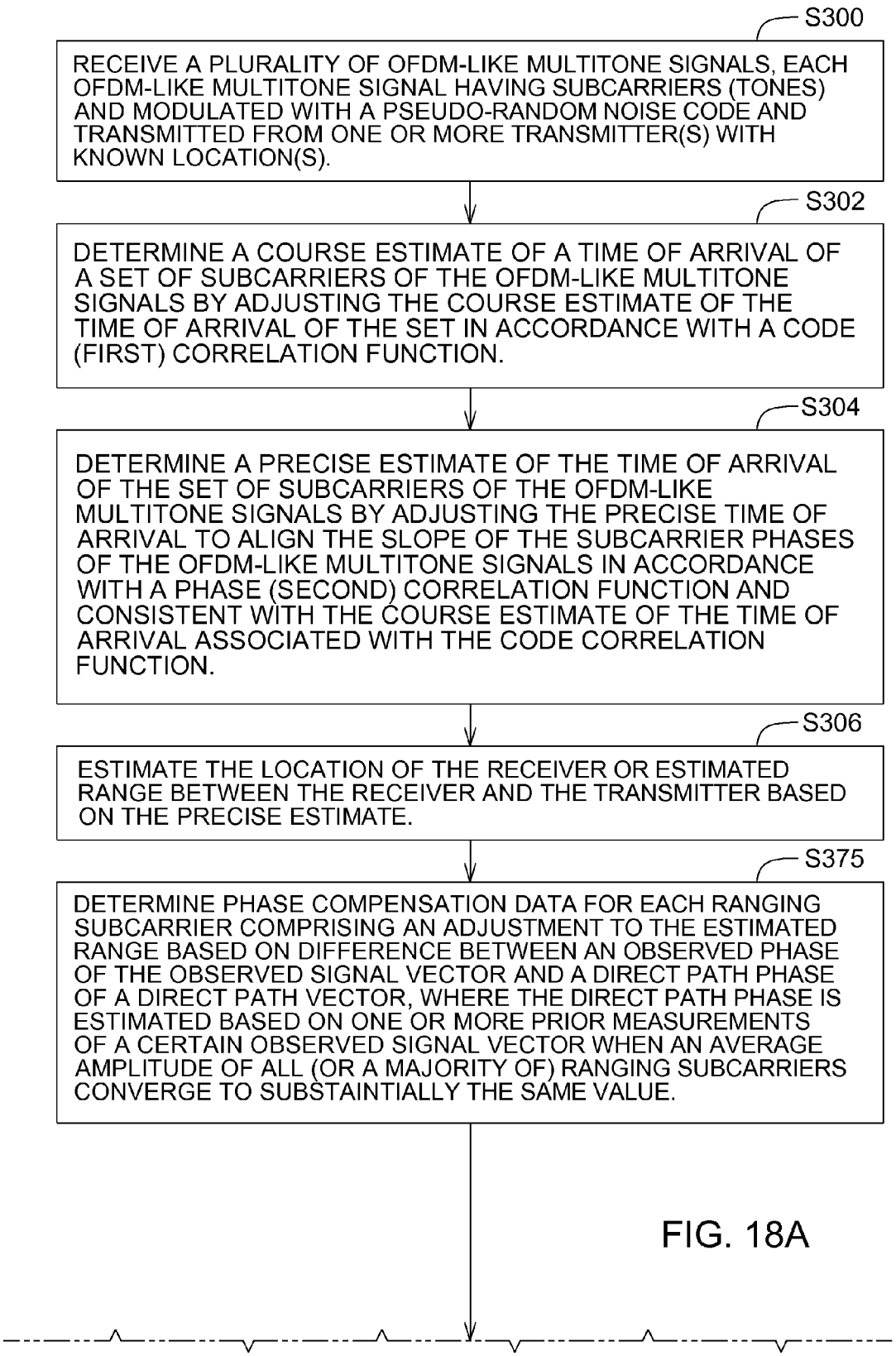
Figure 18B:
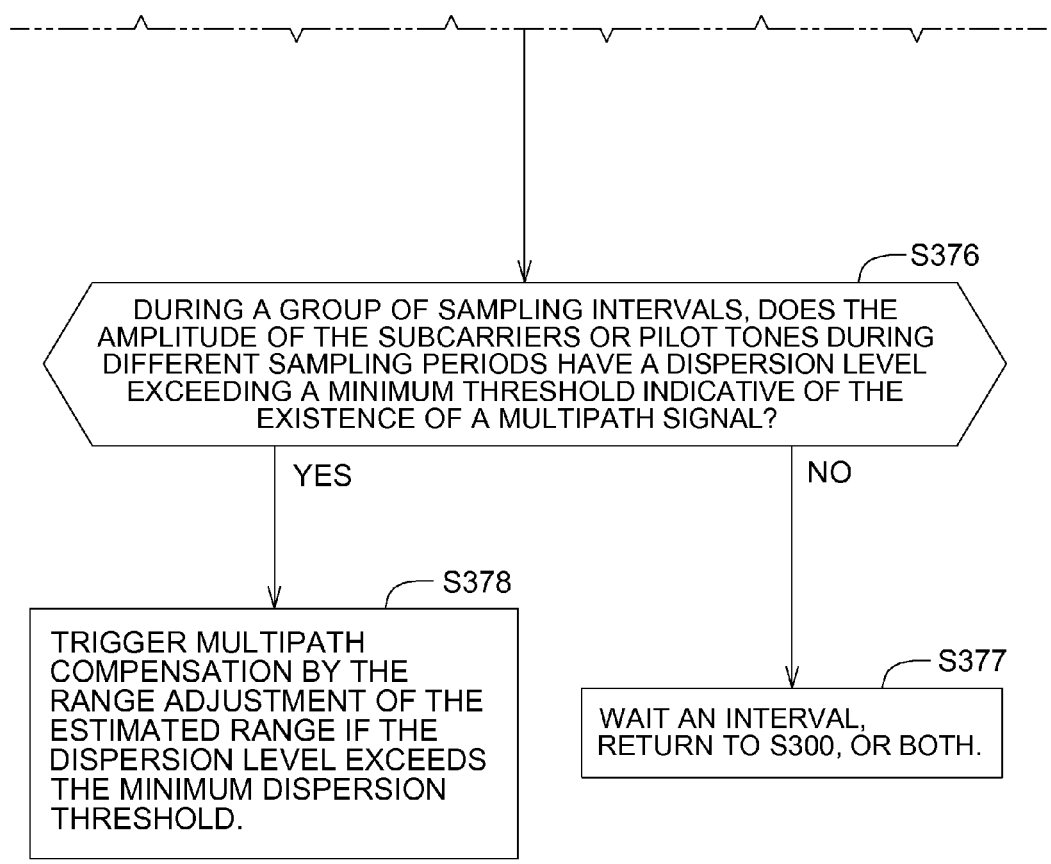

FIG. 18 refers to FIG. 18A and FIG. 18B collectively and is a flow chart of another embodiment of determining the location or range of a receiver with a multi-carrier signal to minimize or reduce the impact of multipath distortion or error. The method of FIG. 18 is similar to the method of FIG. 17 except the method of FIG. 18 further comprises steps S376, S377, and S378. Like reference numbers in FIG. 17 and FIG. 18 indicate like elements, procedures or steps.

In step S376, during a group of sampling intervals, the data processor 104 determines whether the amplitudes of the subcarriers or pilot tones during different sampling periods have a dispersion level exceeding a minimum threshold indicative of the existence of a multipath signal. If the amplitudes of the subcarriers have dispersion level that exceeds the minimum threshold, the method continues with step S378. However, if the amplitudes do not have a dispersion level that exceeds the dispersion level, the method continues with step S377.

In step S377, the receiver or data processor 104 waits an interval, return to S300 or both.

In step S378, a data processor 104 or multipath compensator 96 triggers multipath compensation by the range adjustment of the estimated range if the dispersion level exceeds the minimum dispersion threshold.

Figures 19, 19A, 19B:
FIG. 19 refers to FIG. 19A and FIG. 19B collectively.
Figure 19A:
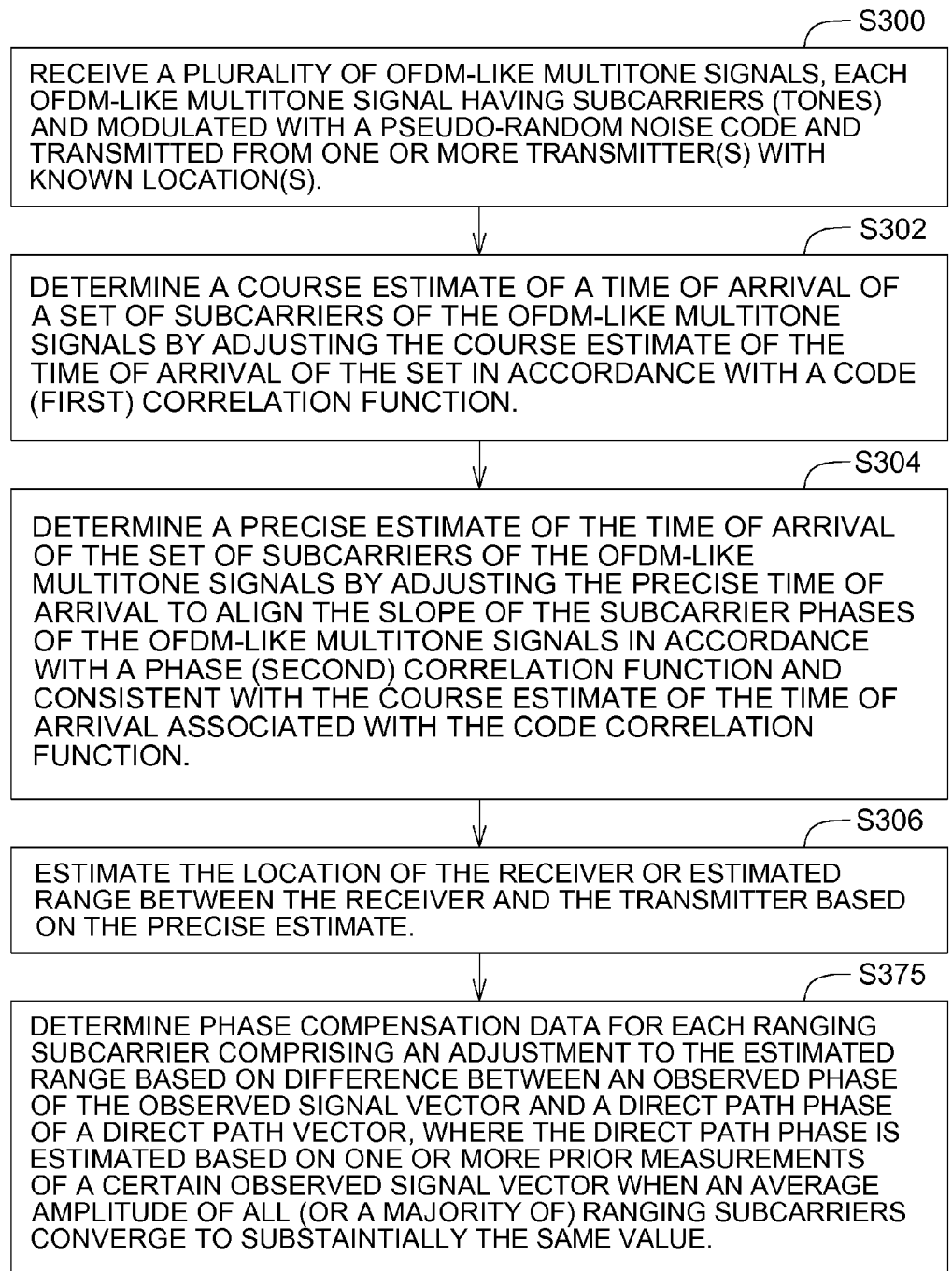
Figure 19B:
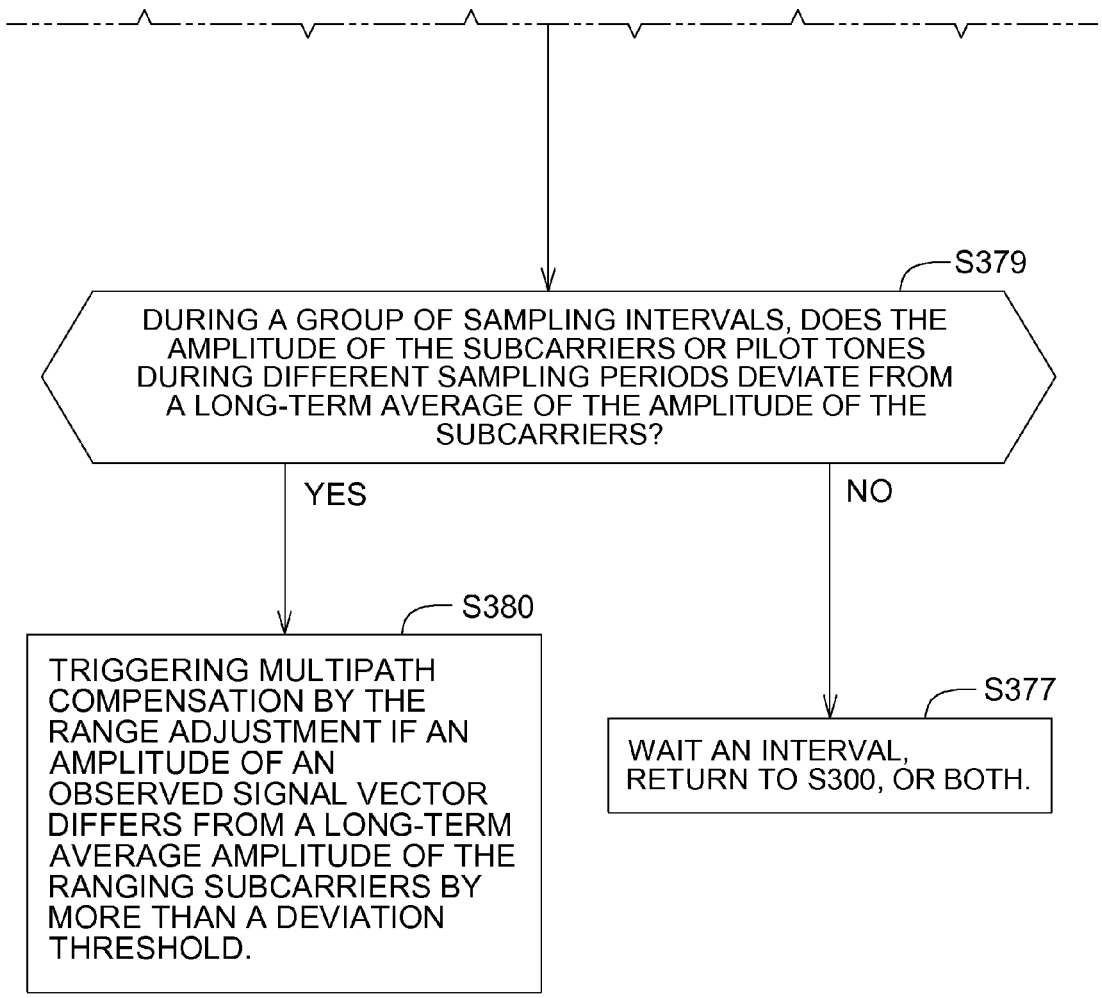

FIG. 19 refers to FIG. 19A and FIG. 19B collectively and is a flow chart of another embodiment of determining the location or range of a receiver with a multi-carrier signal to minimize or reduce the impact of multipath distortion or error. The method of FIG. 19 is similar to the method of FIG. 17 except the method of FIG. 19 further comprises steps S379, S377, and S380. Like reference numbers in FIG. 17 and FIG. 19 indicate like elements, procedures or steps.

In step S379, during a group of sampling intervals, a data processor 104 determines whether the amplitudes of the subcarriers or pilot tones during different sampling periods deviates from a long-term average (e.g. mean) of the amplitude of the subcarriers. If the amplitudes of the subcarriers deviate from the long-term average, the method continues with step S380. However, if the amplitudes do not have a dispersion level that exceeds the dispersion level, the method continues with step S377.

In step S377, the receiver or data processor 104 waits an interval, return to S300 or both.

In step S380, a data processor 104 or multipath compensator 96 triggers multipath compensation by the range adjustment if an amplitude of an observed signal vector differs from a long-term average amplitude of the ranging subcarriers by more than a deviation threshold.

Figure 20A:
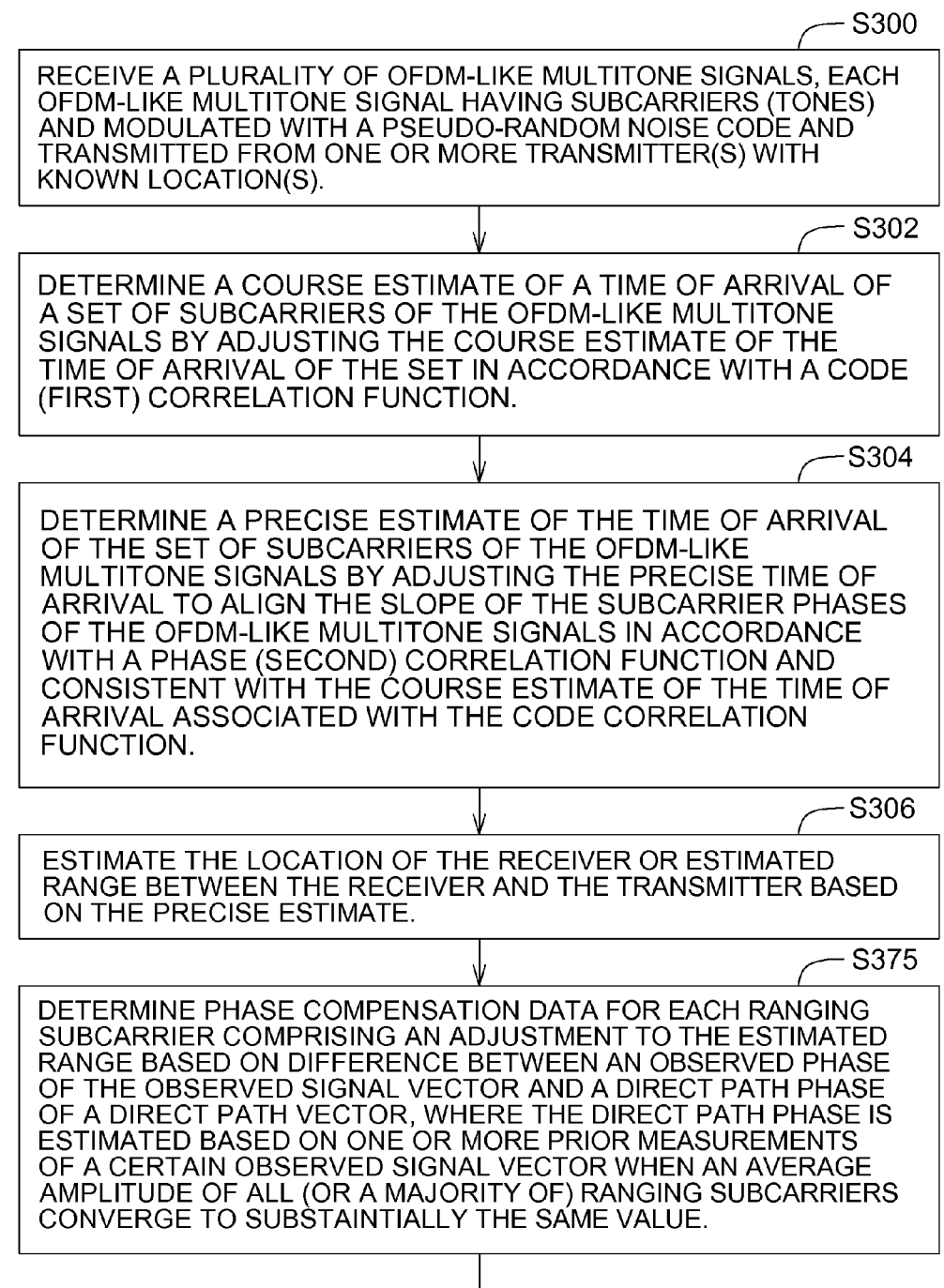
FIG. 20 refers to FIG. 20A and FIG. 20B collectively.
Figure 20B:
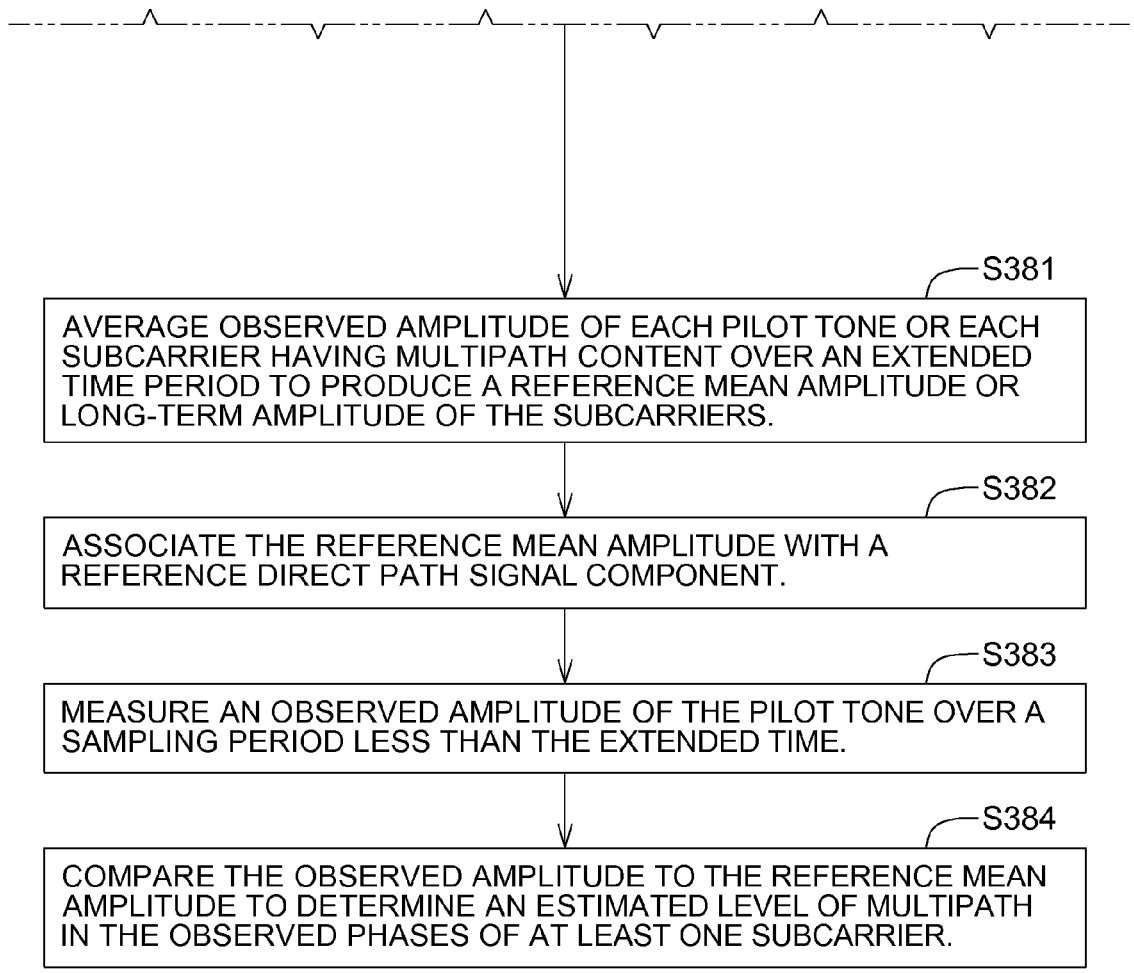

FIG. 20 refers to FIG. 20A and FIG. 20B collectively and is a flow chart of another embodiment of determining the location or range of a receiver with a multi-carrier signal to minimize or reduce the impact of multipath distortion or error. The method of FIG. 20 is similar to the method of FIG. 17 except the method of FIG. 20 further comprises steps S381, S382, S383 and S384. Like reference numbers in FIG. 17 and FIG. 20 indicate like elements, procedures or steps.

In step S381, a data processor 104 or multipath compensator 96 averages observed amplitude of each pilot tone or each subcarrier having multipath content over an extended time period to produce a reference mean amplitude or long-term amplitude of the subcarriers.

In step S382, the data processor 104 or multipath compensator 96 associates the reference mean amplitude with a reference direct path signal component.

In step S383, the data processor 104 or multipath compensator 96 measures an observed amplitude of the pilot tone over a sampling period less than the extended time.

In step S384, the data processor 104 or multipath compensator compares the observed amplitude to the reference mean amplitude to determine an estimated level of multipath in the observed phases of at least one subcarrier.

The system and method of this disclosure defines a navigation signal that has two major components that facilitate an extremely precise measure of time of arrival. The signal structure supports the ability to make extremely precise time-of-arrival measurements that are significantly immune from multipath distortion. The receiver 200 uses a scheme of demodulation and range measurement that produces extremely precise range measurements.

Multipath interference can be easily detected and measurements can be produced that are virtually free of multipath contamination that varies with time. If multipath signal is highly time correlated, a metric of the multipath contamination or multipath figure of merit can be developed. This metric can then be used to estimate the quality of the range measurement.

Having described the preferred embodiment, it will become apparent that various modifications can be made without departing from the scope of the invention as defined in the accompanying claims.

The following is claimed:

1. A method for determining a location of a receiver using a multi-carrier signal, the method comprising:
receiving a plurality of OFDM-like multitone signals, each OFDM-like multitone signal having subcarriers and modulated with a pseudo-random noise code and transmitted from a transmitter with a known location;
determining a coarse estimate of a time of arrival of at least one subcarrier of the OFDM-like multitone signals by adjusting the coarse estimate of the time of arrival in accordance with a code correlation function;
determining a precise estimate of the time of arrival of at least one subcarrier of the OFDM-like multitone signals by adjusting the precise time of arrival to align a slope of at least two of the subcarrier phases of the OFDM-like multitone signals in accordance with a phase correlation function and consistent with the coarse estimate of the time of arrival associated with the code correlation function; and
estimating the location of the receiver or estimated range between the receiver and the transmitter based on the precise estimate.

2. The method according to claim 1 wherein the determining of the coarse estimate further comprises minimizing an error associated with an early-minus-late error function to determine the coarse estimate of the time of arrival.

3. The method according to claim 2 wherein the early minus late spacing is selected based on a ratio of the pseudo random noise code period and frequency spacing between subcarriers.

4. The method according to claim 2 wherein the early-minus-late error function has an early minus late spacing between approximately 0.0625 and 0.5 chips.

5. The method according to claim 1 wherein the code correlation occurs in the time domain; and further comprising:
in a frequency domain, detecting a tone amplitude associated with the at least one subcarrier for providing an adjustment signal to adjust a relative phase of the locally generated replica of the pseudo-random code to the received code.

6. The method according to claim 1 wherein the code correlation function comprises an autocorrelation function for the received signal and a locally generated pseudo random noise code signal that is expressed in magnitude versus time, wherein the autocorrelation function has a central peak associated with a maximum magnitude of a correlator output signal and a series of step-like transitions on each side of the central peak.

7. The method according to claim 1 wherein the determining of the precise estimate further comprises an error function with a target or goal of driving an average observed tone phase slope to a zero phase slope.

8. The method according to claim 1 further comprising:
processing the received OFDM-like signal encoded without any cyclic prefix or cyclic suffix such that the phase of each tone produced by a transform module in the receiver is coherent from symbol to adjacent symbol.

9. The method according to claim 1 further comprising:
synchronizing the processing time, over which a transform performed by a transform module, to a coherence interval, such that the phase slope of the subcarriers will approach zero or be reduced from any propensity toward a greater non-zero aggregate phase slope.

10. The method according to claim 1 wherein the adjusting of the precise time of arrival to align the slope of the subcarrier phases of the OFDM-like multitone signals in accordance with a phase correlation function comprises adjusting a central region of the phase slope, between adjacent ambiguity regions in the phase slope, to be aligned with a zero crossing point of the first early minus late function.

11. The method according to claim 1 further comprising:
estimating the location of the receiver or estimated range between the receiver and the transmitter based on the precise estimate after any compensation for multipath and phase error compensation in a phase domain, a range domain, or both commensurate with driving the slope of the subcarrier phases toward zero.

12. A method for determining a location of a receiver using a multi-carrier signal, the method comprising:
receiving a plurality of OFDM-like multitone signals, each OFDM-like multitone signal having subcarriers and modulated with a pseudo-random noise code and transmitted from a transmitter with a known location;
in a first tracking loop, determining a coarse estimate of a time of arrival of at least one subcarrier of the OFDM-like multitone signals by adjusting the coarse estimate of the time of arrival to maximize the correlation of the received pseudo-random noise code of the at least one subcarrier with the local replica of the pseudo-random noise code in accordance with a code correlation function;

in a second tracking loop, determining a precise estimate of the time of arrival of at least one subcarrier of the OFDM-like multitone signals by adjusting the precise estimate of the time of arrival to align the slope of at least two of the subcarrier phases of the OFDM-like multitone signals in accordance with a phase correlation function and consistent with the coarse estimate of the time of arrival associated with the code correlation function; and estimating the location of the receiver or estimated range between the receiver and the transmitter based on the precise estimate.

13. The method according to claim 12 wherein in the first tracking loop, the determining of the coarse estimate further comprises minimizing an error associated with an early-minus-late error function to determine the coarse estimate of the time of arrival.

14. The method according to claim 13 wherein the early minus late spacing is selected based on a ratio of the pseudo random noise code period and frequency spacing between subcarriers.

15. The method according to claim 13 wherein the early-minus-late error function has an early minus late spacing between approximately 0.0625 and 0.5 chips.

16. The method according to claim 12 wherein the code correlation of the first tracking loop occurs in the time domain; and further comprising:

in a frequency domain, detecting a tone amplitude associated with the at least one subcarrier for providing an adjustment signal to adjust a relative phase of the locally generated replica of the pseudo-random code to the received code.

17. The method according to claim 12 wherein the code correlation function comprises an autocorrelation function for the received signal and a locally generated pseudo random noise code signal that is expressed in magnitude versus time, wherein the autocorrelation function has a central peak associated with a maximum magnitude of a correlator output signal and a series of step-like transitions on each side of the central peak.

18. The method according to claim 12 wherein in the second tracking loop, the determining of the precise estimate further comprises an error function with a target or goal of driving an average observed tone phase slope to a zero phase slope.

19. The method according to claim 12 further comprising:
processing the received OFDM-like signal encoded without any cyclic prefix or cyclic suffix such that the phase of each tone produced by a transform module in the receiver is coherent from symbol to adjacent symbol.

20. The method according to claim 12 further comprising:
synchronizing the processing time, over which a transform performed by a transform module, to a coherence interval, such that the phase slope of the subcarriers will approach zero or be reduced from any propensity toward a greater non-zero aggregate phase slope.

21. The method according to claim 12 wherein the adjusting of the precise time of arrival to align the slope of the subcarrier phases of the OFDM-like multitone signals in accordance with a phase correlation function comprises adjusting a central region of the phase slope, between adjacent ambiguity regions in the phase slope, to be aligned with a zero crossing point of the first early minus late function.

22. The method according to claim 12 further comprising:
estimating the location of the receiver or estimated range between the receiver and the transmitter based on the precise estimate after any compensation for multipath and phase error.

* * * * *